(12) United States Patent
Maruyama et al.

(10) Patent No.: US 12,276,674 B2
(45) Date of Patent: Apr. 15, 2025

(54) SERVO-TYPE VIBRATION DETECTOR AND VIBRATION CONTROL DEVICE

(71) Applicant: TOKKYOKIKI CORPORATION, Amagasaki (JP)

(72) Inventors: Teruo Maruyama, Hirakata (JP); Kozo Okamoto, Kawanishi (JP); Michihiko Tani, Amagasaki (JP); Takumi Okada, Ikoma (JP)

(73) Assignee: TOKKYOKIKI CORPORATION, Amagasaki (JP)

( * ) Notice: Subject to any disclaimer, the term of this patent is extended or adjusted under 35 U.S.C. 154(b) by 361 days.

(21) Appl. No.: 18/001,710

(22) PCT Filed: Jun. 16, 2021

(86) PCT No.: PCT/JP2021/022934
§ 371 (c)(1),
(2) Date: Dec. 13, 2022

(87) PCT Pub. No.: WO2021/256521
PCT Pub. Date: Dec. 23, 2021

(65) Prior Publication Data
US 2023/0228787 A1 Jul. 20, 2023

(30) Foreign Application Priority Data
Jun. 17, 2020 (JP) ................. 2020-104515

(51) Int. Cl.
*G01F 15/10* (2006.01)
*G01P 7/00* (2006.01)
*G01P 15/105* (2006.01)

(52) U.S. Cl.
CPC .............. *G01P 15/105* (2013.01); *G01P 7/00* (2013.01)

(58) Field of Classification Search
CPC ........ G01P 15/105; G01P 7/00; G01P 15/125; G01P 15/132; G01H 11/02
See application file for complete search history.

(56) References Cited

U.S. PATENT DOCUMENTS 4,922,159 A    5/1990  Phillips et al.
7,677,100 B2 * 3/2010  Konaka ................. G01P 15/125
                                                 73/504.12

(Continued)

FOREIGN PATENT DOCUMENTS

CN          2886522       4/2007
CN       102252746 A      11/2011

(Continued)

OTHER PUBLICATIONS

Japan Patent Office, Office Action Issued in Application No. 2020104515, Apr. 11, 2024, 7 pages.

(Continued)

*Primary Examiner* — Francis C Gray
(74) *Attorney, Agent, or Firm* — Alleman Hall & Tuttle LLP

(57) ABSTRACT

A movable member coupled to a displacement detector via a void is disposed with respect to a fixed member to which a coil is fixed. By disposing the coil in a closed loop magnetic circuit including a permanent magnet, the movable-side member, and the fixed member, a Lorentz force for moving the movable-side member in the axial direction is generated.

36 Claims, 58 Drawing Sheets

(56) References Cited

U.S. PATENT DOCUMENTS

| | | | | |
|---|---|---|---|---|
| 2010/0170341 | A1* | 7/2010 | Dwyer | G01P 15/132 |
| | | | | 73/514.31 |
| 2016/0153829 | A1 | 6/2016 | Uhlin | |
| 2022/0018872 | A1* | 1/2022 | Dwyer | G01P 15/132 |

FOREIGN PATENT DOCUMENTS

| | | | |
|---|---|---|---|
| DE | 10139379 | | 3/2003 |
| DE | 10357870 A1 | | 7/2005 |
| DE | 102018117432 | | 1/2020 |
| JP | S58060268 U | | 4/1983 |
| JP | H04500121 A | | 1/1992 |
| JP | H04313060 A | | 11/1992 |
| JP | H0528463 U | * | 4/1993 |
| JP | H10153618 A | | 6/1998 |
| JP | 2004205284 A | | 7/2004 |
| JP | 2006283966 A | | 10/2006 |
| JP | 2008312362 A | * | 12/2008 |
| JP | 2010096509 A | | 4/2010 |
| KR | 102309952 B1 | * | 10/2021 |
| WO | 9001712 | | 2/1990 |

OTHER PUBLICATIONS

Yamamoto, S., "Function and Characteristics of Accelerometers, for Active Vibration Control Technology," Journal of the Japan Society for Precision Engineering, vol. 73, No. 4, Apr. 2007, 5 pages.
European Patent Office, Extended European Search Report Issued in Application No. 21826975.1, Jul. 25, 2024, Germany, 8 pages.
ISA Japan Patent Office, International Search Report Issued in Application No. PCT/JP2021/022934, Sep. 7, 2021, WIPO, 4 pages.

* cited by examiner

Step 2

Step 3

Step 5

Step 7

Step 8

SERVO-TYPE VIBRATION DETECTOR AND VIBRATION CONTROL DEVICE

TECHNICAL FIELD

The present invention relates to a vibration sensor or a vibration elimination control device that detects, in a wide frequency band, a signal of acceleration of a control object supported with respect to a foundation and vibrating due to disturbance, or an absolute speed or an absolute displacement with respect to an inertial space.

BACKGROUND ART

1. Trends in the World

In various fields such as a semiconductor manufacturing process, a liquid crystal manufacturing process, and precision machining, use of vibration control for blocking and suppressing fine vibration is spreading. Microfabrication and inspection devices such as scanning electron microscopes and semiconductor exposure devices (steppers) used in these processes are required to have strict vibration tolerance conditions for guaranteeing the performance of the devices. In the future, with further higher integration and miniaturization of products, an increase in the speed of a machining process and an increase in the size of a device are progressing, and vibration tolerance conditions tend to be increasingly strict.

2. Disturbance to be Removed by Vibration Isolator

In recent years, an active vibration control technique for generating a control signal on the basis of displacement/speed/acceleration information from vibration sensors disposed at a plurality of locations of a structure (for example, a precision vibration isolator) to be subjected to vibration control and controlling a control device has been widely used.

FIG. 52 is a model diagram of a conventional active vibration isolator. This active vibration isolator is known as described in Patent Literature 3. A plurality of sets of pneumatic actuators (502a, 502b) for supporting the surface plate 501 are arranged on the floor surface 500. A precision device (not illustrated) is mounted on the surface plate 501. Reference numeral 503 denotes an acceleration sensor for detecting acceleration of the surface plate 501 in the vertical and horizontal directions, and reference numeral 504 denotes an acceleration sensor for detecting acceleration of the floor surface 500 (vibration state of the foundation). Reference numerals 505a and 505b denote displacement sensors for detecting vertical and horizontal relative displacements of the surface plate 501 with respect to the floor surface 500, respectively. Output signals from these sensors are input to the controller 506. A servo valve 508 controlled by the controller 506 is connected to the pneumatic actuator 502a via a pipe 507. The servo valve 508 adjusts the flow rate of the compressed air supplied to and exhausted from the pneumatic actuator 502a, thereby controlling the internal pressure of the actuator 502a and driving the pneumatic actuator.

The disturbance to be removed in the vibration isolator is roughly divided into ground motion disturbance caused by vibration of the installed floor and linear motion disturbance input from the vibration isolator.

As a source of the vibration that becomes the ground motion disturbance, the vibration caused by the movement of a person called walking vibration is 1 to 3 Hz, the vibration caused by a motor such as an air conditioner is 6 to 35 Hz, and the resonance point of the floor and the wall is about 10 to 100 Hz. The super high-rise vibration isolating building has a natural frequency in the vicinity of 0.2 to 0.3 Hz. In addition, a slight vibration of 0.1 to 1.0 Hz is generated in the building due to the wind shake. Therefore, the vibration isolator is required not only to suppress high-frequency vibration but also to remove low-frequency vibration.

In a case where, for example, the positioning stage 509 is mounted on the vibration isolator as a source of the high-frequency vibration due to the linear motion disturbance, the structure including the vibration isolator is struck by the acceleration/deceleration operation of the stage and swings by the drive reaction force. The performance of the stage cannot be maintained unless vibration due to the impact and shaking due to the drive reaction force are suppressed. In summary, the vibration isolator is required to have a function of both of "vibration isolation" due to a ground motion disturbance and "vibration isolation" due to a linear motion disturbance.

3. Role of Vibration Sensor in Active Vibration Isolator

In the active vibration control, a control method by state feedback is adopted. This is a method of controlling the control device on the basis of acceleration, speed, and displacement information from vibration sensors disposed at a plurality of places of the structure to be subjected to vibration control. In order to obtain vibration removal performance in a wide frequency region, for example, the acceleration signal is mainly used to control a state quantity of 10 Hz or more, the speed signal is used to control a state quantity of 1 to 10 Hz, and the displacement signal is used to control a state quantity of 1 Hz or less. For example, (i) When acceleration feedback is performed using a signal from an acceleration sensor (using the acceleration sensor 503 in FIG. 52) disposed on the surface plate 501, it is equivalent to an increase in the mass M, and effects such as reducing the natural frequency and reducing the resonance peak can be obtained.

(ii) When a signal from the acceleration sensor (503 in FIG. 52) is converted into an absolute speed or an absolute displacement signal, and feedback or feedforward is performed, the vibration removal performance can be significantly improved in a wide frequency region.

(iii) When a signal from an acceleration sensor (504 in FIG. 52) disposed immediately below the surface plate 501 is used to convert the signal into an absolute speed or an absolute displacement signal, and feedforward is similarly performed, vibration removal performance can be improved in a wide frequency region.

In order to perform the above control (ii) and (iii), speed and position information with respect to the inertial space are required. Since the acceleration sensor can measure the acceleration with respect to the inertial space, the acceleration applied to the control target can be detected by attaching the acceleration sensor to the control target. Therefore, in the conventional active vibration isolator, a method of obtaining a speed signal by integrating the output of the acceleration sensor once and obtaining a displacement signal by further integrating the output twice is adopted.

4. Basic Configuration and Detection Principle of Acceleration Sensor

FIG. 53 is a model diagram illustrating a basic configuration and a detection principle of the electrostatic capacitance-type acceleration sensor. Reference numeral 301 denotes a main body that houses each member of the sensor, reference numeral 302 denotes a mass body, reference numeral 303 denotes a spring that mechanically supports the mass body 302 with respect to the vibration measurement surface A, and reference numeral 304 denotes an attenuator. The mass body 302 also serves as a movable-side electrode of the electrostatic capacitance-type sensor. Reference numeral 305 denotes a fixed-side electrode disposed on the opposite surface side of the movable-side electrode (mass body 302), and reference numeral 306 denotes a void portion between the two electrodes.

Reference numeral 307 denotes an electromagnetic actuator that drives the mass body 302 in a direction perpendicular to the vibration measurement surface A. Since the electrostatic capacitance C is determined by the size of the gap of the void portion 306, the relative displacement U-X, which is the difference between the ground motion absolute displacement U and the absolute displacement X of the mass body, can be detected by measuring the electrostatic capacitance C. The servo circuit 310 (indicated by a two-dot chain line) includes a displacement amplifier 311 that amplifies the relative displacement signal U-X with a gain $K_P$.

Hereinafter, a detection principle of the acceleration sensor will be described using a mathematical expression. Assuming that the mass of the mass body 302 is m, the spring constant of the mechanical spring 303 supporting the mass body is k, the damping coefficient of the attenuator 304 is c, and the driving force of the actuator 307 is $F_{fi0}$, the following equation of motion is established.

[Math. 1]
$$m\frac{d^2x}{dt^2} = c\frac{d}{dt}(u-x) + k(u-x) + A_f i_0 \quad (1)$$

The current $i_0$ of the actuator is controlled by the amplifier having the proportional gain constant $K_P$ so that the relative displacement u-x becomes zero.

[Math. 2]
$$A_f i_0 = K_P(u-x) \quad (2)$$

[Math. 3]
$$m\frac{d^2x}{dt^2} = c\frac{d}{dt}(u-x) + k(u-x) + K_P(u-x) \quad (3)$$

Assuming that the proportional gain constant $K_P$ is sufficiently large and the first term and the second term are negligible compared to the third term on the right side of Expression (3),

[Math. 4]
$$\frac{d^2x}{dt^2} = \frac{K_P}{m}(u-x) \quad (4)$$

By detecting the current $i_0$ flowing through the actuator from Expressions (2) and (4), the acceleration of the mass body 302 can be approximately obtained.

5. Specific Structure of Conventional Servo-Type Acceleration Sensor

As a specific structure of the servo-type accelerometer, two types are roughly used: (1) a type in which the mass part linearly moves, and (2) a type in which the mass part swings. Hereinafter, embodiments of these two types of conventional sensors will be described.

(5-1) Conventional Example of Linear Motion-Type Acceleration Sensor

FIG. 54 is a front cross-sectional view illustrating a specific structure example of a conventional linear motion-type acceleration sensor. The basic principle of the linear motion type is disclosed in Patent Literature 1. It is configured by the basic configuration and the detection principle illustrated in FIG. 53. Reference numeral 11 is a permanent magnet, reference numeral 12 is a pole piece, reference numeral 13 is a pole piece convex portion, reference numeral 14 is a permanent magnet-side yoke material, reference numeral 15 is a coil-side yoke material, reference numeral 16a is a force coil, reference numeral 16b is a verification coil, reference numeral 17 is a coil bobbin, reference numerals 18 and 19 are coil bobbin supporting members made of a non-magnetic and non-conductive material, reference numeral 20 is a front-side disc-shaped spring, reference numeral 21 is a rear-side disc-shaped spring, reference numeral 22 is a front-side connecting member of the front-side disc-shaped spring 20 and the coil-side yoke material 15, and reference numeral 23 is a rear-side connecting member of the rear-side disc-shaped spring 21 and the coil-side yoke material 15.

Reference numeral 24 denotes a movable-side electrode, reference numeral 25 denotes a fixed-side electrode, reference numeral 26 denotes a front-side panel, reference numeral 27 denotes a center plate, and reference numeral 28 denotes a fastening member for the fixed-side electrode 25 and the front-side panel 26.

A magnetic void portion 29 in the radial direction is formed between the outer peripheral portion of the pole piece 12 and the inner peripheral portion of the coil-side yoke material 15. Reference numeral 29a denotes a permanent magnet-side void portion, and reference numeral 29b denotes a yoke material-side void portion. A closed loop magnetic circuit is formed by "permanent magnet 11→pole piece 12→magnetic void portion 29→coil-side yoke material 15→permanent magnet-side yoke material 14". When a current flows through the force coil 16a disposed in the space of the magnetic void portion 29, a Lorentz force that moves the movable-side electrode 24 in the axial direction is generated. A void portion 30 is formed by the movable-side electrode 24 and the fixed-side electrode 25. Since the electrostatic capacitance C is determined by the size of the gap of the void portion 30, the relative displacement U-X, which is the difference between the ground motion absolute displacement U and the absolute displacement X of the mass body, can be detected by measuring the electrostatic capacitance C. The servo circuit includes a displacement detector 31, an amplifier 32, and a driver 33. The amplifier 32 and the driver 33 are displacement amplifiers that amplify the relative displacement signal U-X with a gain $K_P$. The current $i_0$ of the actuator is controlled by the amplifier having the proportional gain constant $K_P$ so that the relative displacement u-x becomes zero. By detecting the current $i_0$ flowing through the force coil 16a, the acceleration acting on the movable portion can be obtained as described above.

(5-2) Conventional Example of Swing Motion-Type Acceleration Sensor (1) Overall configuration of sensor FIG. 56 is a front cross-sectional view illustrating an example of a swing motion type disclosed in Patent Literature 2, in which reference numeral 590a is a pendulum and is located in a frame of a disc-shaped frame body 590. The pendulum 590a is formed in a tongue shape in which a part of the circumference is cut out, and is supported by the frame body 590 via the hinge 590b. The frame body 590, the pendulum 590a, and the hinge 590b are integrally formed of, for example, quartz glass. The hinge 590b is thin and elastically deformable, and the pendulum 590a can be displaced in the vertical direction in the drawing by the input acceleration.

Reference numerals 591 and 592 denote a pair of magnetic yokes, reference numeral 593 denotes a pole piece bottom, reference numeral 594 denotes a permanent magnet, and reference numeral 595 denotes a pole piece top. The permanent magnet 594 is magnetized in the plate thickness direction thereof, and an annular magnetic void 596 is formed between the inner peripheral surface of the open end of the magnetic yoke 591 and 592 and the outer peripheral surface of the pole piece top 595. Coil bobbins 598 around which the torque coil 597 is wound so as to be positioned in the annular magnetic void 596 are respectively attached to both plate surfaces of the pendulum 590a.

On both plate surfaces of the pendulum 590a, electrostatic capacitance electrodes 590c are formed in an arc shape along the outer periphery on the tip side of the tongue shape. Reference numerals 591e and 592e denote electrode surfaces facing the electrostatic capacitance electrode 590c with a predetermined interval.

In the servo-type accelerometer having such a configuration, the displacement of the pendulum 590a due to the acceleration input is detected as a change in electrostatic capacitance between the electrostatic capacitance electrode 590c and the electrode surfaces 591e and 592e. The electrode surfaces 591e and 592e are set to a common potential, detection signals of the electrostatic capacitance electrodes 590c on both plate surfaces of the pendulum 590a are differentially amplified by a servo amplifier (not illustrated), and a torque current based on a capacitance difference flows through the pair of torque coils 597. By the interaction between the torque current and the magnetic field by the permanent magnet 594, the displaced pendulum 590a returns to the original state and is balanced at the neutral point. Since the torque current at this time is proportional to the acceleration applied to the pendulum 590a, the input acceleration is obtained from this current. The coil terminals 597a and 597b of the torque coil 597 are bonded and electrically joined to a metal conductor (not illustrated) on the pendulum 590a.

(2) Structure of Pendulum

FIG. 58 illustrates a plan view of the pendulum 590a. FIG. 58 at (a) illustrates one surface, and FIG. 58 at (b) illustrates the other surface. The frame body 590, the pendulum 590a, and the hinges 590b1 and 590b2 are formed by etching from, for example, one quartz glass disc. The pendulum conductor A is formed in an arc shape with a width that is approximately half the width of the frame body 590 on the frame body 590 of one surface, and one end of the arc-shaped metal conductor is formed in a shape in which one end of the arc-shaped metal conductor is extended on one hinge 590b1 in the extending direction and folded back in a hook shape toward the center portion of the pendulum 590a after exceeding the center portion. The arc-shaped pendulum conductor A constitutes one input/output end portion of the torque current.

The pendulum conductor B is formed to have the same width as that of the pendulum conductor A from a position spaced substantially equal to an interval between bobbin conductors to be described later toward an outer edge portion of the pendulum 10a with the center of the pendulum 590a interposed therebetween from an end portion of the pendulum conductor A located in a central portion of the pendulum 590a on one surface. Further, the pendulum conductor B is formed continuously to the other surface along the side surface of the outer edge portion of the pendulum 590a at a position between the pair of hinges 590b1 and 590b2. The shape of the pendulum conductor B on the other surface is the same as the shape on the one surface described above. The pendulum conductor B connects the two left and right torque coils 597 in series.

The pendulum conductor C is formed on the other surface in substantially the same shape as the above-described pendulum conductor A. The end portion of the pendulum conductor C is formed in an arc shape with a width substantially equal to that of the frame body 590 on one surface of the frame body 590. The end portion of the pendulum conductor C on one surface and the pendulum conductor C on the other surface are continuously formed along the inner diameter side surface of the frame body 590. The arc-shaped pendulum conductor C constitutes the other input/output end of the torque current.

The electrostatic capacitance detection electrode D is formed in an arc shape along the outer edge of the pendulum 590a on one surface of the pendulum 590a, and further, an end portion is formed in an arc shape with a width of substantially half the width of the frame body 590 along the outer peripheral portion of the frame body 590 on the frame body 590 along the hinge 590b2.

In addition, the electrostatic capacitance detection electrode E is formed on the other surface of the pendulum 590a in the same manner as the capacitance detection electrode D. Further, the electrostatic capacitance detection electrode E is continuous to one surface of the frame body 590 along the side surface on the inner diameter side of the frame body 590, and has an end portion formed in an arc shape with a width substantially equal to that of the frame body 590 on the one surface of the frame body 10. End portions of the electrostatic capacitance detection electrodes D and E on one surface of the frame body 590 are connected to a servo amplifier (not illustrated).

Each of the above-described pendulum conductors is formed of a thin film in which gold (Au) is sputtered or vacuum-deposited on the surfaces of the frame body 590 made of quartz glass, the pendulum 590a, and the hinges 590b1 and 590b2.

In the linear motion-type acceleration sensor and the swing motion-type acceleration sensor described above, the difference in the basic structure between the linear motion-type acceleration sensor and the swing motion-type acceleration sensor can be classified by the elastic support method of the movable portion. In the linear motion type, the spring is disposed in the circumferential direction of the shaft center with the moving direction of the movable portion as the shaft center. The swing motion type is a structure in which the movable portion is supported by a cantilever having one end as a fixed end and the other end as a free end.

CITATION LIST

Patent Literature

Patent Literature 1: JP 2004-205284 A
Patent Literature 2: JP 2010-96509 A
Patent Literature 3: JP 2006-283966 A

SUMMARY OF THE INVENTION

Technical Problem

In the case of the linear motion-type acceleration sensor disclosed in Patent Literature 1, there is a large problem in production technology due to the basic operation principle and structure. FIG. 55 at a is a front view illustrating the shape of the front-side disc-shaped spring 20, and FIG. 55 at b is a front cross-sectional view in which the front-side panel 26, the fixed-side electrode 25, and the like are removed from the above-described overall sensor view (FIG. 54). FIG. 55 at c is an enlarged view of a portion A in FIG. 55 at b, and is a view illustrating a state in which the movable-side electrode 24 is deformed in the axial direction.

In order to connect each terminal of the force coil 16a and the verification coil 16b to an externally installed control circuit, four conductive paths are required. When a conductive path connecting the movable-side electrode 24 and the displacement detector 31 (FIG. 54) is further included, a total of five independent conductive paths are required. Since the two coils and the movable-side electrode move in the axial direction, the five terminals and the external fixed portion cannot be connected by a lead wire. Therefore, as illustrated in FIG. 55 at a and 55 at c, the five conductive paths are formed using the front-side disc-shaped spring 20 and the rear-side disc-shaped spring 21. That is, the two disc-shaped springs 20 and 21 are formed to serve as elastic support of the movable portion (coil bobbin 17, movable-side electrode 24, and the like) and the five independent conductive paths.

In FIG. 55 at a, reference numerals 34a, 34b, and 34c denote outer peripheral-side fixed portions of the front-side disc-shaped spring 20. The three outer peripheral-side fixed portions are cut at three positions in the circumferential direction in order to achieve electrical insulation as indicated by a chain line circle AA. Reference numerals 35a, 35b, and 35c denote inner peripheral-side spring portions of the front-side disc-shaped spring. The three inner peripheral-side spring portions are cut at three locations in the circumferential direction in order to achieve electrical insulation as indicated by a chain line circle BB. Reference numerals 36a, 36b, and 36c denote soldering portions for electrically connecting the coil terminals and the inner peripheral-side spring portion. FIG. 55 at c illustrates a state in which the terminal of the verification coil 16b and the inner peripheral-side spring 35c are conducted by the soldering portion 36c. Incidentally, the coil wire diameter used in the servo-type acceleration sensor is, for example, an extra-fine wire of about 30 μm.

That is, the conventional servo-type acceleration sensor requires a process of "cutting, insulation, and soldering" between the disc-shaped spring and the coil as a problem in production technology caused by the basic operation principle and structure. This complicated process has been a main factor of lowering the yield at the time of mass production and lowering the reliability. Considering the long-term reliability, the small diameter disc-shaped spring applied to the linear motion-type acceleration sensor must be a metallic material. This is because the mechanical resonance frequency determined by the inertial mass and the spring rigidity of the movable portion is sufficiently low from the viewpoint of performance of the sensor, and the value of the spring rigidity needs to be set small. The small-diameter disc-shaped spring is greatly deformed by a small external force. Therefore, it is difficult to adopt a structure in which a non-metallic material (for example, quartz glass) and a conductive thin film (conductive path) are combined as used in a swing motion-type acceleration sensor.

The reason why the conventional swing motion-type acceleration sensor disclosed in Patent Literature 2 uses a thin film method requiring expensive processing equipment such as sputtering and vacuum deposition is that (i) a conductive path connecting a pair of swing torque coils and an external control circuit, (ii) a conductive path connecting a capacitance electrode formed on the surface of the swinging pendulum 590a and the external control circuit, and (i) and (ii) described above are required. The plurality of independent conductive paths are formed in a thin film on the surface using the thin hinges 590b1 and 590b2 that elastically deform. FIG. 57 is an enlarged view illustrating a state in which the pendulum 590a swings.

Other than this method, for example, a method is assumed in which a plurality of thin conductive wires (wires) are soldered to the moving member side and the fixed member side, or connected by a conductive adhesive or the like. In this case, a spring load due to deformation of the wire is added in parallel to the spring rigidity of the hinge portion, and affects the mechanical resonance frequency. In addition, deterioration of reliability such as fatigue fracture due to repeated stress applied to the wire cannot be avoided.

Therefore, in any servo-type acceleration sensor of the linear motion type or the swing motion type, a conductive path through which a plurality of signals connecting the movable member side and the fixed side flows must be formed using an elastic member connecting both. As a result, since a complicated structure and a production method are required, the cost is increased, which is a major factor of lowering the yield and reliability at the time of mass production.

As an example of configuring the active vibration isolator, four-point support active control is assumed. In this case, the actuators are arranged at four corners, and installation orientations of the actuators are two points in the horizontal X direction and two points in the Y direction are diagonally arranged. Each actuator also incorporates an actuator that supports a load in the Z direction. Further, a total of eight actuators are thus arranged, requiring eight acceleration sensors for controlling each actuator. If a sensor for detecting the acceleration of the floor surface is further included, a total of nine expensive acceleration sensors are required. Therefore, in the case of the multi-axis control active vibration isolator, there is a serious problem that the cost ratio to the total is high due to the large number of required acceleration sensors.

Solution to Problem

As described above, the difficulty of the wiring process, which is a main factor of the yield reduction, is an inevitable problem of the moving coil type (MC type) caused by the movement of the coil of the movable portion. Returning to the origin that brings this problem, the present invention has focused on the fact that the actuator portion of the servo-type acceleration sensor forms a closed loop magnetic circuit with three elements, that is, a "permanent magnet", a "coil", and a "yoke material". If the "coil", which is one of the three elements, is fixed, the fatal problem of the moving coil type (MC type), that is, the difficulty of the wiring process, which is the main factor of the yield reduction, is solved at once.

However, a servo-type vibration detector of the invention according to claim 1 includes: a fixed member; a movable member provided to be movable in a predetermined direction with respect to the fixed member, the movable member being configured to allow a magnetic flux to flow inside the movable member; an elastic member supporting the fixed member such that the movable member is disposed with a void portion interposed; a displacement detecting unit detecting displacement of the movable member in the predetermined direction; and a drive means configured to generate an electromagnetic force for returning the movable member to an origin position when the displacement detecting unit detects a relative displacement of the movable member from the origin position. The drive means includes: a coil fixed to the fixed member, and the movable member includes: at least a movable-side yoke material constituting a part of a closed loop magnetic circuit.

That is, in the present invention, the coil is fixed to the fixed member side, the permanent magnet is arranged such that the magnetic flux flows in the void between the fixed member and the movable member, and the movable member is formed only of the permanent magnet and the yoke material, or the yoke material. The movable member is driven by an electromagnetic force generated by forming a closed loop magnetic circuit. According to the present invention, a complicated wiring process of a moving coil type becomes unnecessary in a production process, and a mass production method can be greatly simplified and a production cost can be reduced.

In the servo-type vibration detector of the invention according to claim 2, the movable member further includes: a permanent magnet forming the closed loop magnetic circuit. The movable-side yoke material is connected to any one of magnetic pole surfaces of the permanent magnet, and the movable-side yoke material is disposed in the coil. The drive means is configured to move the permanent magnet and the movable-side yoke material in the predetermined direction by a reaction force of a Lorentz force received by a conductive wire through which a current flows in a magnetic field by applying a current to the coil.

That is, in the present invention, when a current flows through a conductor placed in a magnetic field, the Lorentz force that is an electromagnetic force is generated in the conductor. Regardless of the type of driving principle of any actuator, the force relationship between the fixed side and the moving side is relative. That is, in the present invention, a reaction force of the Lorentz force that moves the permanent magnet in the axial direction when a current flows through the coil arranged in a fixed manner is used.

The servo-type vibration detector of the invention according to claim 3 further includes: a permanent magnet that is fixed to the fixed member and forms the closed loop magnetic circuit. The movable-side yoke is provided to be separated from any one of magnetic pole surfaces of the permanent magnet, and the movable-side yoke material is disposed in the coil. The drive means is configured to move the movable-side yoke material in the predetermined direction by a reaction force of a Lorentz force received by a conductive wire through which a current flows in a magnetic field by applying a current to the coil.

That is, in the present invention, an actuator of a servo-type acceleration sensor is configured by fixing not only a coil but also a permanent magnet and moving only a yoke material. That is, it is a proposal of a moving yoke type (MY type (provisional name)), which is also referred to as a "third linear motor". The characteristics of the MY-type acceleration sensor include:

(1) the weight of the movable portion mass can be reduced similarly to the MC type; and
(2) similarly to the MM type, the ultrafine wire processing of the coil is unnecessary.

That is, it is possible to eliminate both disadvantages of the MM type and the MC type and to combine both advantages.

In the servo-type vibration detector of the invention according to claim 4, the displacement detecting unit includes: a movable-side electrode provided on the movable member; and a fixed-side electrode fixed to the fixed member so as to face the movable-side electrode. Displacement of the movable member is detected based on a change in electrostatic capacitance formed between the movable-side electrode and the fixed-side electrode.

That is, the present invention can realize a high-resolution servo-type acceleration sensor by applying a capacitance type that can obtain the highest detection accuracy among various sensors.

In the servo-type vibration detector of the invention according to claim 5, the void portion includes a first void portion and a second void portion forming a radial void between the movable member and the fixed member in the closed loop magnetic circuit. The first void portion includes a coil for generating the Lorentz force which is fixedly arranged in the first void portion. The second void portion is a magnetic coupling portion for causing a magnetic flux to flow between the movable member and the fixed member.

That is, in the present invention, in the conventional MC type, the number of void portions forming the closed loop magnetic circuit is only one, whereas in the case of the MM type or the MY type of the present invention, two void portions are required to form the closed loop magnetic circuit. By providing a sub void portion (second void portion) as a "magnetic coupling portion" with respect to a main void portion (first void portion) in which a coil is interposed, the coil can be fixed and installed in a magnetic field having a high magnetic flux density, and the Lorentz force can be generated in the coil.

In the servo-type vibration detector of the invention according to claim 6, a closed loop magnetic circuit is configured by a pole piece that is connected to any one of magnetic pole surfaces of the permanent magnet and constitutes a part of the movable-side yoke material, the coil that is fixedly arranged on the fixed member via the pole piece or a radially opposing surface of the permanent magnet and the first void portion, and the magnetic coupling portion provided such that a magnetic flux flows between another magnetic pole surface of the permanent magnet and the fixed member, wherein the closed loop magnetic circuit is formed by the permanent magnet, the pole piece, the first void portion, the fixed member, and the magnetic coupling portion.

That is, in the present invention, the magnetic coupling portion is provided such that a magnetic flux flows between the other magnetic pole surface of the permanent magnet as the movable member and the fixed member. The magnetic coupling portion, the permanent magnet, the pole piece, the void portion, and the fixed member form a closed loop magnetic circuit for driving the pole piece with Lorentz force.

In the servo-type vibration detector of the invention according to claim 7, a pole piece constituting a part of a movable-side yoke material, the coil fixedly arranged on the fixed member in a void portion between the pole piece and the fixed member, and the pole piece are disposed with any one of magnetic pole surface of the permanent magnet and the magnetic coupling portion interposed therebetween. The permanent magnet is fixedly arranged such that a magnetic flux flows between another magnetic pole surface of the permanent magnet and the fixed member, and a closed loop magnetic circuit is formed by the permanent magnet, the magnetic coupling portion, the pole piece, and the fixed member.

That is, in the present invention, one magnetic pole surface of the permanent magnet which is a fixed member forms a magnetic path with the pole piece via the magnetic coupling portion which is a movable member, and one magnetic pole surface of the permanent magnet forms a closed loop magnetic circuit so that a magnetic flux flows with the fixed member.

In the servo-type vibration detector of the invention according to claim 8, the pole piece is configured to have a substantially cylindrical shape.

That is, the present invention has found that the following effects can be obtained by forming the pole piece into a cylindrical shape and making the thickness of the cylindrical portion thin and long.

(1) A force constant (electromechanical conversion efficiency) of the voice coil motor can be increased.
(2) The increase in the movable portion inertial mass can be reduced.
(3) Even when the generated force is increased by increasing the number of coil turns, heat generation can be suppressed.

In the above (1), it has been found that the influence of the leakage magnetic flux on the generated force can be reduced by lengthening the pole piece. In the above (2), even if the pole piece is lengthened, an increase in mass is small if the thickness of the cylindrical part is thin. The above (3) utilizes the fact that the coil housing space on the opposing surface can be increased by lengthening the pole piece. That is, the coil wire diameter is increased to suppress an increase in electrical resistance of the coil due to an increase in the number of coil turns. Therefore, according to the above (1) to (3), the problem caused by the mass increase (UP) of the movable portion by replacing the MC type with the MM type is solved. According to the present invention, it is possible to realize an MM-type acceleration sensor capable of obtaining signal transmission characteristics extending to a high frequency range (for example, 400 to 500 Hz or more) and high responsiveness.

The servo-type vibration detector of the invention according to claim 9 includes: the permanent magnet magnetized in an axial direction; the pole piece connected to one magnetic pole surface of the permanent magnet; the coil fixedly arranged on an inner surface of the housing on a radially opposing surface of the pole piece with a void portion interposed therebetween; and the magnetic coupling portion provided such that a magnetic flux flows between another magnetic pole surface of the permanent magnet and the housing.

That is, according to the present invention, a servo-type acceleration sensor can be realized with a simple component configuration by a configuration in which the permanent magnet magnetized in the axial direction and the pole piece are connected.

In the servo-type vibration detector of the invention according to claim 10, $\delta_1 > \delta_2$, where $\delta_1$ and $\delta_2$ are radial separation distances between the movable member and the fixed member in the first void portion and the second void portion, respectively.

That is, in the present invention, by making the gap (sub gap portion) of the magnetic coupling portion narrower than the void portion (main gap portion) and making the magnetic resistance of the magnetic coupling portion smaller than that of the void portion, the influence of the magnetic coupling portion on the generated force can be reduced.

In the servo-type vibration detector of the invention according to claim 11, when a movable portion mass including the movable-side magnetic material member is m, a mass of the permanent magnet is $m_p$, a lower limit value $m_{min}$ of the movable portion mass is $2m_p$, $K_{PT}$ is an electrical gain determined by a product of a position sensor sensitivity $K_S$, an adjustment gain $K_C$, and a proportional gain $K_P$, $K_t$ is an actuator force constant, $R_a$ is an electrical resistance of the coil, $K_T = K_{PT} K_t / R_a$, $f_0$ is a resonance frequency required for an acceleration sensor, and an upper limit value $m_{max}$ of the movable portion mass is $m_{max} = K_T/(2\pi f_0)^2$, $m_{min} \leq m \leq m_{max}$ is set.

That is, the present invention focuses on the fact that the lower limit value of the movable portion mass m of the MM-type acceleration sensor is based on the mass $m_p$ of the permanent magnet. By devising the shape of the magnetic material member (pole piece) connected to the permanent magnet, it is possible to obtain the generated force of the actuator of more than that of the conventional MC type and to set the lower limit value $m_{min}$ of the movable portion mass m to $2m_p$. The upper limit value $m_{max}$ of the movable portion mass m can be determined by setting the resonance frequency $f_0$ required for the acceleration sensor, and by the electric gain $K_{PT}$ of the control circuit, the force constant $K_t$ of the actuator, and the electrical resistance $R_a$ of the coil.

In the servo-type vibration detector of the invention according to claim 12, the magnetic coupling portion includes an auxiliary permanent magnet magnetized in a radial direction, and an auxiliary coil fixedly arranged on an inner surface of the housing on a radially opposing surface of the auxiliary permanent magnet via a void portion.

That is, in the present invention, the magnetic coupling portion includes an auxiliary permanent magnet magnetized in the radial direction and an auxiliary coil disposed on an opposing surface of the auxiliary permanent magnet. With this configuration, since the magnetic coupling portion functions as a sub actuator, the generated force of the drive unit can be improved. In addition, since the air gap between the auxiliary permanent magnet and the auxiliary coil can be set sufficiently large, assembly work is facilitated. When the axis of the movable portion is eccentric with respect to the fixed side, the generated force in the radial direction applied to the movable portion is also small.

In the servo-type vibration detector of the invention according to claim 13, the closed loop magnetic circuit includes a first transmission portion and a second transmission portion that transmit a magnetic flux in a radial direction between the movable member and the fixed member. The first transmission portion has a void in a radial direction between the movable member and the fixed member, and the coil for generating the Lorentz force is fixedly arranged in the void. The second transmission portion is fixed between the movable member and the fixed member by a disc-shaped spring made of a magnetic material in which a magnetic flux flows in a radial direction, and the disc-shaped spring also serves as the elastic member that supports the movable member.

That is, in the present invention, the first transmission portion is not a void but a magnetic path in which a disc-shaped spring itself made of a magnetic material forms a closed loop magnetic circuit. According to the present embodiment that does not require a magnetic coupling portion, a servo-type acceleration sensor can be realized with a simple configuration.

In the servo-type vibration detector of the invention according to claim 14, the permanent magnet is a front-side permanent magnet, the coil is a front-side coil, the magnetic coupling portion includes a rear-side permanent magnet magnetized in a radial direction, the pole piece connected to one magnetic pole surface of the rear-side permanent magnet, and a rear-side coil fixedly arranged on an inner surface of the housing via the void portion on a radially opposing surface of another magnetic pole surface of the rear-side permanent magnet, and a closed loop magnetic circuit is configured by the front-side permanent magnet, the void portion, the housing, the void portion, the rear-side permanent magnet, and the pole piece.

That is, in the present invention, the front-side permanent magnet is configured by a magnet magnetized in the radial direction, and the magnetic coupling portion is configured by a magnet magnetized in the radial direction and a fixed coil. Since both the front side and the rear side function as voice coil motors, the generated force can be improved. In addition, the radial gap of the magnetic void portion between the coil mounting portion and the two permanent magnets can be sufficiently large, for example, δ=about 0.5 mm. Compared with the above-described embodiment in which the annular void portion is formed with a narrow gap, assembly at the time of mass production is facilitated.

In the servo-type vibration detector of the invention according to claim 15, the elastic member is made of a conductive material having a substantially flat plate annular shape, and at least an outer peripheral side of the elastic member is fixed to the fixed member with a non-conductive material interposed therebetween.

That is, in the present invention, the elastic member (disc-shaped spring) is electrically insulated from the fixed side supporting the elastic member as a conductive path connecting the movable-side electrode and the outside. Therefore, a minute electrostatic capacitance signal between the fixed-side electrode and the movable-side electrode can be detected without being affected by disturbance noise.

In the servo-type vibration detector of the invention according to claim 16, a non-conductive material is interposed between the movable-side electrode and the pole piece.

That is, in the present invention, although an eddy current is generated on the surface of the pole piece, since the movable-side electrode and the pole piece are electrically insulated from each other, the electrostatic capacitance signal can avoid the influence of the eddy current.

In the servo-type vibration detector of the invention according to claim 17, a differential sensor is configured by detecting an output difference between two sets of electrostatic capacitance sensors including a movable-side electrode member provided on each of two end surfaces of the movable member, a fixed-side electrode member provided on the fixed member so as to face the movable-side electrode member, and the electrostatic capacitance sensor being formed between electrode surfaces of the movable-side electrode member and the fixed-side electrode member.

That is, the present invention focuses on the structural characteristics of the linear motion MM type or the MY type in which both the left and right output shafts are open ends, electrodes for detecting electrostatic capacitance are provided at two positions on the left and right to configure a differential electrostatic capacitance-type sensor.

In the servo-type vibration detector of the invention according to claim 18, two flat plate-shaped movable-side electrode members are provided at a one-side axial end portion of the movable member with a gap interposed therebetween, the plate-shaped fixed-side electrode member is disposed in the gap so as to be sandwiched between the two movable-side electrode members, a first electrostatic capacitance sensor is configured between an electrode surface Sa of the movable-side electrode member and an electrode surface SA of the fixed-side electrode member facing each other, and a second electrostatic capacitance sensor is configured between an electrode surface SB of a back surface of the electrode surface SA and an electrode surface Sb of the movable-side member facing each other.

That is, in the present invention, two sets of electrostatic capacitance sensors are constituted by two movable-side electrodes provided at the one-side axial end portion of the movable portion and one fixed-side electrode. The present invention can also be applied to an acceleration sensor having an actuator that can use only one main end of one axis on one side.

In the servo-type vibration detector of the invention according to claim 19, one flat plate-shaped movable-side electrode member is provided at an end portion of the movable member, electrode surfaces SAA and SBB are formed on front and back surfaces of the movable-side electrode member, the two flat plate-shaped fixed-side electrode members are arranged so as to sandwich the movable-side electrode member with a gap interposed therebetween, a first electrostatic capacitance sensor is configured between electrode surfaces Saa of the fixed-side electrode member facing the electrode surface SAA, and a second electrostatic capacitance sensor is configured between electrode surfaces Sbb of the fixed-side electrode member facing the electrode surface SBB.

That is, in the present invention, two sets of electrostatic capacitance sensors are constituted by one movable-side electrode provided at the one-side axial end portion of the movable portion and two fixed-side electrodes. Similarly to the above-described embodiment, the present invention can also be applied to an acceleration sensor having an actuator that can use only the main end of one axis on one side.

In the servo-type vibration detector of the invention according to claim 20, the coil is housed in a non-magnetic metal bobbin, and the metal bobbin is fitted to an inner surface of a hollow cylindrical portion of the fixed member.

That is, a non-magnetic material having good thermal conductivity (for example, an aluminum material) is used for the coil bobbin, and the coil bobbin is attached in close contact with the inner surface of the housing. As a result, since the heat generated by the coil can be easily dissipated, sensor noise leading to thermal noise can be reduced. In the case of the conventional MC type sensor, the coil bobbin and the coil are installed in a floating state in the air. Since the member supporting the coil bobbin is non-magnetic and is made of a non-conductive material, the heat dissipation effect of the coil due to heat conduction cannot be expected. The present invention utilizes MM-type structural features to which a coil can be fixed.

In the servo-type vibration detector of the invention according to claim 21, a recessed portion in which a radial distance between the movable member and the fixed member is larger than both ends is formed on an inner surface of the fixed member in a vicinity of an axial end surface of the coil in close contact with the inner surface of the housing.

That is, the present invention focuses on the point that the magnetic flux flowing vertically through the magnetic void portion effectively contributes to the generated force of the actuator, whereas the magnetic flux flowing from the corner of the coil opposing surface to the corner of the inner peripheral surface of the coil-side yoke material is leakage magnetic flux and does not contribute to the generated force. The recessed portion formed in the coil-side yoke material greatly contributes to reduction of leakage magnetic flux.

In the servo-type vibration detector of the invention according to claim 22, at least one of a portion between the permanent magnet and the pole piece, a portion between a coil bobbin housing the coil and the fixed member, a portion between the elastic member and the fixed member, or a portion between the elastic member and the pole piece is fastened by a bolt having a length of M 0.5 to M 1.0 mm.

That is, in the present invention, a minimum bolt fastening method of M 0.5 to M 1.0 mm, which is applied in a special field such as a watch, is applied to an acceleration sensor including micro components. The reason why the minimum bolt fastening method can be applied is that attention is paid to the characteristics of the MM type in which the ultrafine wire processing is unnecessary and the component configuration of the movable portion can be simplified.

In the case of a conventional acceleration sensor that forms a product by a bonding method, a product body must be discarded if the product is rejected at the stage of quality evaluation during mass production. In the sensor of the present invention, many parts can be reused, and the yield at the time of mass production can be greatly improved. In addition, in the case of the bonding method, the thickness of the adhesive interposed between the parts to be bonded and the non-uniformity of the thickness have been factors that lower the assembly accuracy. In the case of the present invention, high assembly accuracy can be secured as long as processing accuracy of each component is obtained. In addition, since the operator is not required to have skill, variations in product performance can be reduced.

In the servo-type vibration detector of the invention according to claim 23, the elastic member is formed of a disc-shaped conductive material, and an inner peripheral portion and an outer peripheral portion of the elastic member have a structure integrated with a thin plate material made of a non-conductive material.

That is, the present invention combines the respective advantages of the bonding method and the bolt fastening method. For example, in the assembly preparation stage, a conductive material (metal) and an insulating material (ceramics or the like) are integrated in advance with an adhesive in a component that needs to be electrically insulated. By shifting to the bolt fastening method through this process, the production process can be efficiently advanced with a simple configuration.

The servo-type vibration detector of the invention according to an invention of claim 24 further includes: a movable unit including at least the movable member and to which a movable-side electrode is attached; and a fixed unit to which a fixed-side electrode arranged to face the movable-side electrode is attached. The displacement detecting unit is formed to detect electrostatic capacitance formed between the movable-side electrode and the fixed-side electrode. A fitting structure is formed between the movable unit and the fixed unit so that the movable unit and the fixed unit can move in a relative axial direction in a state where relative radial movement between the movable unit and the fixed unit is restricted. A groove portion for bonding and fixing the movable unit and the fixed unit is formed on outer surfaces of the movable unit and the fixed unit.

That is, by applying the bonding method in the final assembly stage by the application of the present invention, it is possible to achieve a structure in which the gap between the movable-side electrode and the fixed-side electrode can be adjusted to an optimum value while the electrostatic capacitance is actually measured. By this method, all errors accumulated in the final process can be absorbed. For example, when the ultraviolet curable adhesive is irradiated with an LED light to cure the adhesive at the time when the electrostatic capacitance reaches the target value, the two units can be fastened.

In the servo-type vibration detector of the invention according to claim 25, the fixed member, the bolt, and the elastic member made of a conductive material are bonded and fixed to the elastic member by a thin plate made of a non-conductive member. The non-conductive member is bolted to the fixed member. A head of the bolt is configured to be electrically non-contact with the elastic member.

That is, in the present invention, the elastic member (disc) is used as a conductive path of an electrostatic capacitance signal between electrodes, and the elastic member is fastened to the housing so as to be in electrical non-contact using a metal bolt and a non-conductive member (for example, ceramics). With this method, a minute electrostatic capacitance signal can be transmitted without being affected by disturbance noise.

In the servo-type vibration detector of the invention according to claim 26, the elastic member includes a cantilever having one fixed end and another free end, and the movable member is provided on a free end side of the cantilever.

That is, in the present invention, a cantilever beam (pendulum structure) having one fixed end and the other free end is applied to the elastic member. Since the cantilever structure enables low rigidity support with a simple configuration, the resonance frequency (eigenvalue) of the movable portion can be set sufficiently small.

In the servo-type vibration detector of the invention according to claim 27, a part of the cantilever is made of a conductive material to form a signal transmission path that connects a signal of the displacement detecting unit to the fixed member side.

That is, the present invention utilizes a feature of the MM type for fixing the coil, in which only one electrostatic capacitance signal needs to be extracted from the movable side that swings. In the case of the MC type in which the coil moves, a plurality of signal transmission paths are formed on a cantilever made of a non-conductive material such as quartz glass using a thin film forming technique. In the case of the sensor of the present invention, a conductive (metal) material can be applied to the cantilever.

In the servo-type vibration detector of the invention according to claim 28 in the magnetic coupling portion, as a radial rigidity $K_r$ of the elastic member, a negative spring rigidity $K_{mr}=F_r/\delta_r$ is defined where $F_r$ is a radial generated force due to a magnetic attractive force when a misalignment amount of an axis of a movable-side magnetic material member with respect to an axis of a fixed-side magnetic material member is $\delta_r$, and $K_r>K_{mr}$ is satisfied.

That is, in the present invention, in the magnetic coupling portion, when the component accuracy and the assembly accuracy are not sufficiently obtained and the axial centers on the fixed side and the movable side are eccentric, the magnetic attractive force $F_r$ in the centrifugal direction is generated. When the disc specification is selected such that the centripetal direction rigidity of the disc satisfies $K_r > K_{mr}$ with the negative spring rigidity $K_{mr} = F_r/\delta_r$ formed by the magnetic circuit, the magnetic coupling portion can maintain a stable state.

In the servo-type vibration detector of the invention according to claim 29, the magnetic coupling portion includes the permanent magnet magnetized in a radial direction, and an outer peripheral surface of the pole piece arranged while maintaining a void with an inner peripheral surface of the permanent magnet so as to configure an MY type acceleration sensor.

That is, in the present invention, a magnetic circuit is configured using a plurality of segment-type permanent magnets magnetized in the radial direction. Therefore, in a state where no current is applied to the force coil, the electromagnetic force in the axial direction is not generated in the pole piece, and the pole piece can be maintained at the same position.

In the servo-type vibration detector of the invention according to claim 30, the magnetic coupling portion includes the permanent magnet magnetized in an axial direction, a pole piece-side yoke material disposed to be connected to any one of magnetic pole surfaces of an N pole and an S pole of the permanent magnet, and an inner peripheral surface of the pole piece disposed while maintaining a void in a radial direction with respect to an outer peripheral surface of the pole piece-side yoke material.

That is, in the present invention, a magnetic circuit is configured using a permanent magnet magnetized in the axial direction. The magnetic circuit can have a simple configuration, and the performance of the permanent magnet can be selected in a wide range. Since there are no restrictions on the size and shape of the permanent magnet, demagnetization characteristics (Holding force $H_c$, saturation magnetic flux density $B_r$), which are the characteristics of the permanent magnet, can be widely selected. Since there is a margin in the performance of the permanent magnet, the void portion in the magnetic coupling portion may be sufficiently large. Although the void portion becomes a magnetic resistance, performance of the permanent magnet sufficient to compensate for the loss can be obtained.

A servo-type vibration detector of the invention according to claim 31 includes: a fixed member; a movable member provided to be movable in a predetermined direction with respect to the fixed member, the movable member being configured to allow a magnetic flux to flow inside the movable member; an elastic member supporting the fixed member such that the movable member is disposed with a void portion interposed therebetween; a displacement detecting unit detecting displacement of the movable member in the predetermined direction; and a drive means configured to generate an electromagnetic force for returning the movable member to an origin position when the displacement detecting unit detects a relative displacement of the movable member from the origin position. The displacement detecting unit includes: a movable-side electrode member having two electrode surfaces provided on the movable member; and a fixed-side electrode member having two electrode surfaces provided on the fixed member. Two sets of electrostatic capacitance sensors are configured by a combination in which each electrode surface of the movable-side electrode member and each electrode surface of the fixed-side electrode member face each other. The movable-side electrode member and the fixed-side electrode member are arranged such that a gap between electrode surfaces of each of the two sets of electrostatic capacitance sensors changes in opposite phases by movement of the movable member in a predetermined direction, and a difference between output signals of the two sets of electrostatic capacitance sensors is taken to configure a differential sensor.

That is, according to the present invention, by making the acceleration sensor differential, it is possible to realize a highly sensitive sensor in which the sensor output is hardly affected by disturbance signals such as noise and drift.

The absolute speed signal and the absolute displacement signal obtained by completely integrating the acceleration output of the sensor of the present invention do not diverge easily. Therefore, in a case where the sensor of the present invention is applied to an active vibration isolator, in addition to the effect of improving the sensor sensitivity (for example, the positioning accuracy of the stage is improved), a significant vibration isolation characteristic improvement effect can be obtained in a low frequency region.

A vibration control device of the invention according to claim 32 includes: a servo-type vibration detector of the invention according to claim 31; and a controller that performs absolute speed feedback or absolute displacement feedback by using an absolute speed signal obtained by integrating an acceleration signal output from the servo-type vibration detector once and/or an absolute displacement signal obtained by integrating the acceleration signal twice in order to obtain vibration removal performance of a low frequency range.

That is, in the present invention, noise and drift commonly applied to the two electrode outputs are canceled by taking a difference between the two sets of electrode outputs in which the gap changes in opposite phases.

As a result, the absolute speed signal and the absolute displacement signal obtained by completely integrating the acceleration output do not diverge. In a case where the acceleration sensor of the present embodiment is applied to the active vibration isolator, in addition to the effect (for example, the positioning accuracy of the stage is improved) by improving the sensor sensitivity, a significant vibration isolation characteristic improvement effect can be obtained in the low frequency region.

A servo-type vibration detector according to claim 33, includes: a fixed member; a movable member provided to be movable in a predetermined direction with respect to the fixed member, the movable member being configured to allow a magnetic flux to flow inside the movable member; an elastic member supporting the fixed member such that the movable member is disposed with a void portion interposed therebetween; a displacement detecting unit detecting displacement of the movable member in the predetermined direction; and a drive means configured to generate an electromagnetic force for returning the movable member to an origin position when the displacement detecting unit detects a relative displacement of the movable member from the origin position. An attractive force generation unit A is configured to form an electromagnet by forming a fixed-side yoke material provided to penetrate a coil, a movable-side yoke material disposed with an open end of the fixed-side yoke material and a void, and a closed loop magnetic circuit with the fixed-side yoke material, the void portion, and the movable-side yoke material to attract the movable member including the movable-side yoke material to the coil side. An attractive force generation unit B that generates a force in a direction opposite to that of the attractive force generation unit A is arranged with the movable member interposed therebetween, and a current flowing through the coil is controlled to constitute the drive means by a Maxwell stress that moves the movable member in an axial direction.

That is, in the present invention, the magnetic attractive force by the Maxwell stress is used to drive the movable portion. When the external dimensions of the actuators are compared under the same conditions, in the Maxwell stress, the electromechanical conversion efficiency (thrust constant) of the generated force with respect to the input current is overwhelmingly higher than that of the Lorentz force, and is usually 20 times or more. By using this point, the acceleration sensor of the present embodiment can extremely increase the upper limit value of the measurable acceleration.

Advantageous Effects of Invention

In the servo-type vibration detector according to the present invention, since the yoke or the permanent magnet is configured to be movable in a state where the coil is fixed, complicated wiring processing as in the conventional moving coil servo-type vibration detector is unnecessary, and the mass production method can be greatly simplified and the production cost can be reduced.

BRIEF DESCRIPTION OF THE DRAWINGS

FIG. 20 is a servo-type acceleration sensor according to a seventh embodiment of the present invention, in which FIG. 20 at a is a front cross-sectional view, and FIG. 20 at b is a cross-sectional view taken along line A-A of FIG. 20 at a.

FIG. 47 illustrates a servo-type acceleration sensor according to a twentieth embodiment of the present invention, in which FIG. 47 at a is a front cross-sectional view, and FIG. 47 at b is a cross-sectional view taken along line AA of FIG. 47 at a.

Figure 1:
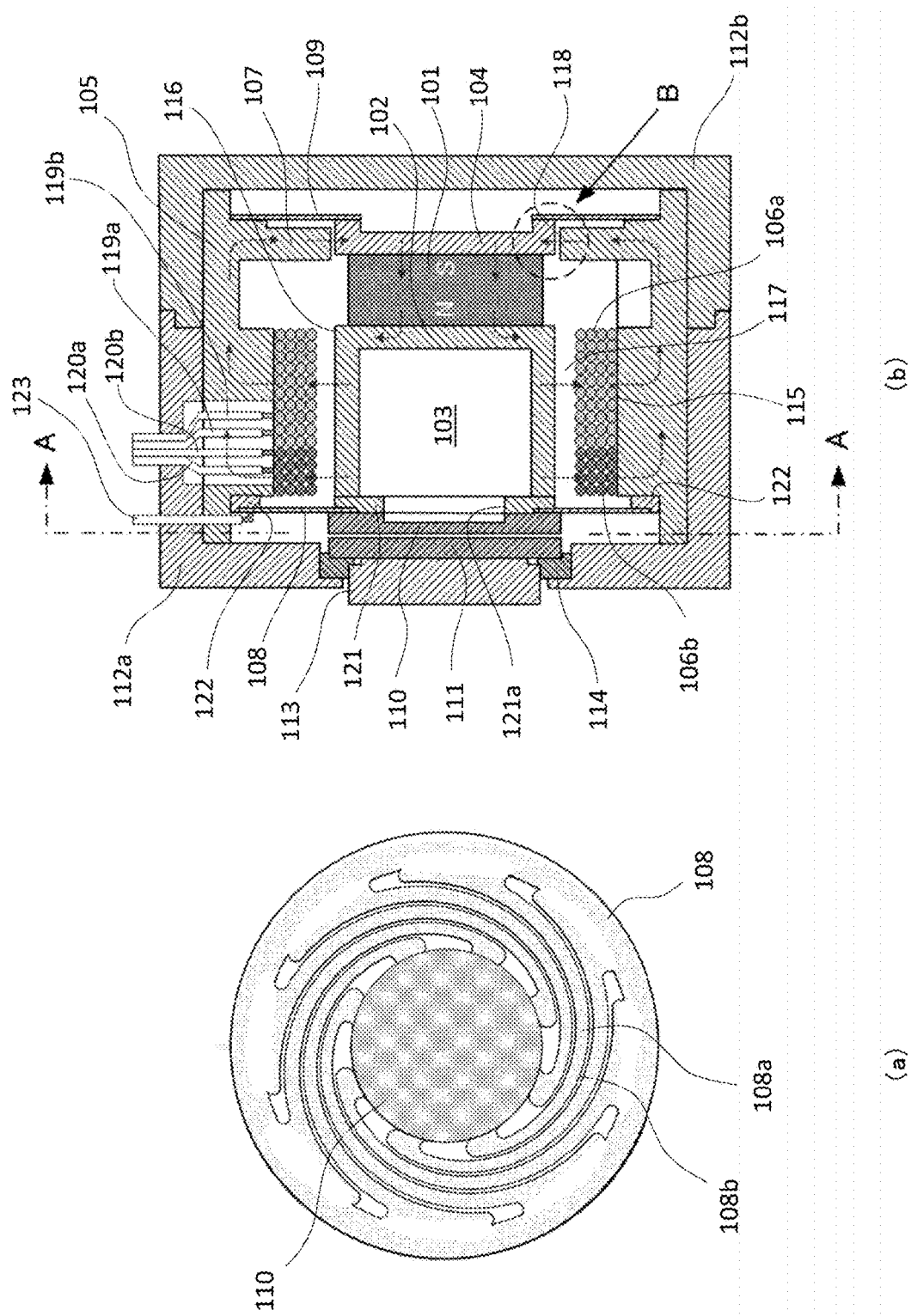
FIG. 1 illustrates a servo-type acceleration sensor according to a first embodiment of the present invention, in which FIG. 1 at a is a view taken along arrow AA in FIG. 1 at b, and FIG. 1 at b is a front cross-sectional view of a sensor body.

LIST OF REFERENCE CHARACTERS 101 permanent magnet
102 movable-side member
105 fixed-side member
116, 104 movable-side yoke material
106 coil
110 movable portion of displacement detector
117 void portion

DESCRIPTION OF EMBODIMENTS

Returning to the origin, attention is paid to the fact that an actuator portion of the servo-type acceleration sensor forms a closed loop magnetic circuit with three elements, namely, "permanent magnet", "coil", and "yoke material". If the "coil", which is one of the three elements, is fixed, the fatal problem of the moving coil type (MC type), that is, the difficulty of the wiring process, which is the main factor of the yield reduction, is solved at once. Hereinafter, the present invention will be described in two steps.

(I) Moving Magnetic Type (MM type) Acceleration Sensor (II) Moving Yoke Type (MY type) Acceleration Sensor First, the above (I) will be described.

First Embodiment

The present embodiment focuses on a moving magnet type (MM type) in which an ultrafine wire processing is unnecessary because a permanent magnet moves and a coil is fixed. The conventional servo-type acceleration sensor is a moving coil type (MC type) in which the coil linearly moves in the axial direction or swings, whereas in the present embodiment, the coil is fixed and the permanent magnet moves in the axial direction. Thus, the servo-type acceleration sensor of the MM type has no precedent in the past. The reason for this is considered to be a fixation (blind spot) that can be said to be an implicit premise that "In the MM type, since the inertial mass of the movable portion increases, transmission characteristics and high-speed responsiveness in a high frequency range are disadvantageous." The present invention solves this "blind spot" by the following ingenuity. That is, in the present embodiment, (i) the configuration of the magnetic circuit that can reduce the weight of the movable portion, (ii) the magnetic pole shape that reduces the influence of the leakage magnetic flux, and (iii) the coil housing volume increase are used to solve the weak point of the MM type and achieve the sensor performance superior to the MC type by devising the coil specification that achieves both the generated force UP and the heat generation suppression. Hereinafter, the specific structure and structural features of the present embodiment will be described in the following (1), and the effect of the present invention on the basic performance of the acceleration sensor will be verified by theoretical analysis in the following (2).

(1-1) Specific Structure of Present Embodiment

FIG. 1 illustrates an example of a servo-type acceleration sensor according to the first embodiment of the present invention, in which FIG. 1 at a is an external view obtained by extracting only a spiral disc to be described later from a view taken along arrow AA of FIG. 1 at b, and FIG. 1 at b is a front cross-sectional view of a sensor body.

Reference numeral 101 denotes a permanent magnet, reference numeral 102 denotes a front-side pole piece, and reference numeral 103 denotes a cylindrical void portion (an inertial mass adjustment portion to be described later) formed to reduce the weight of the front-side pole piece. Reference numeral 104 denotes a rear-side pole piece, reference numeral 105 denotes a coil-side yoke material, reference numeral 106a denotes a force coil, reference numeral 106b denotes a verification coil, and reference numeral 107 denotes a protruding portion formed on an inner surface of the coil-side yoke material. Reference numeral 108 denotes a front-side spiral disc spring (hereinafter, the front-side disc), and reference numeral 109 denotes a rear-side spiral disc spring (hereinafter, the rear-side disc). The front-side disc illustrated in FIG. 1 at a is formed of a ridge portion 108a and a groove portion 108b, and the rear-side disc is also an elastic member having a similar shape. That is, the movable-side magnetic material member (movable-side yoke material) includes a front-side pole piece 102 and a rear-side pole piece 104. The fixed-side magnetic material member is a coil-side yoke material 105. Reference numeral 110 denotes a movable-side electrode, reference numeral 111 denotes a fixed-side electrode, reference numeral 112a denotes a front-side panel, reference numeral 112b denotes a rear-side panel, reference numeral 113 denotes a center plate, and reference numeral 114 denotes a fastening member made of a non-conductive material for fastening the fixed-side electrode and the front-side panel. The movable-side electrode 110 and the fixed-side electrode 111 constitute an electrostatic capacitance-type displacement detecting unit. Reference numeral 115 denotes a coil mounting portion of the two coils (106a, 106b) in an inner peripheral surface of the coil-side yoke material 105, and reference numeral 116 denotes a coil opposing surface of the front-side pole piece 102. In the present embodiment, the force coil 106a and the verification coil 106b are configured without a bobbin, and the outer peripheral surface thereof is mounted on the coil mounting portion 115 having a convex shape.

A magnetic void portion 117 (first void portion) in the radial direction is formed between the coil opposing surface 116 and the coil mounting portion 115. Between the protruding portion 107 of the coil-side yoke material and the rear-side pole piece 104, an annular void portion 118 (a magnetic coupling portion which is a second void portion) is provided by a narrow gap. By "permanent magnet 101→front-side pole piece 102→ magnetic void portion 117→coil-side yoke material 105→annular void portion 118→rear-side pole piece 104", a closed loop magnetic circuit is formed as indicated by a chain arrow. The gap of the annular void portion 118 indicated by the chain line circle B has been set so that the magnetic resistance becomes sufficiently smaller than that of the magnetic void portion 117. The annular void portion 118 is a magnetic coupling portion for forming a closed loop magnetic circuit in a magnetic circuit using a permanent magnet. As is well known, when a current flows through a conductor placed in a magnetic field, Lorentz force that is electromagnetic force is generated. Regardless of the type of driving principle of any actuator, the force relationship between the fixed side and the moving side is relative. That is, if one of the fixed side and the moving side is fixed, the other moves. In the present embodiment, when a current flows through the force coil 106a fixedly arranged in the space of the magnetic void portion 117, a reaction force to the Lorentz force for moving the movable portion in the axial direction is generated. The movable portion of the present embodiment includes the permanent magnet 101, the front-side pole piece 102, the rear-side pole piece 104, and the movable-side electrode 110.

Reference numerals 119a and 119b are lead wires of the force coil 106a, and reference numerals 120a and 120b are lead wires of the verification coil 106b. These four lead wires pass through the coil-side yoke material 105 and the front-side panel 112a, and are connected to a control circuit installed outside. Reference numeral 121 denotes an inner peripheral-side disc support ring, reference numeral 121a denotes a cylindrical void portion formed to reduce the weight of the inner peripheral-side disc support ring, and reference numeral 122 denotes an outer peripheral-side disc support ring. The inner peripheral-side disc support ring 121 and the outer peripheral-side disc support ring 122 are made of a non-conductive material (insulating material).

The inner peripheral-side disc support ring 121 can electrically insulate the front-side pole piece 102 and the movable-side electrode 110, which are magnetic materials. Eddy currents are generated on the surface of the pole piece, but by this electrical insulation measure, the electrostatic capacitance signal between the two electrodes can avoid the influence of the eddy currents. Further, the outer peripheral side of the front-side disc 108 is electrically insulated from the coil-side yoke material 105 by the outer peripheral-side disc support ring 122. As the insulating material, mica which is an inorganic solid insulating material, porcelain (ceramics), glass, or the like can be applied. The inner peripheral-side disc support ring 121 is bonded and fixed between the movable-side electrode 110 and the front-side pole piece 102 which are conductive materials. The inner peripheral side of the front-side disc 108 is held between the movable-side electrode 110 and the inner peripheral-side disc support ring 121. The outer peripheral side of the front-side disc 108 is bonded and fixed to the outer peripheral-side disc support ring 122. Reference numeral 123 denotes one of two conducting wires (lead wires) that detect electrostatic capacitance between the movable-side electrode 110 and the fixed-side electrode 111. An end portion of the conductive wire 123 is electrically connected to the disc-shaped spring 108 and is attached to a groove (not illustrated) formed in the outer peripheral-side disc support ring 122. The front-side disc 108 also serves as a conductive path for supporting the movable portion and detecting electrostatic capacitance. That is, in order to detect a minute electrostatic capacitance signal between the fixed-side electrode 111 and the movable-side electrode 110, a conductive path (front-side disc 108, conductive wire (lead wire) 123) connecting the movable-side electrode 110 and the outside is completely electrically insulated.

In the present embodiment, the force coil 106a and the verification coil 106 are arranged so as to wrap, from the outer peripheral side, the permanent magnet 101 and the entire front-side pole piece 102 connecting the permanent magnets 101 in series. Further, the annular void portion 118 having sufficiently smaller magnetic resistance than the magnetic void portion 117 is disposed in the closed loop magnetic circuit. The movable members that move in the axial direction are the permanent magnet 101, the front-side pole piece 102, the rear-side pole piece 104, the movable-side electrode 110, and the inner peripheral-side disc support ring 121. In order to reduce the weight of any movable member, a hollow portion is provided on the inner peripheral side.

Disc-shaped springs formed by spiral curves are used for the front-side disc 108 and the rear-side disc 109 used in the present embodiment. The present embodiment and the embodiments to be described later are similar, but the shape of the spring is not limited to this spiral curve. From the characteristics required for the acceleration sensor, a spring structure and a specification that can obtain low rigidity and a low resonance frequency may be selected, and for example, a well-known cloud spring or the like can also be applied.

(1-2) Features of Present Embodiment

In the present embodiment, assuming that the axial length of the front-side pole piece 102 is L, the axial length L is formed sufficiently long, and a cylindrical void portion 103 (inertial mass adjustment portion) having a small radial thickness is provided inside the front-side pole piece. It is noted that the following effects can be obtained by this configuration. That is,
(1) The force constant (electromechanical conversion efficiency) of the actuator can be increased.
(2) The increase in the movable portion inertial mass can be reduced.
(3) Even when the generated force is increased by increasing the number of coil turns, heat generation can be suppressed.

Figure 2:
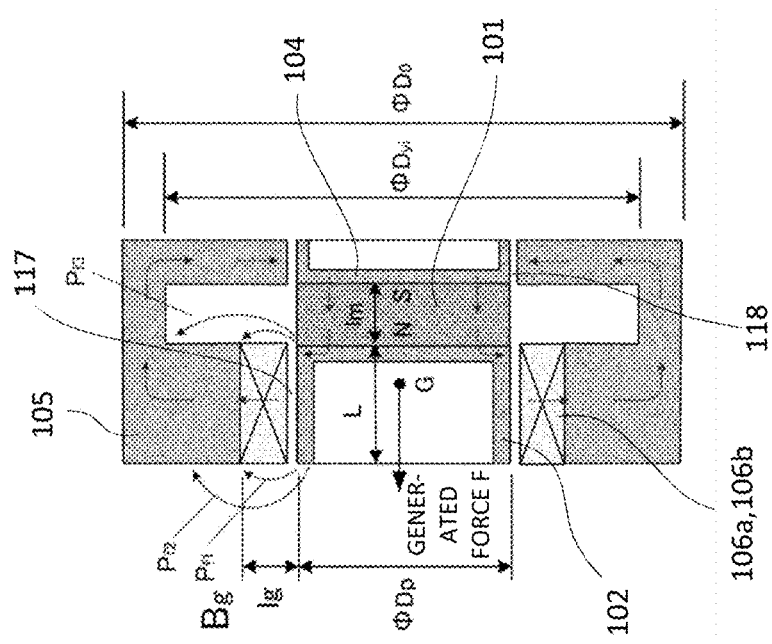
FIG. 2 is a model diagram of a magnetic circuit of an MM-type acceleration sensor of the present invention.
Figure 3:
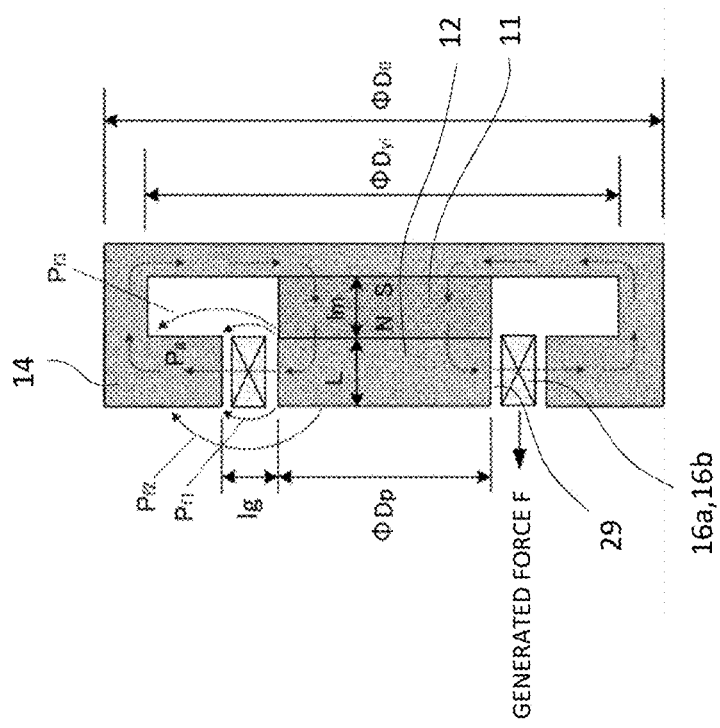
FIG. 3 is a model diagram of a magnetic circuit of a conventional MC-type acceleration sensor.

The effect of the above (1) will be described with reference to FIGS. 2 to 7. FIG. 2 is a model diagram of a magnetic circuit of the MM-type acceleration sensor of the present invention, and FIG. 3 is a model diagram of a magnetic circuit of a conventional MC-type acceleration sensor. The reference sign of each element in FIG. 2 corresponds to the reference sign of each element in FIG. 1 at b. Similarly, the reference sign of each element in FIG. 3 corresponds to the reference sign of each element in FIG. 54. Incidentally, in the conventional MC type, as illustrated in FIG. 3, there is only one void portion 29 forming a closed loop magnetic circuit. In the case of the MM type of the present invention, two void portions (117, 118) are required as illustrated in FIG. 2 in order to form a closed loop magnetic circuit. With a configuration in which a sub void portion (second void portion) is provided as a magnetic coupling portion with respect to a main void portion (first void portion) in which a coil is interposed, the coil can be fixedly arranged in a magnetic field having a high magnetic flux density, and a large Lorentz force can be generated in the coil. Further, when the gap of the first void portion is M and the gap of the second void portion is $\delta 2$, $\delta 1 > \delta 2$ is satisfied. By making the magnetic resistance of the magnetic coupling portion sufficiently smaller than that of the first void portion, the influence of the magnetic coupling portion on the generated force can be reduced.

Figure 4:
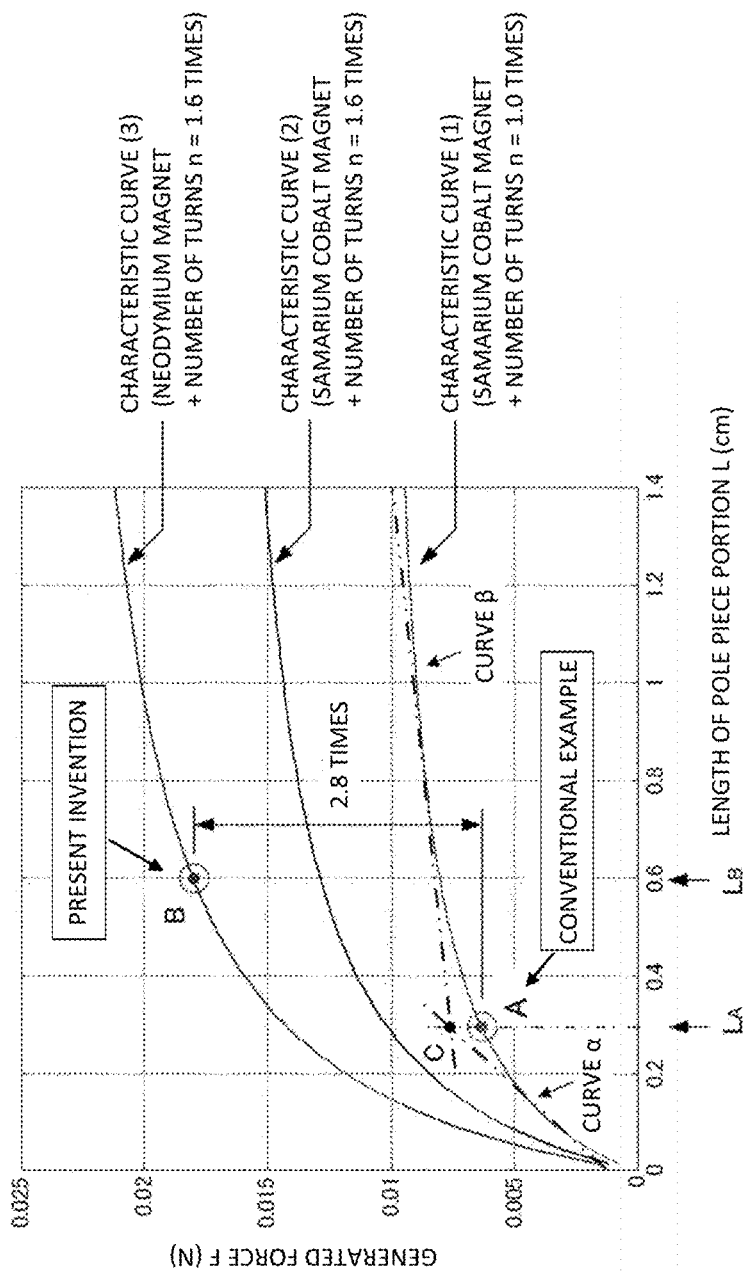
FIG. 4 is a graph of an analysis result showing a relationship between a generated force F and a pole piece length L.

Hereinafter, an analysis result of the permanent magnet magnetic circuit will be described using the above analysis model. FIG. 4 is a graph illustrating an analysis result indicating a relationship between the generated force F and the pole piece length L, and FIG. 5 is a graph illustrating an analysis result indicating a relationship between a leakage coefficient σ and the pole piece length L.

In FIG. 4, the characteristic curve (1) uses a samarium cobalt magnet, and the total coil length is a basic specification ($l=l_0$) in Table 1 described later. The characteristic curve (2) shows a case where the total coil length is $l=l_0 \times 1.6$ using a samarium cobalt magnet. The characteristic curve (3) indicates the sensor (FIG. 1) in the present embodiment, and the total coil length using the neodymium magnet is $l=l_0 \times 1.6$. A point A in the drawing indicates a pole piece length $L=L_A=0.3$ cm and a generated force F=0.0064 N in the conventional MC-type. A point B in the drawing indicates a pole piece length $L=L_B=0.6$ cm and a generated force F=0.018 N in the MM-type of the present invention. Therefore, the generated force of the MM type of the present invention is 2.8 times larger than that of the conventional MC type.

Figure 5:
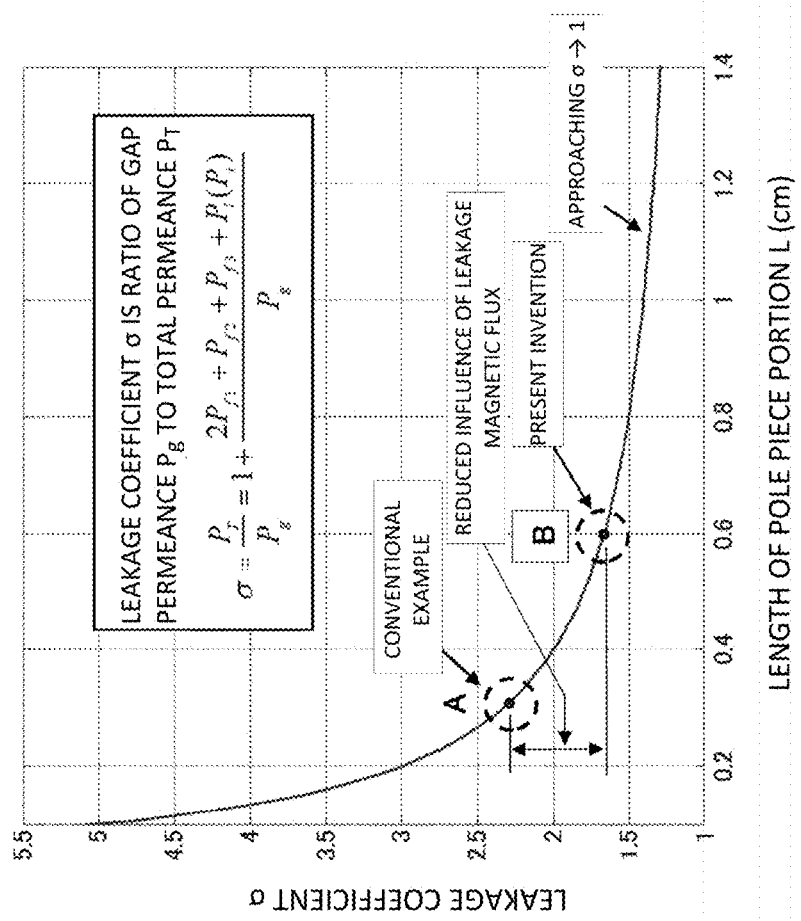
FIG. 5 is a graph illustrating an analysis result indicating a relationship between a leakage coefficient 6 and a pole piece length L.

In the graph illustrating the leakage coefficient with respect to the pole piece length L in FIG. 5, the leakage coefficient 6 indicates the ratio of the "magnetic flux contributing to the generated force" to the "total magnetic flux", and a larger generated force is obtained as the ratio asymptotically approaches σ→1. By increasing the axial length L of the pole piece from FIG. 5, the ratio of the effective magnetic flux (gap permeance) that perpendicularly passes through the magnetic void portion 117 to the leakage magnetic flux (leakage permeance) can be reduced. The gap permeance is a magnetic flux that contributes to the generated force, and the leakage permeance does not contribute to the generated force. That is, according to the configuration of the present embodiment, the generated force (electromechanical conversion efficiency) for the same current can be increased.

In FIG. 4, the characteristic curve (1) is divided into a curve α and a curve β having greatly different gradients, and the intersection of the envelope of each curve is defined as C. In the range of $0<L<L_A$, the generated force F greatly increases as the pole piece length L increases. In the range of $L>L_A$, the increase in the generated force F is small. Therefore, the pole piece length of the conventional MC-type sensor is often set to $L=L_A$ ($L_A=0.3$ cm in the case of FIG. 2). The reason is that, in the case of the MC-type sensor, when the number of coil turns is increased to increase the length L, the generated force required also increases because the inertial mass also increases. That is, the effect of increasing the length L is canceled out.

Figure 6:
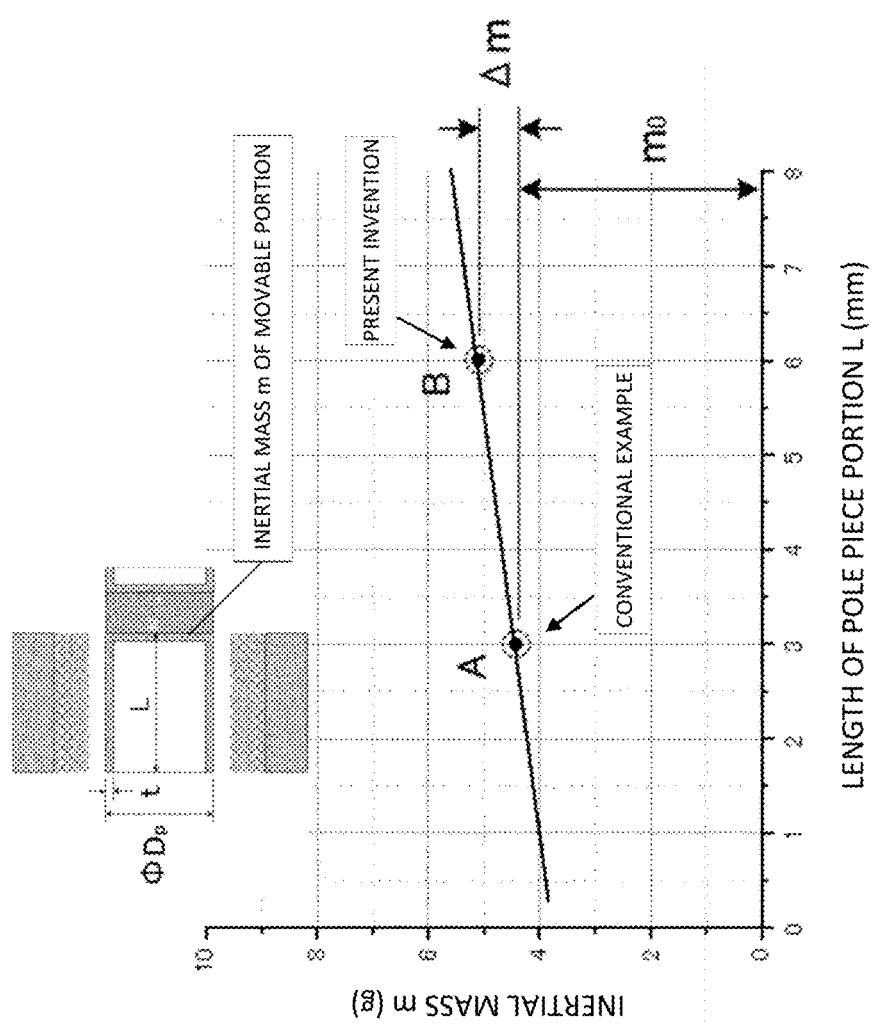
FIG. 6 is a graph illustrating an inertial mass m of a movable portion with respect to a length L of the pole piece.

The above (2) focuses on the fact that if the pole piece has a thin cylindrical shape, a large mass increase does not occur even if the pole piece is lengthened. FIG. 6 is a graph illustrating an inertial mass m of the movable portion with respect to a length L of the pole piece. The front-side pole piece is formed in a cylindrical shape having an outer shape $\Phi D_P$ and a radial thickness t. Here, it is assumed that $\Phi D_P=10$ mm and t=1 mm are set. In FIG. 6, when the pole piece length $L_A=3$ mm, the total inertial mass of the movable portion m=4.48 g, and $L_A=6$ mm, m=5.16 g. Therefore, when the pole piece length is doubled, the increase in the total inertial mass is 15%. Further, it is assumed that the pole piece has the same outer diameter and the thickness t is set to 0.5 mm. In this case, when the pole piece length is doubled, the increase in the total inertial mass is 8.4%.

Figure 7:
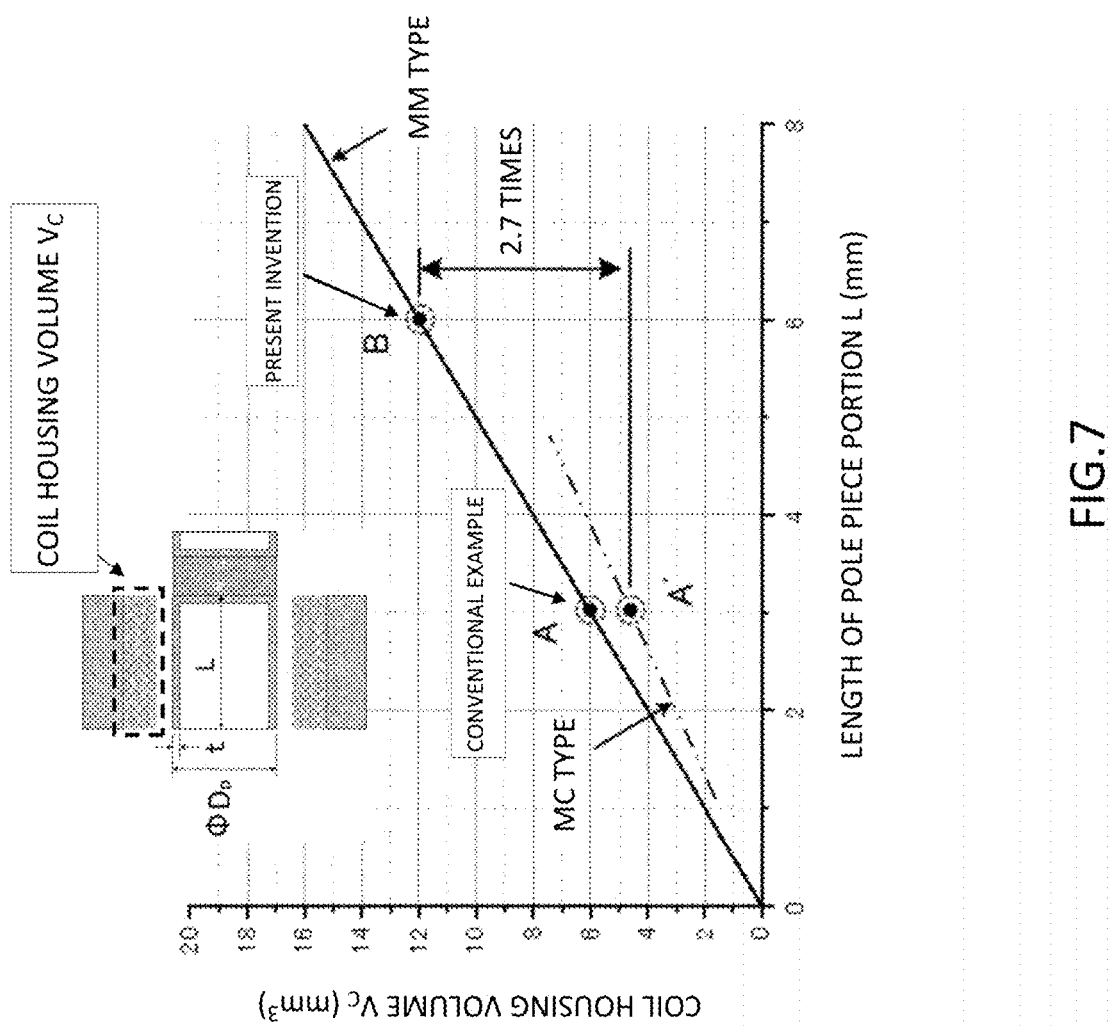
FIG. 7 is a graph illustrating a coil housing volume $V_C$ with respect to a pole piece length L.

The feature of the above (3) utilizes the knowledge of the above (2). FIG. 7 illustrates the coil housing volume $V_C$ with respect to the pole piece length L. In the present embodiment, the radial gap of the magnetic void portion 117 is 2.5 mm, the radial thickness of the coil housed in the magnetic void portion 117 is 2 mm, and the radial gap between the coil opposing surface 116 and the coil is 0.5 mm. By setting the pole piece length L=3 mm to L=6 mm under the above conditions, the coil housing volume $V_C$ increases 2.7 times. However, as described above, the inertial mass of the movable portion increases only by 15% when the thickness t of the pole piece is 1 mm and by 8.4% when the thickness t is 0.5 mm.

By utilizing the fact that the coil housing volume can be increased, heat generation leading to thermal noise can be suppressed even if the number of coil turns is increased to increase the generated force. The electrical resistance of the coil is proportional to the total coil length and inversely proportional to the cross-sectional area of the coil. Therefore, when the total coil length is n times, if the coil cross-sectional area is n times and the coil linear shape is $\sqrt{n}$ times, the electrical resistance does not increase. The coil housing area at this time may be $\sqrt{n} \times n$.

(2) Comparison of Specification Between Present Invention and Conventional Sensor In this section, the effects of the structural features (1) to (3) described in section (1) on the basic performance of the acceleration sensor are verified by theoretical analysis on the basis of comparison with the conventional MC-type sensor.

pole piece 102, the permanent magnet 101, and the rear-side pole piece 104. As described above, the value of the inertial mass m=5 g is set from the condition that (i) the improvement of the sensor sensitivity in the low frequency range, (ii) the broadband frequency characteristics required for the active vibration isolator, and (i) and (ii) are compatible. (Based on the mass $m_p$ of the permanent magnet, the movable portion mass m is defined)

(2) Specification of Total Coil Length and Coil Resistance Ra

The total coil length of the MM type was set to n=1.6 times that of the MC type. As described above, in order to make the coil resistance $R_a$ the same, the coil cross-sectional area of the MM type is set to n times, and the coil wire diameter is set to $\sqrt{n}=1.26$ times. Therefore, the coil storage space Sn=n×$\sqrt{n}$=2.0 times. With this configuration, when the same current I flows through both sensors, the MM type can satisfy the above (ii) while maintaining the same calorific value (W=$I^2 \times$Ra) as compared with the MC type. Further, the generated force of the actuator can be made n times or more.

(3) Specification of Electrical Gain

When the position sensor sensitivity is Ks, the adjustment gain is $K_C$, and the proportional gain is Kp, a total electrical gain Kpt=Ks×Kc×Kp is satisfied. This Kpt is set to be the same in the MM type and the MC type.

TABLE 1

Comparison in specification of acceleration sensor

|  | Symbol | Unit | Conventional MC type | MM type of present invention | Notes |
|---|---|---|---|---|---|
| Inertial mass | m | Kg | $1.25 \times 10^{-3}$ | $5.0 \times 10^{-3}$ (4 times the left value) |  |
| Mechanical spring constant | k | N/m | 79.0 | 316 | Same Resonance Frequency ($f_0$ = 40 Hz) |
| Attenuation coefficient | c | Ns/m | 3.50 | ← | Assumption |
| Total coil length | l | m | 19.2 | 30.7 (1.6 times the left value) |  |
| Coil resistance | $R_a$ | Ω | 465 | ← | Total coil length is 1.6 times Wire diameter is 1.26 times |
| Actuator force constant | $K_t$ | N/A | 6.39 | 18.0 (2.8 times the left value) | Analysis result of magnetic circuit (See FIG. 4) |
| Position sensor sensitivity | $K_S$ | V/m | Assumption of electrical gain ($K_{PT} = K_S \times K_P \times K_c$) $7.5 \times 10^5$ | ← | Same electrical gain |
| Adjustment gain | $K_C$ |  |  |  |  |
| Proportional gain | $K_P$ |  |  |  |  |

(2-1) Specifications of Linear Motion MC-Type Acceleration Sensor and Sensor of Present Invention Here, the basic performance of a linear motion moving magnet type (hereinafter, a linear motion MM type) which is the sensor of the present invention and the basic performance of a conventional linear motion moving coil type (hereinafter, a linear motion type MC type) are evaluated by theoretical analysis. Table 1 shows the specifications of the conventional linear motion MC type sensor and the sensor of the present invention (MM type) in comparison.

(1) Specification of Inertial Mass m

Figure 8:
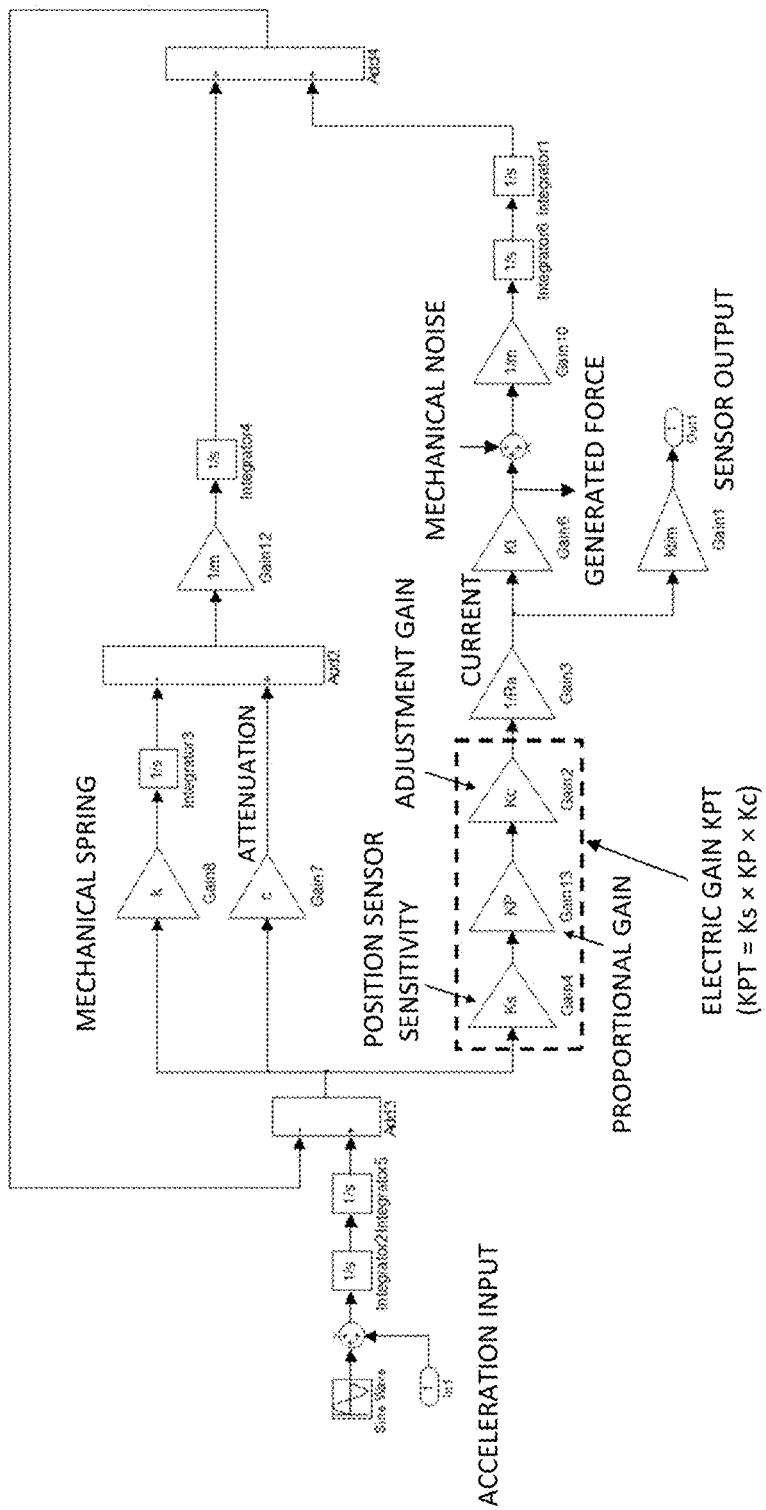
FIG. 8 is a control block diagram of an acceleration sensor used for theoretical analysis.

The inertial mass m is 5 g in the MM type with respect to 1.25 g in the MC type. The inertial mass m=1.25 g of the MC type is determined from the movable-side electrode 24, the force coil 16a, the verification coil 16b, the coil bobbin 17, and the coil bobbin supporting members 18 and 19 in FIG. 54. The MM-type inertial mass m=5 g is the sum of the respective masses of the movable-side electrode 110, the inner peripheral-side disc support ring 121, the front-side (2-2) Theoretical Analysis Result FIG. 8 is a control block diagram of an acceleration sensor used for theoretical analysis. Expressions (1) to (3) indicating the detection principle of the electrostatic capacitance-type acceleration sensor described above are replaced with control block diagrams.

(i) Comparison of Gain and Phase Characteristics

Figure 9:
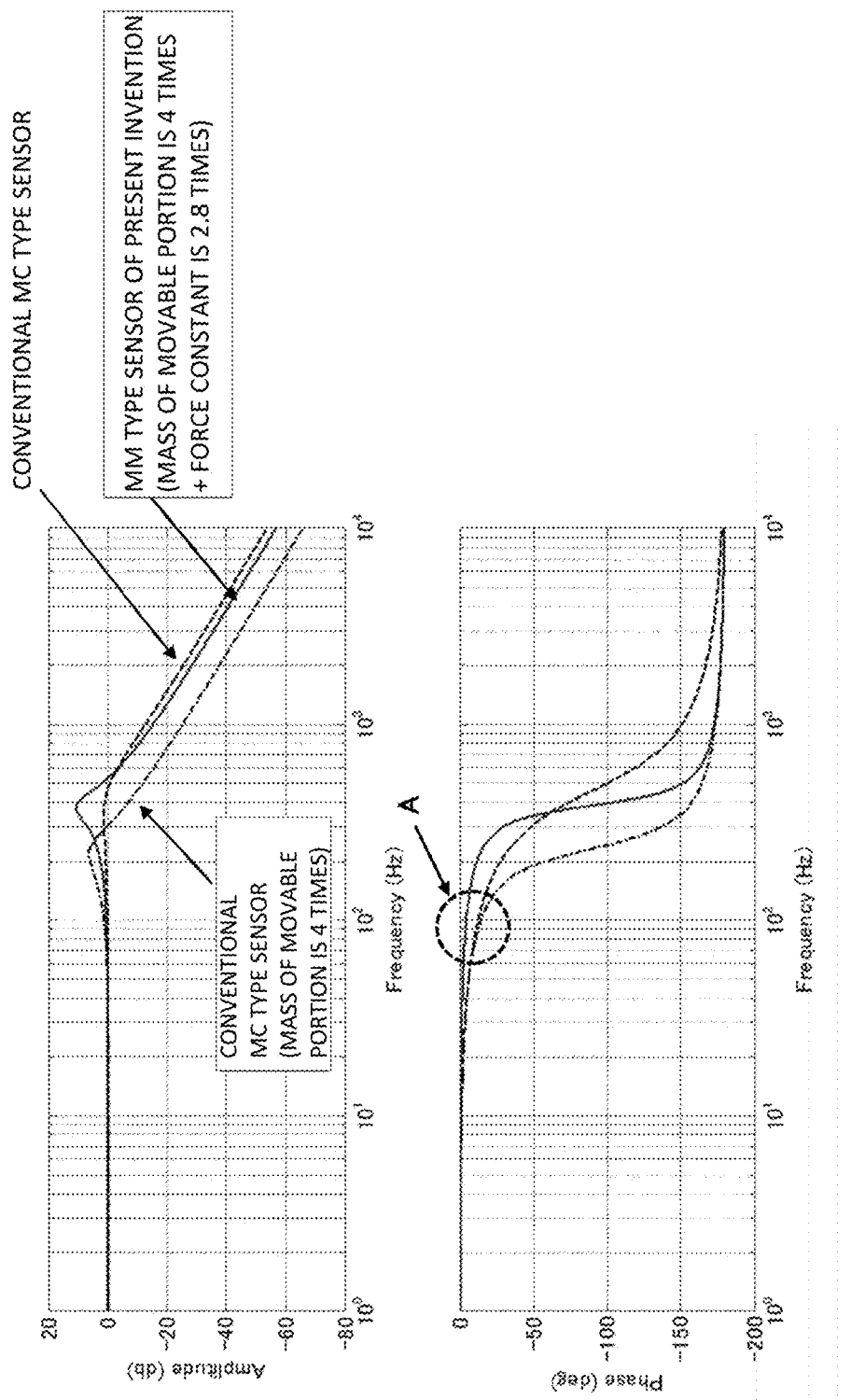
FIG. 9 is a graph comparing gain/phase characteristics for (1) to (3) in a case where only an inertial mass m is 4 times in the specifications of (1) the conventional MC type, (2) the MM type of the present invention, and (3) the conventional MC type.

FIG. 9 illustrates the comparison of the gain/phase characteristics of the above (1) to (3) in a case where only the inertial mass m is four times in the specifications of Table 1 of the following three cases, that is, (1) the conventional MC type, (2) the MM type of the present invention, and (3) the conventional MC type of Table 1. Hereinafter, performance superiority and inferiority of the above three cases are evaluated by gain characteristics on the premise of being mounted on the active vibration isolator. The gain characteristics of (1) and (2) do not change significantly. In the MM type of the present invention of (2), the resonance frequency is $f_0$=380 Hz. In the case of (3), the resonance frequency is $f_0=380 \rightarrow 220$ Hz and the bandwidth is reduced. For the phase characteristics, the above (1) to (3) are evaluated with a phase delay in the vicinity of f=100 Hz (chain line circle A). The phase characteristic in the vicinity of f=100 Hz is an important performance evaluation index in a case where the acceleration sensor is applied to the active vibration isolator as described later in Supplement (2). It is preferable to minimize the phase delay in the vicinity of f=100 Hz. As the resonance frequency $f_0$ is higher, the phase delay in the vicinity of f=100 Hz can also be reduced. The phase characteristics of (1) and (3) are substantially equivalent at f=100 Hz. However, when f>100 Hz, a significant phase delay occurs in the case of the above (3). In the MM type of the present invention of (2), the phase delay is greatly improved as compared with (1) and (3).

(ii) Comparison of Actuator Generated Force

Figure 10:
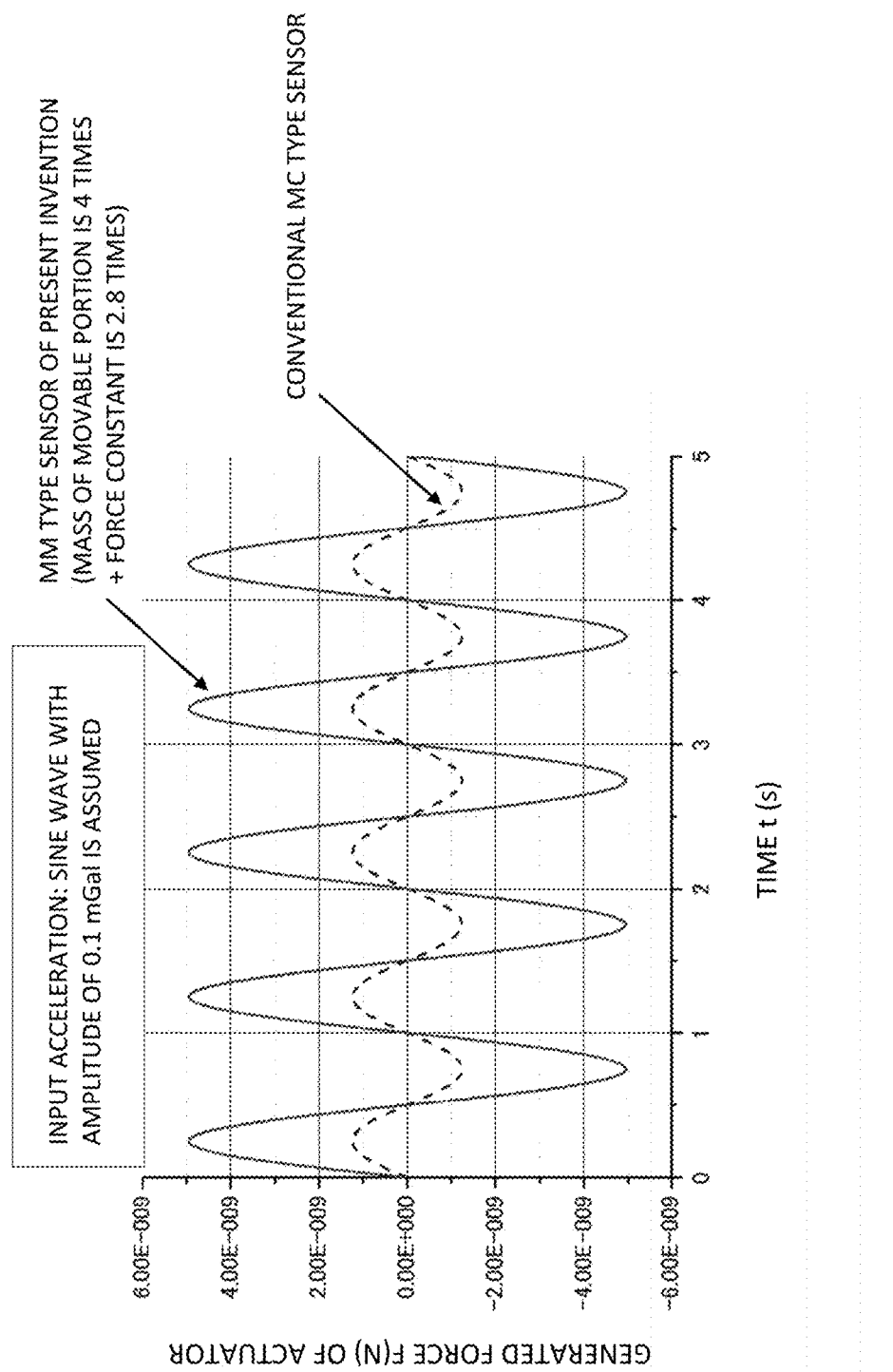
FIG. 10 is a graph comparing the generated force of an actuator with respect to time for (1) the conventional MC type and (2) the MM type of the present invention.

FIG. 10 illustrates the comparison of the generated force of the actuator with respect to time for (1) the conventional MC type and (2) the MM type of the present invention in the specifications of Table 1. The input acceleration is assumed to be a sine wave with an amplitude of $1.0 \times 10^{-6}$ m/s² (0.1 mGal). In the MM type of the present invention, the generated force is increased by four times in proportion to the inertial mass as compared with the conventional MC type. The effect of an increase in generated force due to an increase in inertial mass can compensate for a weak point of an electrostatic capacitance type in which sensitivity decreases in a low frequency range.

(iii) Influence Comparison of Mechanical Noise

Figure 11:
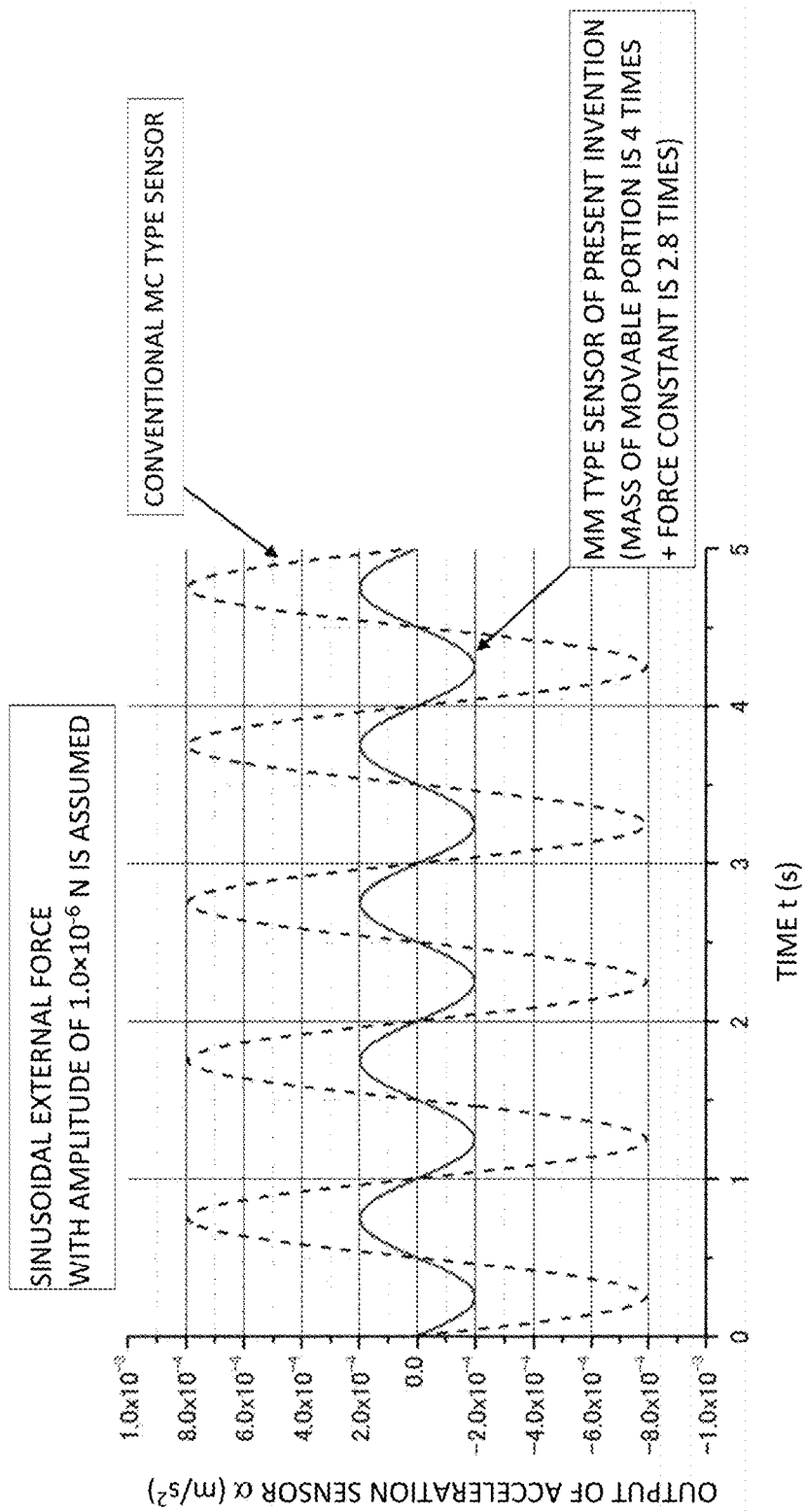
FIG. 11 is a graph comparing the influence of a mechanical noise on the sensor output for (1) the conventional MC type and (2) the MM type of the present invention.

FIG. 11 illustrates comparison of the influence of mechanical noise on the sensor output for (1) the conventional MC type and (2) the MM type of the present invention in the specifications of Table 1. Here, the mechanical noise is assumed to be a disturbance factor that hinders smooth operation of the movable portion. It is assumed that a sinusoidal external force (mechanical noise) with an amplitude of $1.0 \times 10^{-6}$ N is applied to the output shaft of the actuator (see the control block diagram of FIG. 8). In the present invention, it can be seen that the influence of the mechanical noise applied to the actuator on the sensor output is reduced to 1/4 as compared with the conventional type. This effect results from the fact that the increase in the inertial mass increases the actuator generated force. That is, a weak point in which the inertial mass of the movable portion is increased in the MM type as compared with the MC type indicates an advantage with respect to mechanical noise.

(iv) Comparison of Coil Currents

Figure 12:
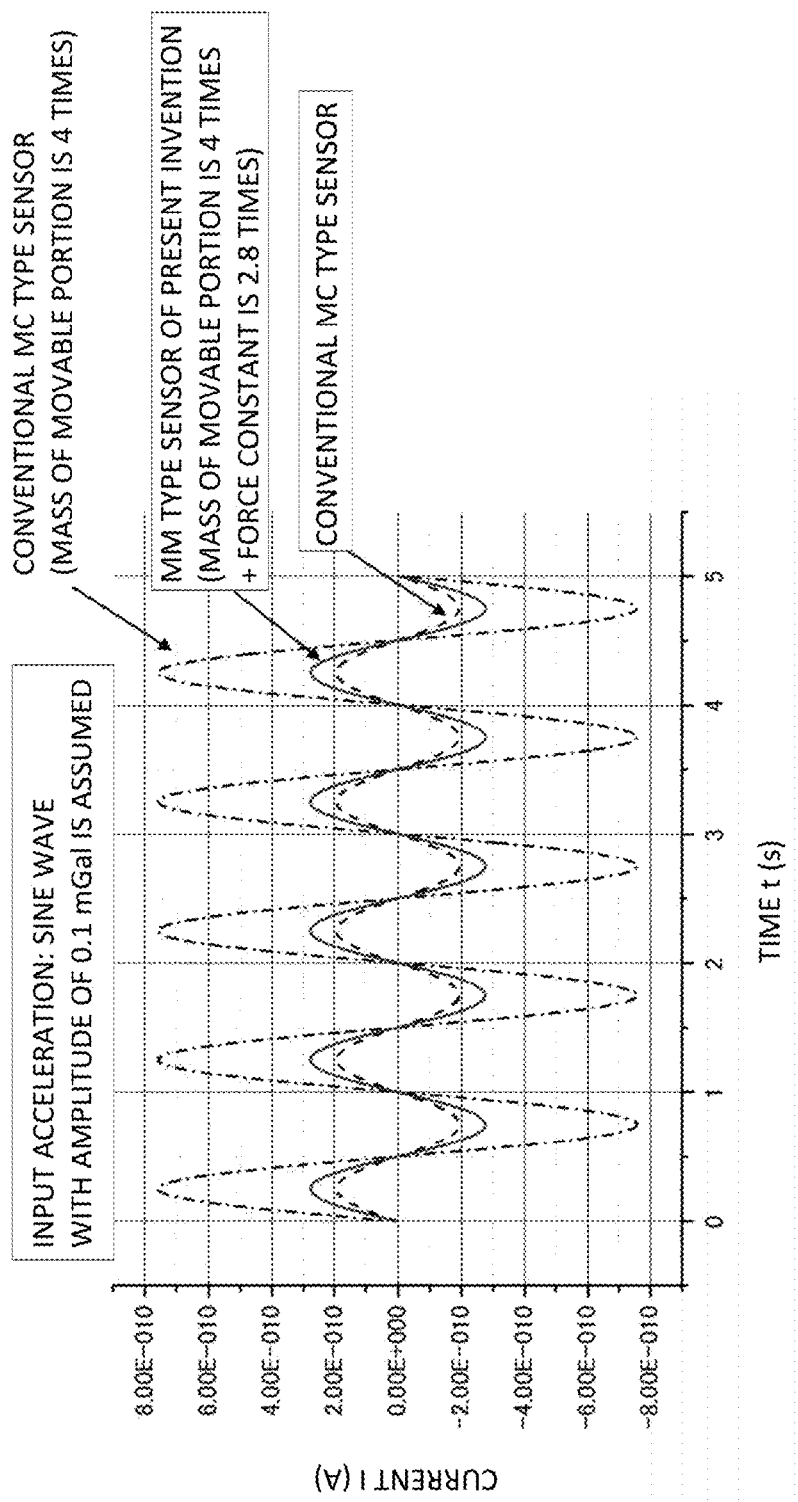
FIG. 12 is a graph comparing coil currents for (1) to (3) in a case where only the inertial mass m is 4 times in the specifications of (1) the conventional MC type, (2) the MM type of the present invention, and (3) the conventional MC type.

FIG. 12 illustrates the comparison of coil currents for the above (1) to (3) in a case where only the inertial mass m is four times in the specifications of Table 1 of the following three cases, that is, (1) the conventional MC type, (2) the MM type of the present invention, and (3) the conventional MC type specification of Table 1. The input acceleration is assumed as a sine wave with an amplitude of $1.0 \times 10^{-6}$ m/s² (0.1 mGal). In the MM type of the present invention, the increase in the coil current is small as compared with the conventional MC type. However, when the inertial mass m of the conventional MC type is quadrupled, the coil current increases in proportion to the inertial mass. This is because, in the present invention, the total coil length (the number of turns) is increased by 1.6 times, and at the same time, the coil wire diameter is increased by 1.26 times. The reason why this configuration is made possible is that, as described above, a large coil housing space can be formed by providing the front-side pole piece 102 with the sufficiently long cylindrical void portion 103 (inertial mass adjustment portion with length L). In the present embodiment, the void portion 103 has a cylindrical shape of a perfect circle. However, since the purpose is to reduce the inertial mass, the void portion may not be a perfect circle. For example, the shape may be a polygonal shape or a shape having different inner diameters in the axial direction. These are collectively referred to as a substantially cylindrical shape.

Summarizing the features of the MM-type embodiment of the present invention shown in the above (i) to (iv), the difficulty of the ultrafine wire processing, which is a fateful weak point of the MC type, can be fundamentally eliminated, and the following effects can be obtained.

(1) The MM type of the present invention can obtain a high frequency characteristic comparable to that of the conventional MC type. That is, the weak point of the MM type is eliminated.

(2) The influence of the mechanical noise on the sensor output can be reduced to ¼ as compared with the conventional MC type. In addition, the effect of an increase in the generated force due to an increase in the inertial mass can compensate for the weak point of an electrostatic capacitance type in which sensitivity decreases in a low frequency range.

(3) As compared with the conventional MC type, the increase in the calorific value leading to the coil current and the thermal noise is small.

(2-3) Setting Range of Movable Portion Mass m

The range in which the movable portion mass m of the MM-type sensor of the present invention can be set will be considered. First, a lower limit value that can be set by the movable portion mass m will be considered. If the movable portion mass m becomes as close to the MC type as possible due to the weight reduction, the transmission characteristics of the MM type become equivalent to those of the MC type. In this case, since the movable portion mass m cannot be smaller than the mass $m_p$ of the permanent magnet, the value of the mass $m_p$ is the basis for determining the limit. In the present embodiment (FIG. 1 at b), a pole piece (102, 104) for forming a magnetic circuit is essential for the movable portion including the permanent magnet 101. In the present embodiment, $m_p=1.52$ g, the mass $m_1$ of the front-side pole piece 102=1.36 g, the mass $m_2$ of the rear-side pole piece 104=0.63 g, and $m_3=1.45$ g including the movable-side electrode 111 and the inner peripheral-side disc support ring 353. Therefore, the total mass of the movable portions $m=m_p+m_1+m_2+m_3=4.96\approx5.0$ g. Here, in order to reduce the weight, the plate thicknesses of the members $m_1$ and $m_2$ are set to $t=1.0\rightarrow0.5$ mm, so that $m_1+m_2\rightarrow1.0$ g can be obtained. When the movable-side electrode is made of aluminum and the plate thickness of each member is $t=1.0\rightarrow0.5$ mm, $m_3\rightarrow0.5$ g is obtained. Incidentally, the plate thickness $t=0.5$ mm is the limit in consideration of the magnetic resistance of the magnetic path and the component accuracy at the time of machining. As a result, the total mass of the movable portion $m=m_p+m_1+m_2+m_3=2.5$ g. Therefore, the lower limit value $m_{min}$ of the movable portion mass of the MM-type sensor of the present invention is $m_{min}=2\,m_p$ based on the mass $m_p$ of the permanent magnet. Therefore, the range of the movable portion mass in which the present invention can be established as an acceleration sensor is $m \geq 2m_p$.

Next, an upper limit value that can be set by the movable portion mass m will be considered. The upper limit value that can be set by the movable portion mass m is greatly related to the frequency bandwidth (resonance frequency $f_0$) of the acceleration sensor.

[Math. 5]

$$f_0 = \frac{1}{2\pi}\sqrt{\frac{K_T}{m}} \quad (5)$$

Here,

[Math. 6]

$$K_r = \frac{K_{PT}K_t}{R_d} \quad (6)$$

In Expression (6), as shown in Table 1, $K_{PT}$ is a product of the position sensor sensitivity $K_S$, the adjustment gain $K_C$, and the proportional gain $K_P$. $K_t$ is a force constant of the actuator, and $R_a$ is an electrical resistance of the coil. From Expression (5), the upper limit value $m_{max}$ of the movable portion mass is determined from the resonance frequency $f_0$ (frequency bandwidth) required for the sensor.

[Math. 7]

$$m_{max} = \frac{K_T}{(2\pi f_0)^2} \quad (7)$$

Therefore, the range of the movable portion mass in which the present invention can be established as an acceleration sensor is $m \leq m_{max}$. As described above, in a case where the sensor of the present invention is applied to an active vibration isolator, a phase characteristic in the vicinity of f=100 Hz is an important performance evaluation index. It is preferable to minimize the phase delay in the vicinity of f=100 Hz, and for this purpose, it is necessary to set the resonance frequency $f_0$ to be high. Practically, sufficient performance has been obtained when $f_0 > 250$ Hz.

Second Embodiment

Figure 13:
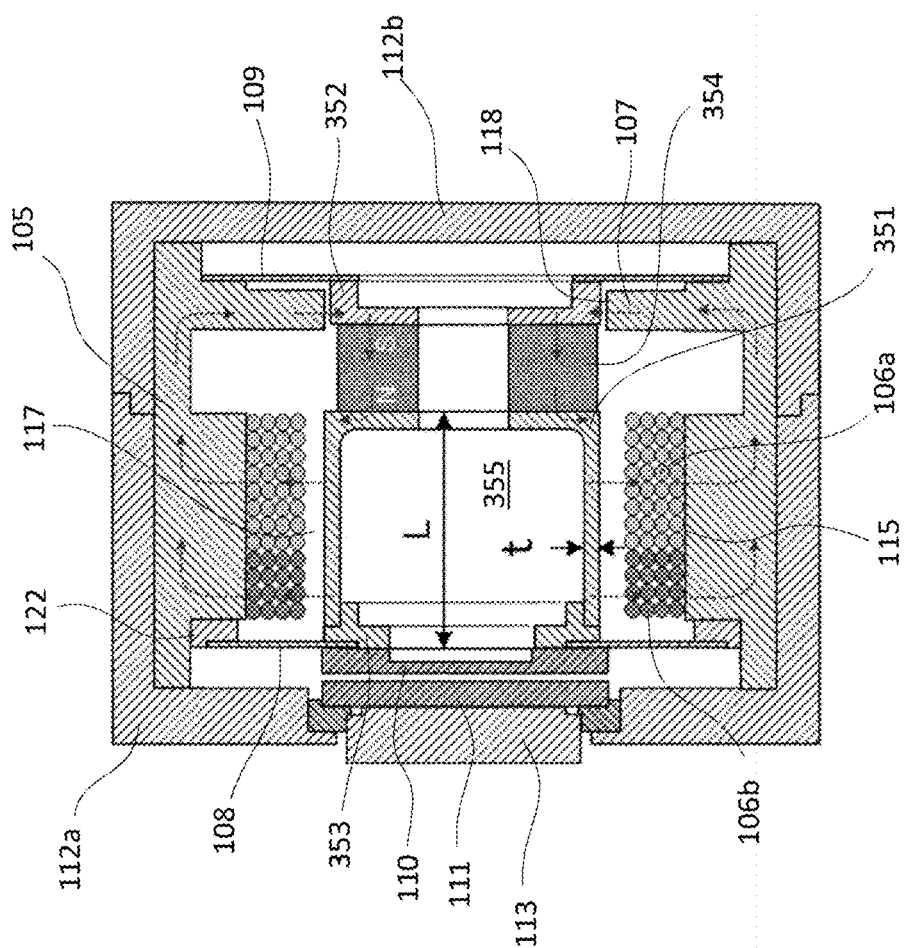
FIG. 13 is a front cross-sectional view of a servo-type acceleration sensor according to a second embodiment of the present invention.

FIG. 13 is a front cross-sectional view of a servo-type acceleration sensor according to a second embodiment of the present invention. One of the features of the MM-type acceleration sensor of the present invention is that, as described above, the complicated ultrafine wire processing, which is fateful to the MC-type, becomes unnecessary, and a significant cost reduction can be achieved in the production process. However, since the inertial mass of the movable portion is increased in the MM type as compared with the MC type, it is considered that it has been common knowledge in the past that the high frequency characteristics are deteriorated. However, the basic concept proposed by the present invention is that the weak points of the above MM type can be compensated for by devising the magnetic circuit and the component shapes constituting the magnetic circuit.

The present embodiment is a further thorough implementation of the basic concept of the present invention. That is, by selecting the component shape and the magnetic material, the inertial mass m of the movable portion is brought close to the MC type while being the MM type. Reference numeral 351 denotes a front-side pole piece, reference numeral 352 denotes a rear-side pole piece, and reference numeral 353 denotes an inner peripheral-side disc support ring. Reference numeral 354 denotes a ring-shaped permanent magnet magnetized in the axial direction, and reference numeral 355 denotes a cylindrical void portion formed inside the front-side pole piece. The front-side pole piece 351 is a main component constituting the magnetic circuit, and occupies a large proportion in the mass of the movable portion. In the present embodiment, the front-side pole piece is made of a soft magnetic material, and is made of permalloy that can be manufactured by press working. Permalloy has a small coercive force and is a high-permeability material. Therefore, even if the thickness t of the cylindrical front-side pole piece is made sufficiently thin, the length L can be made sufficiently long without being affected by the magnetic resistance. As described above, as the length L of the front-side pole piece is longer, the influence of the leakage of the magnetic flux on the generated force can be reduced, so that the generated force can be increased even with the same current. At the same time, since the coil housing volume can be increased, a coil specification (number of turns, wire diameter) that can suppress heat generation of the coil can be selected. In examples, a magnetic circuit that does not affect the generated force of the actuator even when the thickness t<0.5 mm can be configured. Further, in the present embodiment, in order to reduce the weight, the permanent magnet 354, the rear-side pole piece 352, the inner peripheral-side disc support ring 353, and the like are also hollow.

Third Embodiment

As described above in the first embodiment, the present invention focuses on the following points.

Figure 14:
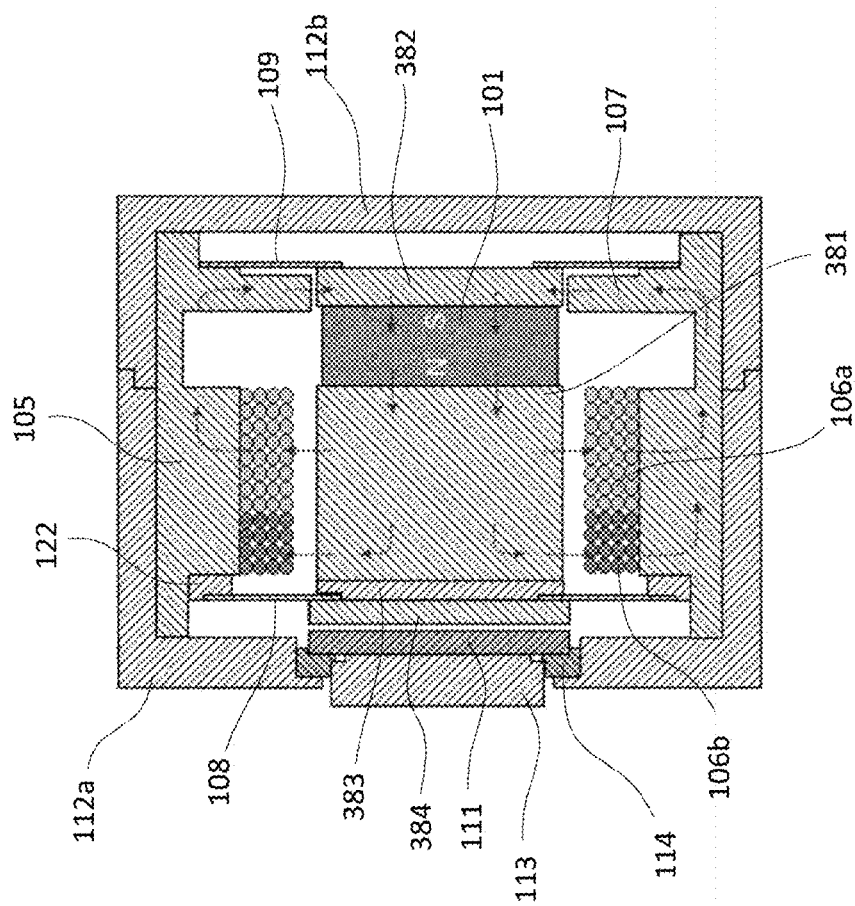
FIG. 14 is a front cross-sectional view of a servo-type acceleration sensor according to a third embodiment of the present invention.

That is, the point is that "the weak point of the MM type that the inertial mass of the movable portion increases is conversely an advantage of improving the sensor sensitivity in the low frequency range". In particular, the electrostatic capacitance type has low sensor sensitivity in a low frequency range, and can compensate for its weak point. FIG. 14 is a front cross-sectional view of a servo-type acceleration sensor according to a third embodiment of the present invention, in which the above-described advantages of the MM type are thoroughly utilized. That is, contrary to the second embodiment described above, the inertial mass of the movable portion is set to be large thoroughly, and the sensor sensitivity in the low frequency range is greatly improved. However, the high frequency band is restricted as a compensation. Reference numeral 381 denotes a front-side pole piece, reference numeral 382 denotes a rear-side pole piece, and reference numeral 383 denotes an inner peripheral-side disc support member. The front-side pole piece 381 and the rear-side pole piece 382 are movable-side yoke movable-side yoke materials. None of the parts constituting the movable portion forms a hollow portion. The front-side pole piece 381, which mainly accounts for a large proportion of the movable portion mass, has a large influence on the solid member.

When the sensor according to the present embodiment is applied to, for example, an active vibration isolator, it is possible to design a control system focusing on improvement of vibration isolation characteristics in a low frequency range. Further, (1) an acceleration sensor (second embodiment) in which the inertial mass of the movable portion is completely reduced in weight, (2) an acceleration sensor (present embodiment) in which the inertial mass of the movable portion is sufficiently increased, and the two sensors (1) and (2) described above are combined and mounted on a vibration isolator, so that an active vibration isolating/ damping system that can cover from low frequencies to high frequencies can be realized (not illustrated).

Fourth Embodiment

Figure 15:
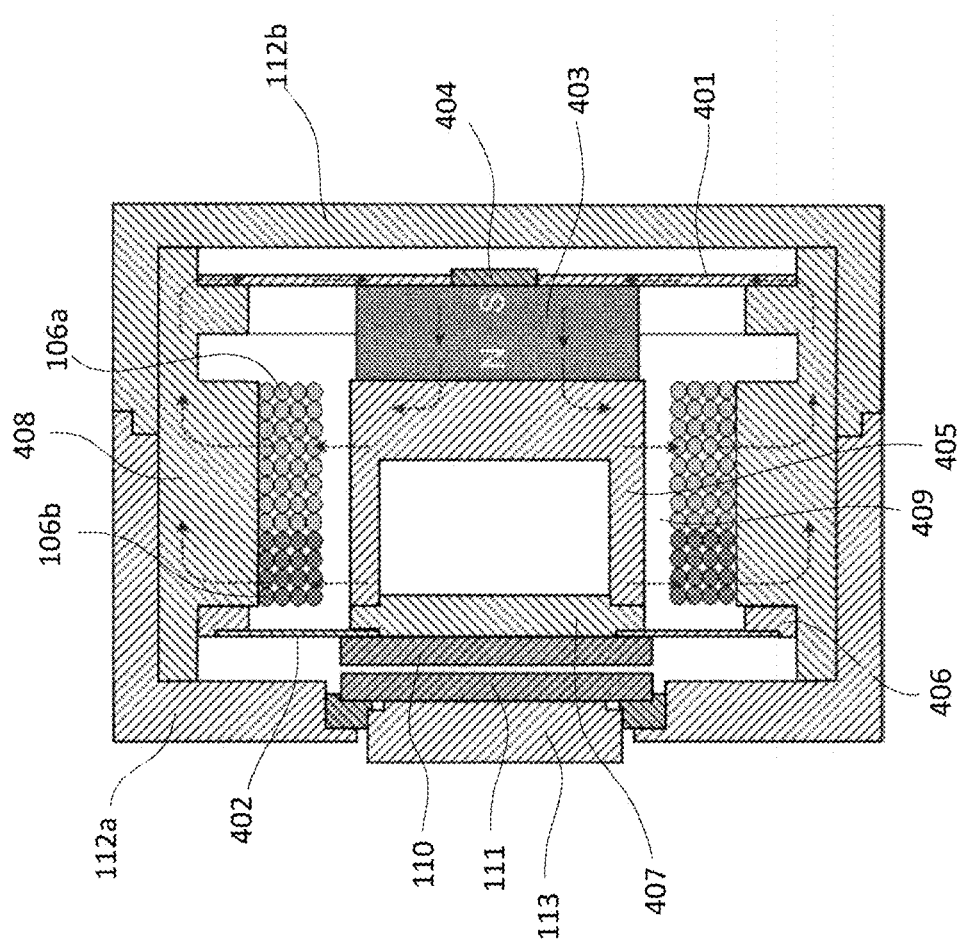
FIG. 15 is a front cross-sectional view of a servo-type acceleration sensor according to a fourth embodiment of the present invention.

FIG. 15 is a front cross-sectional view of a servo-type acceleration sensor according to a fourth embodiment of the present invention. In the above-described embodiment, the closed loop magnetic circuit is formed by providing the annular void portion (for example, a chain line circle B in FIG. 1 at b) by the narrow gap. In the present embodiment, not the annular void portion but the spiral disc-shaped spring itself is a member in which a magnetic circuit is formed.

Reference numeral 401 denotes a rear-side disc (second transmission portion), reference numeral 402 denotes a front-side disc made of a conductive material, reference numeral 403 denotes a permanent magnet, and reference numeral 404 denotes a positioning pin, which are attached to the central portion of the permanent magnet. Reference numeral 405 denotes a front-side pole piece, reference numeral 406 denotes an outer peripheral-side disc support ring, reference numeral 407 denotes an inner peripheral-side disc support member, reference numeral 408 denotes a coil-side yoke material, and reference numeral 409 denotes a magnetic void portion (first transmission portion). By "permanent magnet 403→front-side pole piece 405→coil-side yoke material 408→rear-side disc 401→permanent magnet 403", a closed loop magnetic circuit is formed as indicated by a chain arrow. Although not limited to the present embodiment and other embodiments are similar, the discs 401 and 402, which are elastic support members, may not have a spiral shape, and may be, for example, a known cloud spring.

The rear-side disc 401 and the front-side disc 402 may not have the same shape and material. On the inner peripheral side of the front-side disc 402, the inner peripheral-side disc support member 407 made of a non-conductive material is interposed in order to achieve electrical insulation from the front-side pole piece 405. The front-side disc 402 is preferably made of a non-magnetic material. On the outer peripheral side, the outer peripheral-side disc support ring 406 made of a non-conductive material is interposed in order to achieve electrical insulation from the coil-side yoke material 408. However, electrical insulation of the rear-side disc 401 is unnecessary. According to the present embodiment that does not require a magnetic coupling portion, a servo-type acceleration sensor can be realized with a simple configuration.

Fifth Embodiment

Figure 16:
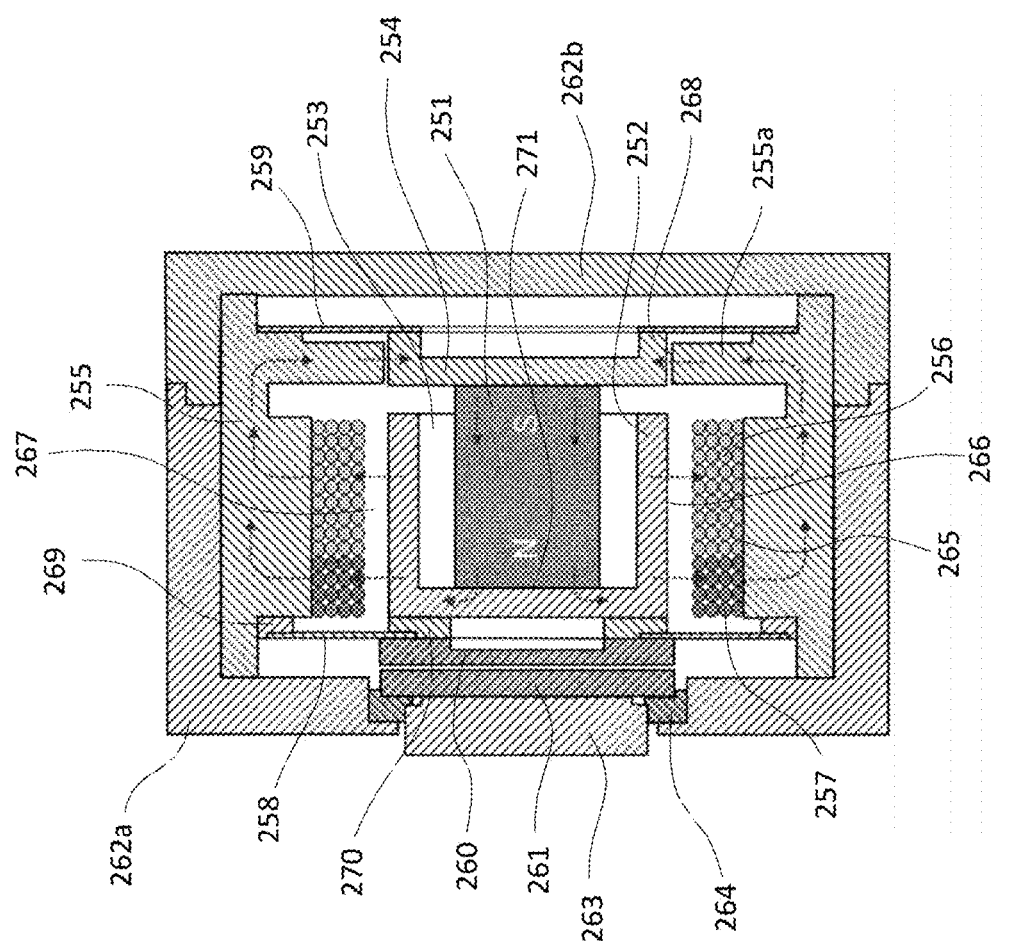
FIG. 16 is a front cross-sectional view of a servo-type acceleration sensor according to a fifth embodiment of the present invention.

FIG. 16 is a front cross-sectional view of a servo-type acceleration sensor according to a fifth embodiment of the present invention. The sensor body is made compact by disposing a permanent magnet in a cylindrical void portion of the front-side pole piece. Reference numeral 251 denotes a permanent magnet magnetized in the axial direction, reference numeral 252 denotes a front-side pole piece, and reference numeral 253 denotes a space formed between an outer surface of the permanent magnet and an inner surface of the front-side pole piece. Reference numeral 254 denotes a rear-side pole piece, reference numeral 255 denotes a coil-side yoke material, reference numeral 255a denotes a protruding portion formed on an inner surface of the coil-side yoke material, reference numeral 256 denotes a force coil, and reference numeral 257 denotes a verification coil. Reference numeral 258 denotes a front-side disc, reference numeral 259 denotes a rear-side disc, reference numeral 260 denotes a movable-side electrode, reference numeral 261 denotes a fixed-side electrode, reference numeral 262a denotes a front-side panel, reference numeral 262b denotes a rear-side panel, reference numeral 263 denotes a center plate, reference numeral 264 denotes a fastening member, reference numeral 265 denotes a coil mounting portion on an inner peripheral surface of the coil-side yoke material, reference numeral 266 denotes a coil opposing surface of the front-side pole piece 252, and a magnetic void portion 267 in a radial direction is formed between the coil opposing surface 266 and the coil mounting portion 265.

A point that an annular void portion 268 formed by a narrow gap is provided between the protruding portion 255a of the coil-side yoke material and the rear-side pole piece 254 is the same as in the above-described embodiment. Reference numeral 269 denotes an outer peripheral-side support ring, and reference numeral 270 denotes an inner peripheral-side support ring.

The permanent magnet is housed in a cylindrical void portion 253, and one end surface is fixed to a front-side end surface 271 of the front-side pole piece. The other end surface of the permanent magnet is fixed to the rear-side pole piece.

By "permanent magnet 251→front-side pole piece 252→magnetic void portion 267→coil-side yoke material 255→protruding portion 255a→annular void portion 268→rear-side pole piece 254→permanent magnet 251", a closed loop magnetic circuit is formed as indicated by a chain arrow.

Sixth Embodiment

Figure 17:
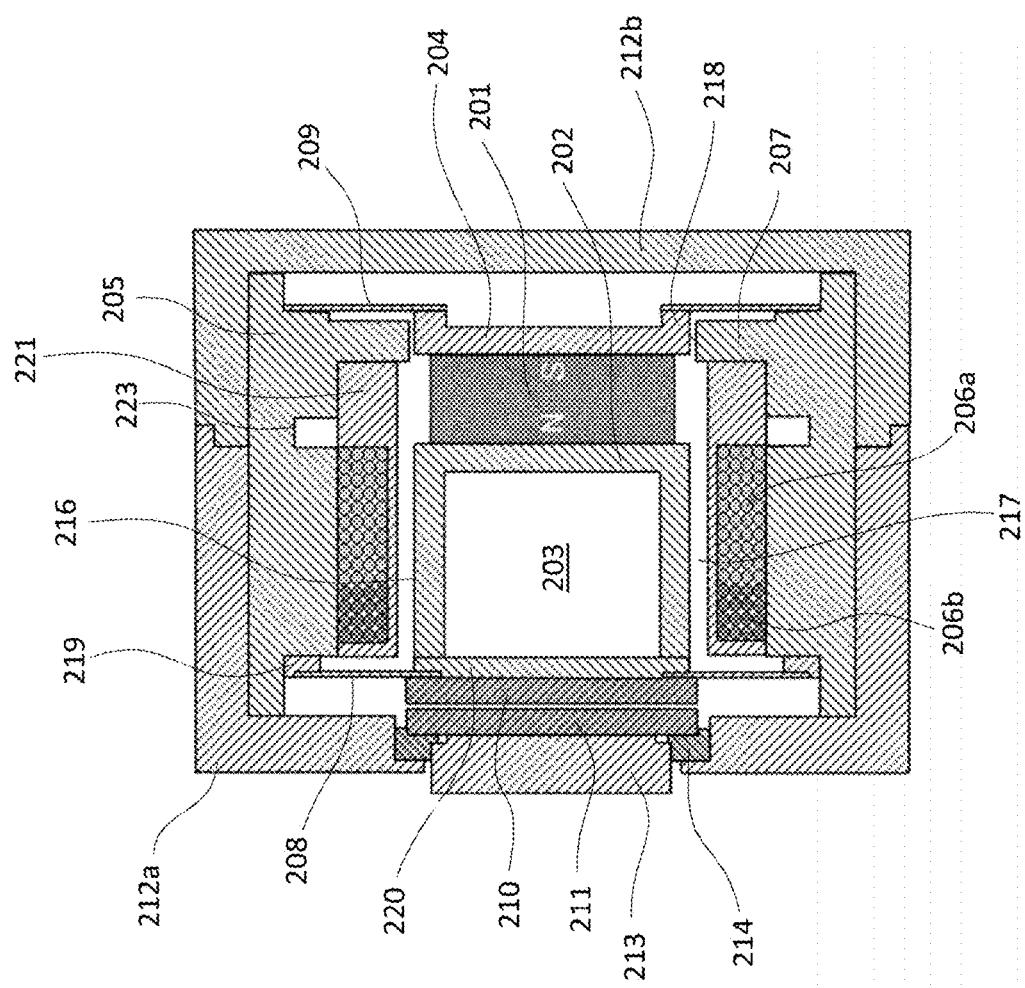
FIG. 17 is a front cross-sectional view of a servo-type acceleration sensor according to a sixth embodiment of the present invention.

FIG. 17 is a front cross-sectional view of a servo-type acceleration sensor according to a sixth embodiment of the present invention. A magnetic path shape capable of improving a heat dissipation effect and reducing leakage magnetic flux is configured using a coil bobbin made of a material having good thermal conductivity. That is, the present invention achieves both the effect of reducing sensor noise that leads to thermal noise and the improvement of the generated force of the actuator.

Reference numeral 201 denotes a permanent magnet magnetized in the axial direction, reference numeral 202 denotes a front-side pole piece, reference numeral 203 denotes a cylindrical void portion formed inside the front-side pole piece, reference numeral 204 denotes a rear-side pole piece, reference numeral 205 denotes a coil-side yoke material, reference numeral 206a denotes a force coil, and reference numeral 206b denotes a verification coil. Reference numeral 207 denotes a protruding portion formed on an inner surface of the coil-side yoke material, reference numeral 208 denotes a front-side disc, reference numeral 209 denotes a rear-side disc, reference numeral 210 denotes a movable-side electrode, reference numeral 211 denotes a fixed-side electrode, reference numeral 212a denotes a front-side panel, reference numeral 212b denotes a rear-side panel, reference numeral 213 denotes a center plate, reference numeral 214 denotes a fastening member, reference numeral 215 denotes a coil mounting portion on an inner peripheral surface of the coil-side yoke material, reference numeral 216 denotes a coil opposing surface of the front-side pole piece 202, and a radial magnetic void portion 217 is formed between the coil opposing surface 216 and the coil mounting portion 215. A point that the annular void portion 218 formed by a narrow gap is provided between the protruding portion 207 of the coil-side yoke material and the rear-side pole piece 204 is the same as in the above-described embodiment. Reference numeral 219 denotes an outer peripheral-side support ring, and reference numeral 220 denotes an inner peripheral-side support member.

Reference numeral 221 denotes a coil bobbin, reference numeral 223 denotes a recessed portion formed between the outer peripheral portion of the coil bobbin and the coil-side yoke material 201, and in the embodiment, the coil bobbin 221 is made of a non-magnetic material and made of an aluminum material having good thermal conductivity.

Figure 18:
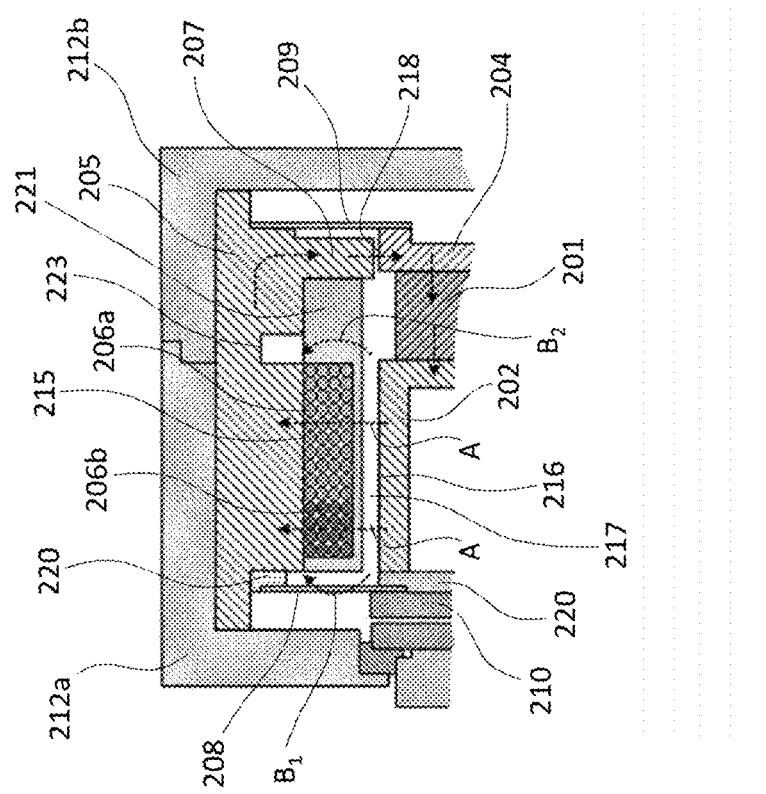
FIG. 18 is a view illustrating a flow of magnetic flux in the sixth embodiment with arrows (chain lines).

FIG. 18 illustrates the flow of the magnetic flux in the present embodiment by an arrow (chain line). The non-magnetic member constituting the acceleration sensor is displayed as an image of "sand". In addition, members using a magnetic material are indicated by normal "oblique lines". That is, the front-side panel 212a, the rear-side panel 212b, the coil bobbin 221, the force coil 206a, the verification coil 206b, the outer peripheral-side support ring 220, the inner peripheral-side support member 220, the front-side disc 208, the rear-side disc 209, and the movable electrode 210 are made of a non-magnetic member. By "permanent magnet 201→front-side pole piece 202→magnetic void portion 217 and coil-side yoke material 205 →protruding portion 207→annular void portion 218→rear-side pole piece 204→permanent magnet 201", a closed loop magnetic circuit is formed as indicated by a chain arrow.

The magnetic flux A flowing vertically through the magnetic void portion 217 effectively contributes to the generated force of the actuator. The magnetic fluxes $B_1$ and $B_2$ flowing from the corners of the coil opposing surface 216 to the corners of the inner peripheral surface of the coil-side yoke material 205 are leakage magnetic fluxes and do not contribute to the generated force. The ease of flow of the magnetic flux in the magnetic circuit is expressed by permeance, which is the reciprocal of the magnetic resistance. That is, the gap permeance of the magnetic path through which the magnetic flux A flows is $P_g$. The leakage permeance of the magnetic paths through which the leakage magnetic fluxes $B_1$ and $B_2$ flow are set to $P_{f1}$ and $P_{f2}$, respectively. When $P_g \gg P_{f1}$ or $P_g \gg P_{f2}$ is satisfied, a large generated force can be obtained. The recessed portion 223 formed in the coil-side yoke material greatly contributes to reducing the leakage magnetic flux $B_2$ and reducing the leakage permeance $P_{f2}$. The recessed portion 223 is formed in the inner surface of the coil-side yoke material in the vicinity of the axial end surface of the coil such that a radial distance between the movable portion and the fixed member is longer than that between both ends. The effect of reducing the leakage magnetic flux by the recessed portion 223 is not limited to the present embodiment. In addition, since all the peripheral members through which the leakage magnetic flux $B_1$ flows are made of a non-magnetic material, the leakage permeance $P_{f1}$ can be sufficiently reduced.

Figure 19:
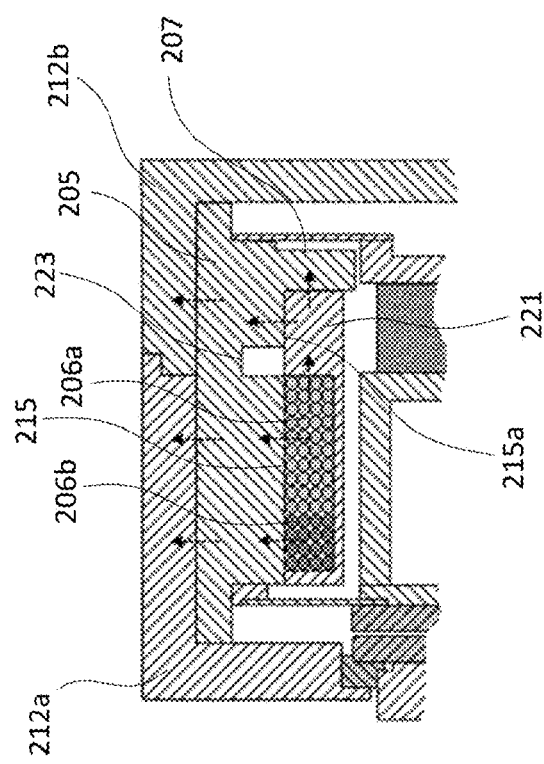
FIG. 19 is a view illustrating a flow of heat in the sixth embodiment with arrows (chain lines).

FIG. 19 illustrates a flow of heat in the present embodiment by an arrow (chain line). The outer peripheral surface of the coil bobbin 221 is in close contact with the inner peripheral surface 215 of the coil-side yoke material. The protruding portion 207 extends so as to cover the recessed portion 223, and is also in close contact with the side surface of the protruding portion 207 and the inner peripheral surface 215a. Therefore, heat generated by the coil can be easily dissipated to the front-side panel 212a and the rear-side panel 212b through the aluminum bobbin 221 and the coil-side yoke material 205 as indicated by arrows in the drawing.

Figure 54:
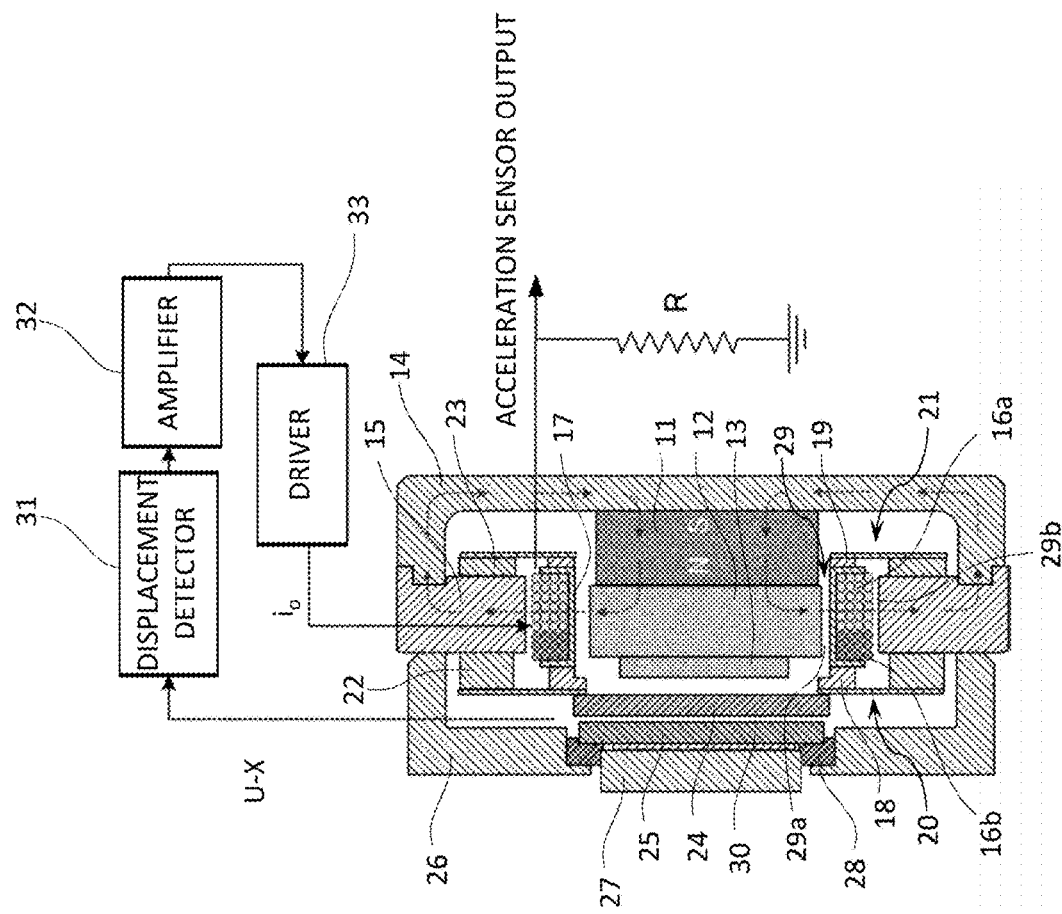
FIG. 54 is a front cross-sectional view illustrating a specific structure example of a conventional linear motion-type acceleration sensor.
Figure 55:
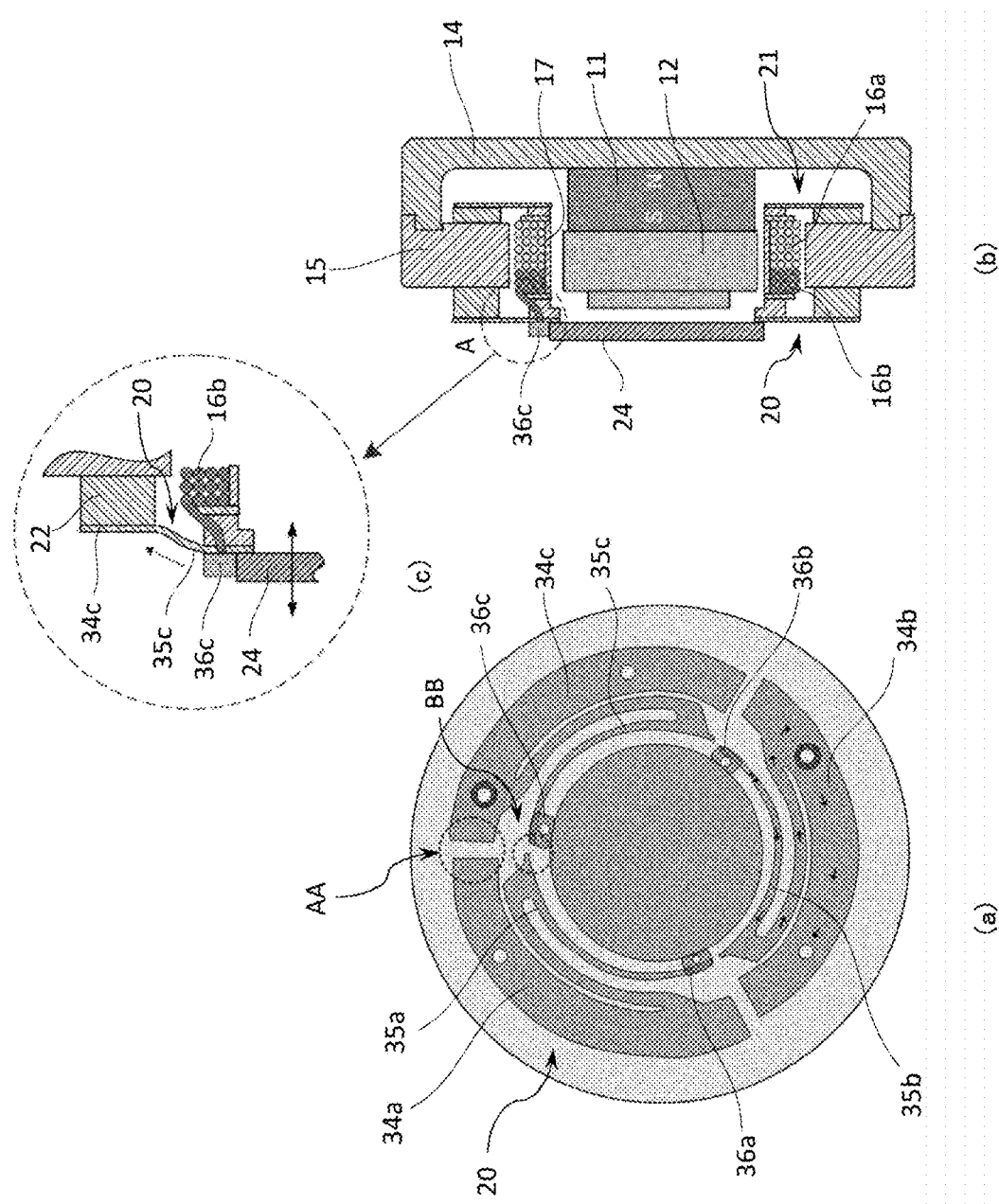
FIG. 55 is a conventional linear motion-type acceleration sensor, in which FIG. 55 at a is a front view illustrating a shape of a front-side disc-shaped spring, FIG. 55 at b is a front cross-sectional view in which a front-side panel 26, a fixed-side electrode 25, and the like are removed from FIG. 54, and FIG. 55 at c is an enlarged view of a portion A in FIG. 55 at b.

In the case of the conventional linear motion-type acceleration sensor (MC type) illustrated in FIG. 54, the coil bobbin 17 and the coils 16a and 16b are installed in a floating state in the air. The coil bobbin supporting members 18 and 19 supporting the coil bobbin 17 are made of a non-magnetic and non-conductive material. In addition, since the disc-shaped springs 20 and 21 are thin plate materials, the heat dissipation effect of the coil due to heat conduction cannot be expected.

Figure 56:
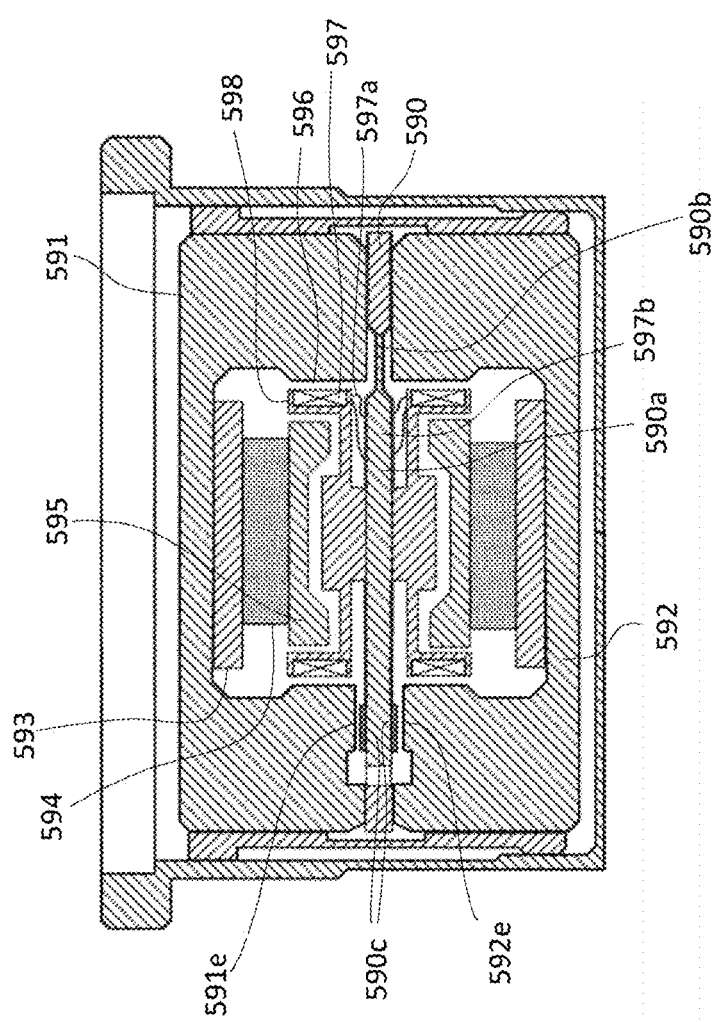
FIG. 56 is a front cross-sectional view illustrating an example of a conventional swing motion-type acceleration sensor.
Figure 57:
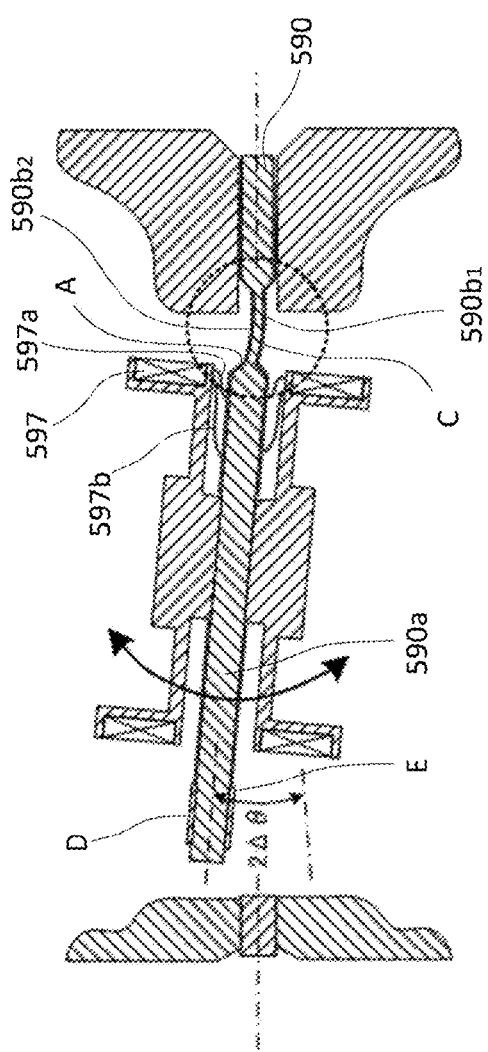
FIG. 57 is an enlarged view illustrating a state in which the pendulum of the swing motion-type acceleration sensor swings.
Figure 58:
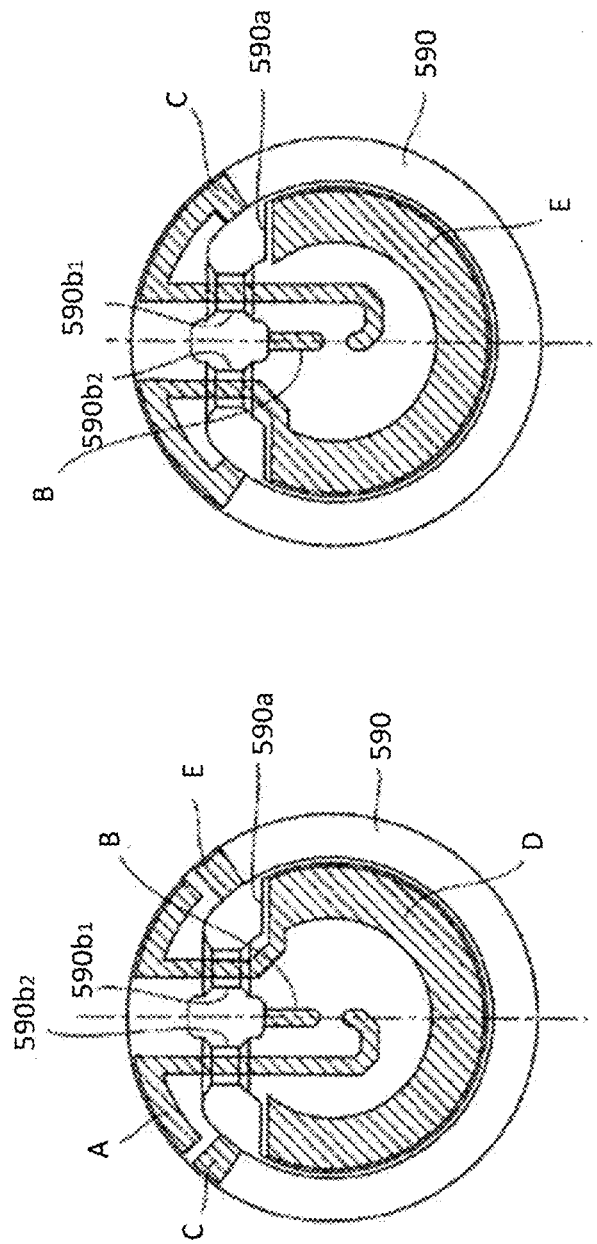
FIG. 58 is a plan view of a pendulum of a swing motion-type acceleration sensor, in which FIG. 58 at (a) is a view illustrating one surface of the pendulum, and FIG. 58 at (b) is a view illustrating the other surface.

The same applies to the conventional swing motion type moving coil type (MC type) illustrated in FIG. 56. Quartz glass (non-magnetic and non-conductive material) having low thermal conductivity is interposed in a thermal conductive path connecting a torque coil 597 and the fixed portion (magnetic yokes 591 and 592), and heat dissipation of the coil cannot be expected. That is, the reason why the heat dissipation effect of the coil can be sufficiently obtained in the sensor according to the present embodiment as compared with the conventional sensor is that the characteristic of the MM type capable of fixing and adhering the coil to the wall surface is used.

Seventh Embodiment

Figure 20:
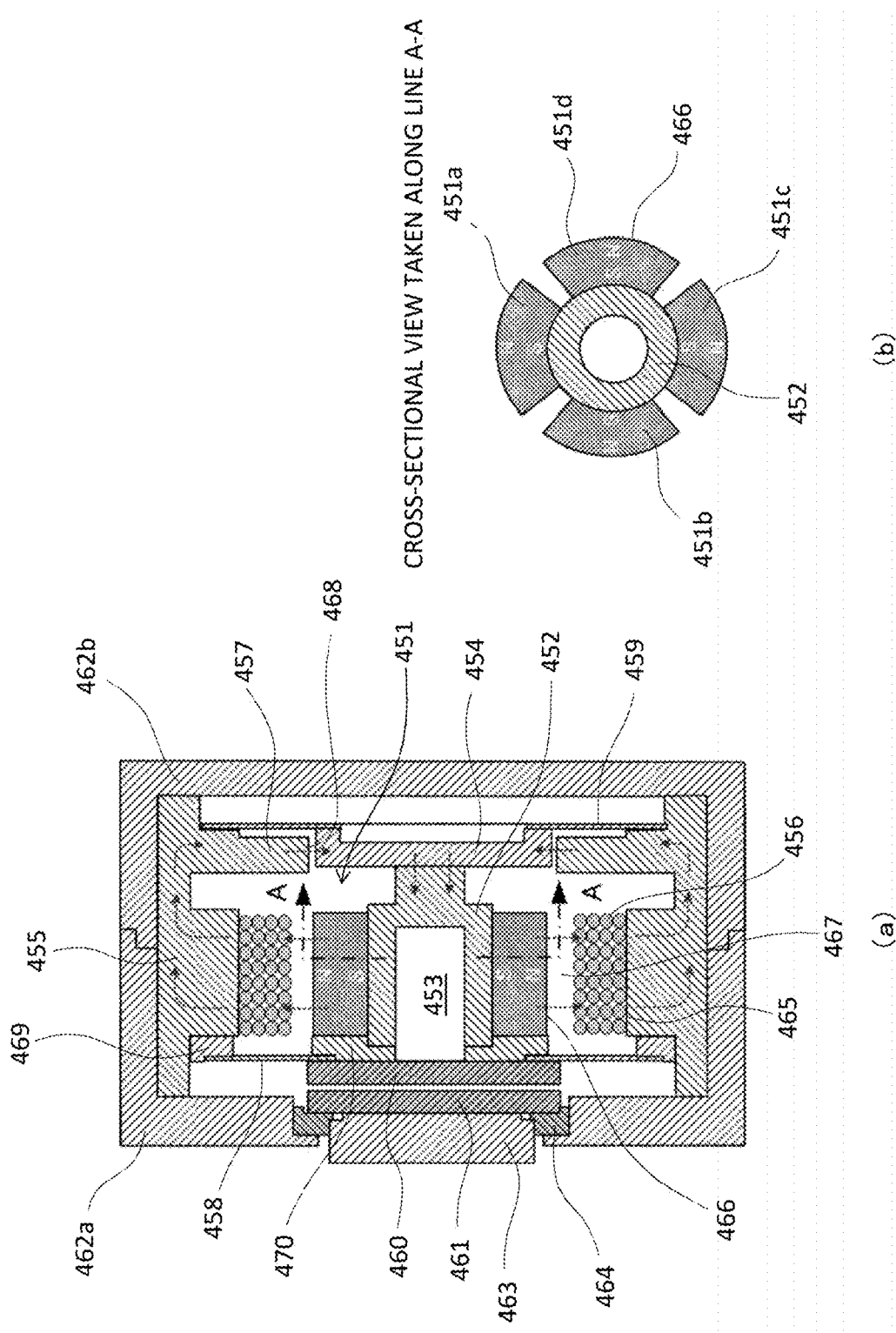

FIG. 20 at a is a front cross-sectional view of a servo-type acceleration sensor according to a seventh embodiment of the present invention, and FIG. 20 at b is a cross-sectional view taken along line A-A of FIG. 20 at a. The above-described embodiment has a sensor structure using permanent magnets that are all magnetized in the axial direction. In the present embodiment, a magnetic circuit is configured using a plurality of permanent magnets called segment-type magnetized in the radial direction.

Reference numeral 451 denotes a permanent magnet, and reference numeral 452 denotes a front-side pole piece. The permanent magnet includes segment-type permanent magnets 451a, 451b, 451c, and 451d magnetized in the radial direction, and is attached to the front-side pole piece 452. Reference numeral 453 denotes a cylindrical void portion formed to reduce the weight of the front-side pole piece. Reference numeral 454 denotes a rear-side pole piece, reference numeral 455 denotes a coil-side yoke material, and reference numeral 456 denotes a force coil or a coil portion including a force coil and a verification coil. Reference numeral 457 denotes a protruding portion formed on an inner surface of the coil-side yoke material, reference numeral 458 denotes a front-side disc, reference numeral 459 denotes a rear-side disc, reference numeral 460 denotes a movable-side electrode, reference numeral 461 denotes a fixed-side electrode, reference numeral 462a denotes a front-side panel, reference numeral 462b denotes a rear-side panel, reference numeral 463 denotes a center plate, reference numeral 464 denotes a fastening member, reference numeral 465 denotes a coil mounting portion on an inner peripheral surface of the coil-side yoke material, and reference numeral 466 denotes an outer peripheral surface of a permanent magnet, and correspond to a coil opposing surface. A magnetic void portion 467 in the radial direction is formed between the coil opposing surface 466 and the coil mounting portion 465. The above-described embodiment is similar in that an annular void portion 468 formed by a narrow gap is provided between the protruding portion 457 of the coil-side yoke material and the rear-side pole piece 454. Reference numeral 469 denotes an outer peripheral-side support ring, and 470 denotes an inner peripheral-side support ring. By "permanent magnet 451→magnetic void portion 467 →coil-side yoke material 455→protruding portion 457→annular void portion 468→rear-side pole piece 454→front-side pole piece 452→permanent magnet 451", a closed loop magnetic circuit is formed as indicated by a chain arrow.

Eighth Embodiment

Figure 21:
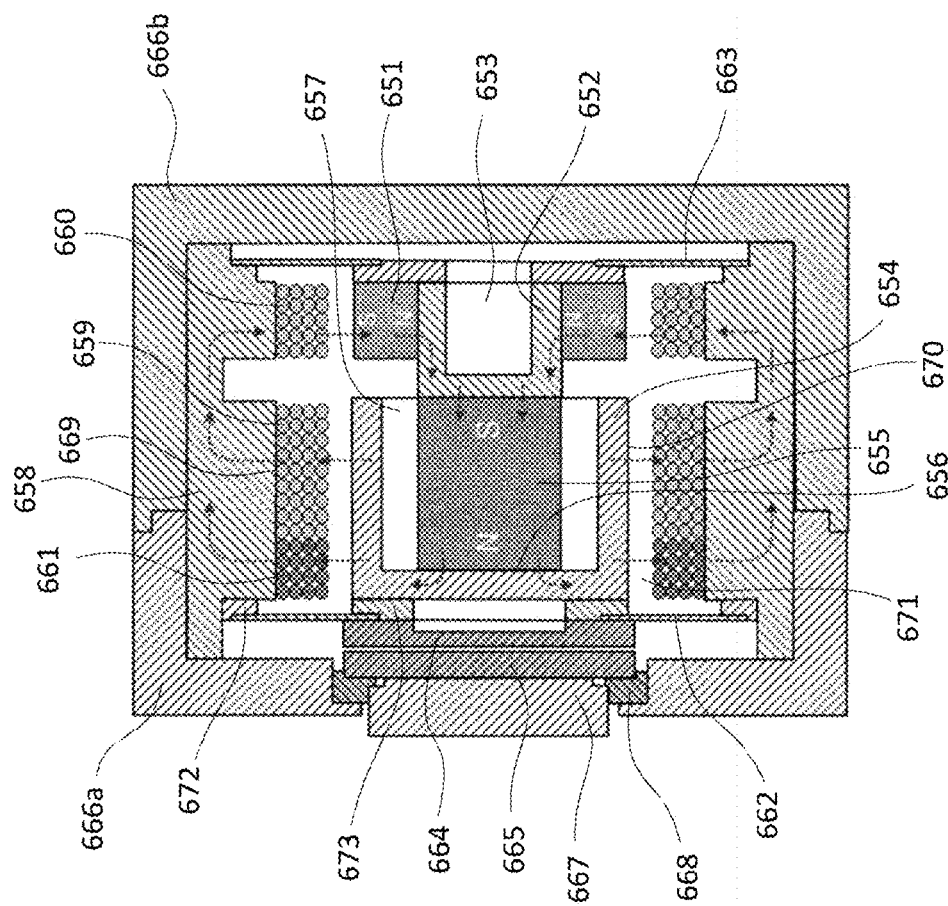
FIG. 21 is a front cross-sectional view of a servo-type acceleration sensor according to an eighth embodiment of the present invention.

FIG. 21 is a front cross-sectional view of a servo-type acceleration sensor according to an eighth embodiment of the present invention. In the above-described embodiment, the closed loop magnetic circuit is formed by providing the annular void portion (for example, a chain line circle B in FIG. 1 at b) by the narrow gap. In the present embodiment, not the annular void portion but a combination of a segment-type permanent magnet magnetized in the radial direction and a fixed-side coil constitutes a magnetic coupling portion for forming a closed loop magnetic circuit.

Reference numeral 651 denotes a segment-type permanent magnet (auxiliary magnet), and reference numeral 652 denotes a rear-side pole piece. The segment-type permanent magnet is configured of a plurality of segment-type permanent magnets (see FIG. 20 at b) magnetized in the radial direction similarly to the seventh embodiment, and is attached to the rear-side pole piece 652. Reference numeral 653 denotes a cylindrical void portion formed to reduce the weight of the rear-side pole piece. Reference numeral 654 denotes a front-side pole piece, reference numeral 655 denotes a permanent magnet magnetized in the axial direction, reference numeral 656 denotes a front-side end surface of the front-side pole piece, and reference numeral 657 denotes a cylindrical void portion formed inside the front-side pole piece. The permanent magnet 655 is housed in the cylindrical void portion 657, and one end surface is fixed to the front-side end surface 656 of the front-side pole piece. The other end surface of the permanent magnet is fixed to the rear-side pole piece. In the present embodiment, similarly to the fifth embodiment, the cylindrical void portion 657 of the front-side pole piece 654 is used, and the permanent magnet 655 is disposed in the void portion, thereby making the sensor body compact.

Reference numeral 658 denotes a coil-side yoke material, reference numeral 659 denotes a front-side force coil, reference numeral 660 denotes a rear-side force coil (auxiliary coil), and reference numeral 661 denotes a verification coil part.

Reference numeral 662 denotes a front-side disc, reference numeral 663 denotes a rear-side disc, reference numeral 664 denotes a movable-side electrode, reference numeral 665 denotes a fixed-side electrode, reference numeral 666a denotes a front-side panel, reference numeral 666b denotes a rear-side panel, reference numeral 667 denotes a center plate, reference numeral 668 denotes a fastening member, reference numeral 669 denotes a coil mounting portion on an inner peripheral surface of the coil-side yoke material, reference numeral 670 denotes a coil opposing surface (an outer peripheral surface of a front-side pole piece), reference numeral 671 denotes a magnetic void portion, reference numeral 672 denotes an outer peripheral-side support ring, and reference numeral 673 denotes an inner peripheral-side support ring. By "permanent magnet 655→front-side pole piece 654→magnetic void portion 671→coil-side yoke material 658→permanent magnet 651→rear-side pole piece 652→permanent magnet 655", a closed loop magnetic circuit is formed as indicated by a chain arrow.

In the present embodiment, since the magnetic coupling portion is configured by the magnet magnetized in the radial direction and the fixed coil, both the front side and the rear side function as a voice coil motor, so that the generated force can be improved. Similarly to the first embodiment, the radial gap of the magnetic void portion 671 is 2.5 mm, and the radial gap between the coil opposing surface 670 and the coil is about 0.5 mm. Therefore, assembly at the time of mass production is easy as compared with a case where the annular void portion is configured with a narrow gap (for example, the annular void portion 118 of the first embodiment).

Ninth Embodiment

Figure 22:
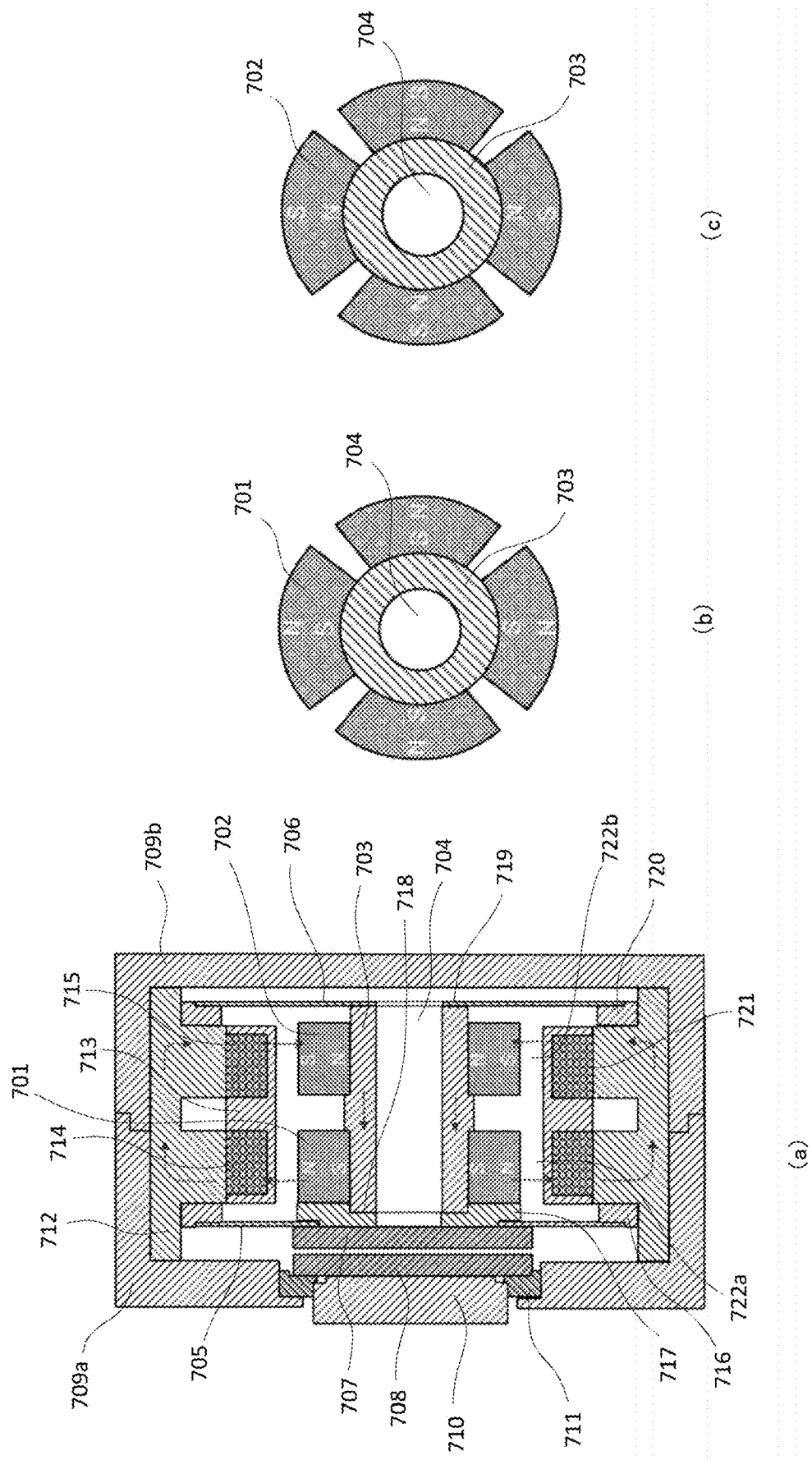
FIG. 22 is a servo-type acceleration sensor according to a ninth embodiment of the present invention, in which FIG. 22 at a is a front cross-sectional view, and FIG. 22 at b and 22 at c are cross-sectional views illustrating a segment-type permanent magnet.

FIG. 22 at a is a front cross-sectional view of a servo-type acceleration sensor according to a ninth embodiment of the present invention, and FIG. 22 at b and 22 at c are cross-sectional views illustrating a segment-type permanent magnet magnetized in a radial direction used in the present embodiment.

In the present embodiment, the front-side permanent magnet is configured by a segment-type magnet magnetized in the radial direction, and the magnetic coupling portion is also configured by a segment-type magnet magnetized in the radial direction and a fixed coil. Since both the front side and the rear side function as voice coil motors, the generated force can be improved. Reference numeral 701 denotes a front-side permanent magnet, reference numeral 702 denotes a rear-side permanent magnet, and reference numeral 703 denotes a pole piece (movable-side yoke material). Both the front-side permanent magnet and the rear-side permanent magnet include a plurality of segment-type permanent magnets magnetized in the radial direction, and are attached to the pole piece 703. As illustrated in FIGS. 22 at b and 22 at c, the magnetization directions of the permanent magnets in the radial direction are opposite to each other.

Reference numeral 704 denotes a void portion of the pole piece, reference numeral 705 denotes a front-side disc, reference numeral 706 denotes a rear-side disc, reference numeral 707 denotes a movable-side electrode, reference numeral 708 denotes a fixed-side electrode, reference numeral 709a denotes a front-side panel, reference numeral 709b denotes a rear-side panel, reference numeral 710 denotes a center plate, reference numeral 711 denotes a fastening member, reference numeral 712 denotes a coil-side yoke material, reference numeral 713 denotes a coil bobbin, reference numeral 714 denotes a front-side coil, and reference numeral 715 denotes a rear-side coil. Reference numeral 716 denotes an outer peripheral-side support ring, reference numeral 717 denotes an inner peripheral-side support ring, reference numeral 718 denotes a front-side end surface of the pole piece, reference numeral 719 denotes a rear-side end surface of the pole piece, reference numeral 720 denotes a support ring of the rear-side disc spring, and reference numeral 721 denotes a coil mounting portion which is an inner peripheral surface of the coil-side yoke material 712. Reference numerals 722a and 722b denote magnetic void portions formed between the coil mounting portion and the two permanent magnets on the front side and the rear side. By "permanent magnet 701→coil-side yoke material 712→permanent magnet 702→pole piece 703→permanent magnet 713", a closed loop magnetic circuit is formed as indicated by a chain arrow. In the present embodiment, a space formed by the rear-side permanent magnet and the rear-side coil is a magnetic coupling portion. In the present embodiment, since both the front side and the rear side function as voice coil motors, the generated force can be improved. Further, the radial gap between the magnetic void portions 722a and 722b is 2.5 mm, and the radial gap between the outer peripheral surfaces of the two permanent magnets and the coil bobbin is about 0.5 mm. Therefore, assembly at the time of mass production is easy as compared with a case where the annular void portion is configured with a narrow gap (for example, the annular void portion 118 of the first embodiment).

Tenth Embodiment

Figure 23:
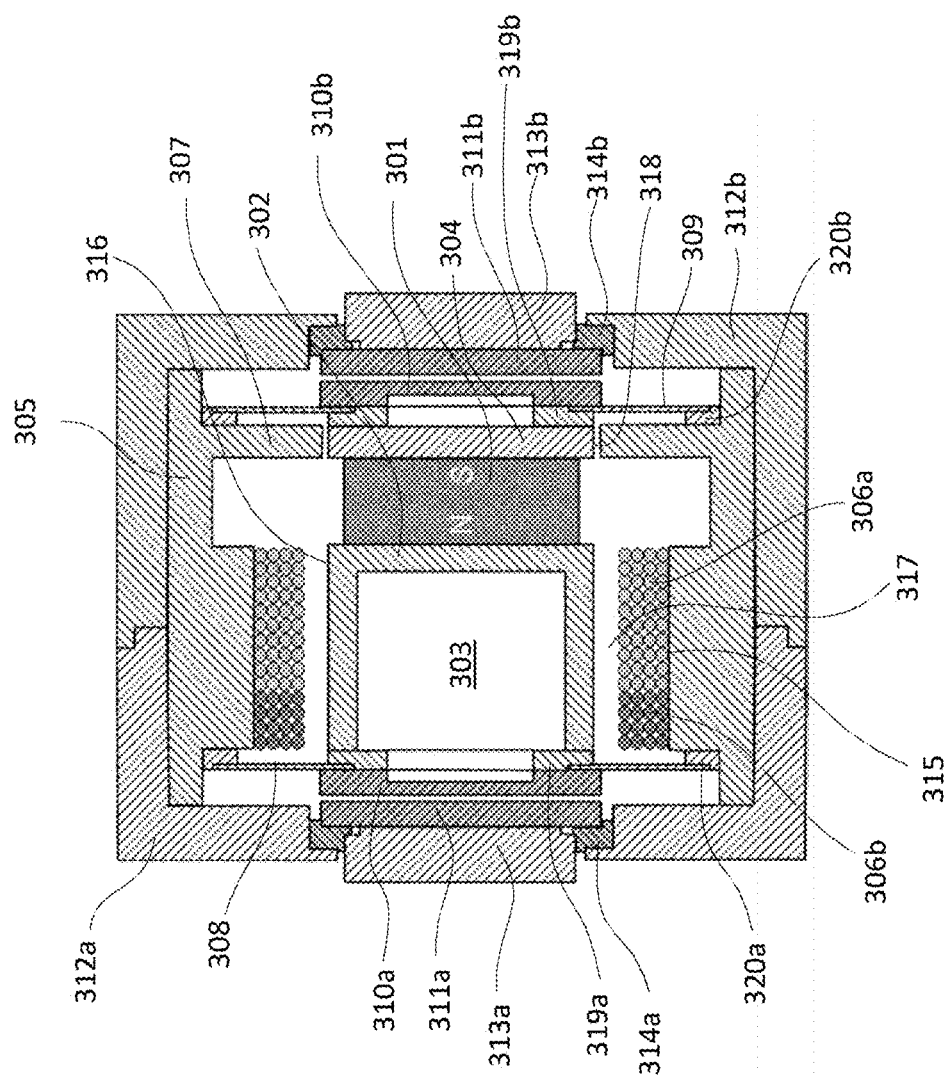
FIG. 23 is a front cross-sectional view of a servo-type acceleration sensor according to a tenth embodiment of the present invention.

FIG. 23 is a front cross-sectional view of a differential servo-type acceleration sensor according to a tenth embodiment of the present invention. That is, focusing on the structural characteristics of the linear motion MM type in which both the left and right output shafts are open ends, electrodes for detecting electrostatic capacitance are provided at two positions on the left and right to configure a differential electrostatic capacitance-type sensor. By making the acceleration sensor differential, it is possible to realize a high-resolution sensor in which the sensor output is hardly affected by disturbance signals such as noise and drift.

(i) Structure Description

Reference numeral 301 denotes a permanent magnet, reference numeral 302 denotes a front-side pole piece, and reference numeral 303 denotes a cylindrical void portion (inertial mass adjustment portion). Reference numeral 304 denotes a rear-side pole piece, reference numeral 305 denotes a coil-side yoke material, reference numeral 306a denotes a force coil, reference numeral 306b denotes a verification coil, and reference numeral 307 denotes a protruding portion formed on an inner surface of the coil-side yoke material. Reference numeral 308 denotes a front-side disc, and reference numeral 309 denotes a rear-side disc. Reference numeral 310a denotes a front-side movable-side electrode, reference numeral 311a denotes a front-side fixed-side electrode, reference numeral 310b denotes a rear-side movable-side electrode, and reference numeral 311b denotes a rear-side fixed-side electrode.

Reference numeral 312a denotes a front-side panel, 312b denotes a rear-side panel, 313a denotes a front-side center plate, reference numeral 313b denotes a rear-side center plate, reference numeral 314a denotes a front-side fastening member, and reference numeral 314b denotes a rear-side fastening member. Reference numeral 315 denotes an inner peripheral surface of the coil-side yoke material 305, reference numeral 316 denotes a coil opposing surface of the front-side pole piece, and reference numeral 317 denotes a radial magnetic void portion formed between the coil opposing surface 316 and the coil mounting portion 315. An annular void portion 318 formed by a narrow gap is provided between the protruding portion 307 of the coil-side yoke material and the rear-side pole piece 304.

In addition, the annular void portion 318 has a narrow gap in which the magnetic resistance is sufficiently smaller than that of the magnetic void portion 317. Similarly to the first embodiment, a closed loop magnetic circuit is formed by "permanent magnet 301→front-side pole piece 302→magnetic void portion 317→coil-side yoke material 305→annular void portion 318→rear-side pole piece 304". The lead wires of the force coil 306a and the verification coil 306b pass through the coil-side yoke material 305 and the front-side panel 312a, and are connected to a control circuit installed outside (not illustrated), which is similar to the first embodiment. Reference numeral 319a denotes a front-side disc inner peripheral-side support ring, reference numeral 319b denotes a rear-side disc inner peripheral-side support ring, reference numeral 320a denotes a front-side disc outer peripheral-side support ring, and reference numeral 320b denotes a rear-side disc outer peripheral-side support ring. The four rings are made of a non-conductive material.

The method for fastening the front-side disc 308 and the rear-side disc 309 is the same as that in the first embodiment. In addition, a method of connecting a conductive wire for detecting electrostatic capacitance between the movable electrode and the fixed electrode and the outside is also the same as that of the first embodiment (not illustrated).

Figure 24:
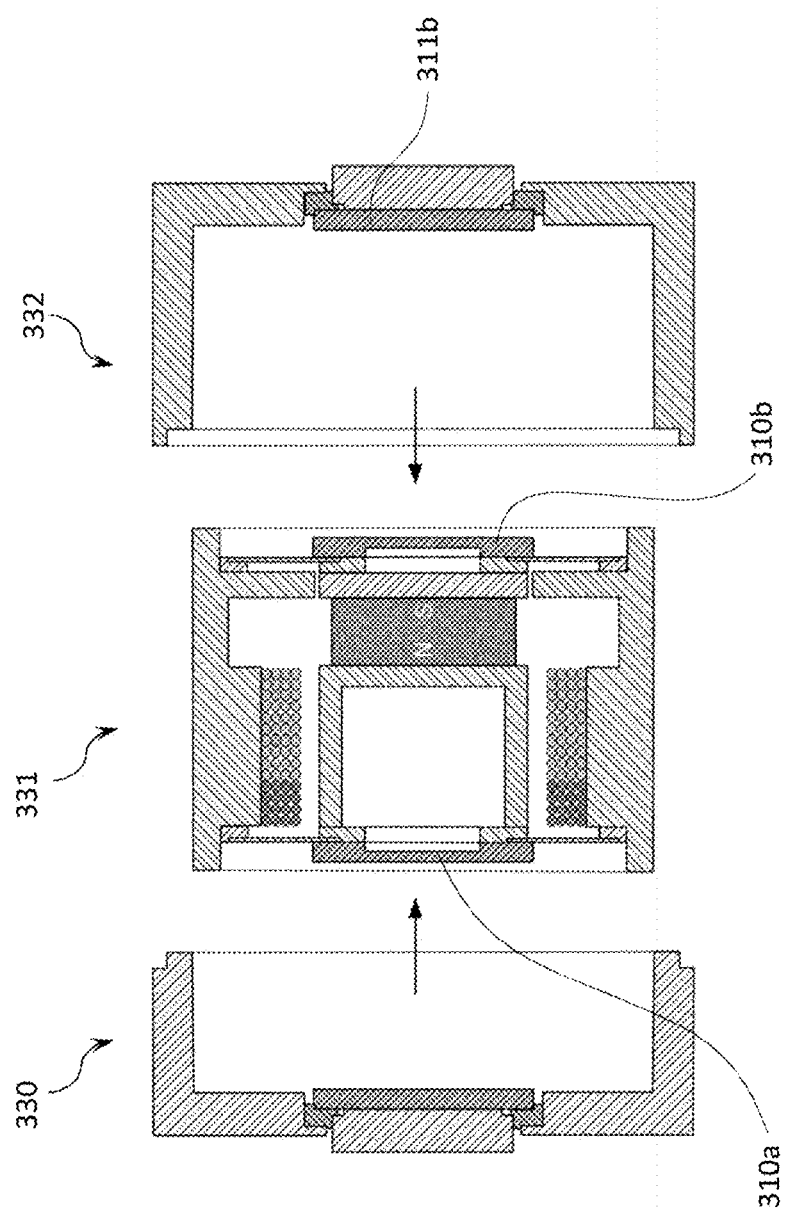
FIG. 24 is a view illustrating that a differential servo-type acceleration sensor according to the tenth embodiment can include three units.

FIG. 24 is a view illustrating that the differential servo-type acceleration sensor according to the present embodiment can include three units. Reference numeral 330 denotes a front-side unit, reference numeral 331 denotes a drive unit, and reference numeral 332 denotes a rear-side unit. Each unit is an independent unit, and each component can be mounted. When the component mounting of each unit is completed, the three units are combined as indicated by arrows in the drawing. After the combination, a gap between the movable electrode on the front side and the fixed electrode and a gap between the movable electrode on the rear side and the fixed electrode may be adjusted. In the servo-type acceleration sensor of the present invention, it is extremely easy to select the differential type and the non-differential type as compared with the conventional acceleration sensor. Here, the first embodiment of the non-differential type (FIG. 1) and the present the tenth embodiment of the differential type (FIG. 23, FIG. 24) will be compared. In order to achieve the differential type, it is only necessary to attach the rear-side movable-side electrode 310b to the drive unit 331 and attach the rear-side fixed-side electrode 311b to the rear-side unit 332. Therefore, the selection from the non-differential type to the differential type does not greatly increase the cost.

Further, the adjustment of the electrode gap performed at the final stage of mass production, that is, the adjustment of the gap between the rear-side movable-side electrode 310b and the rear-side fixed-side electrode 311b can be performed independently of the front side. For example, after the adjustment of the front side is completed, the adjustment of the rear side may be performed.

(ii) Description of Drift/Noise Reduction Effect

Figure 25:
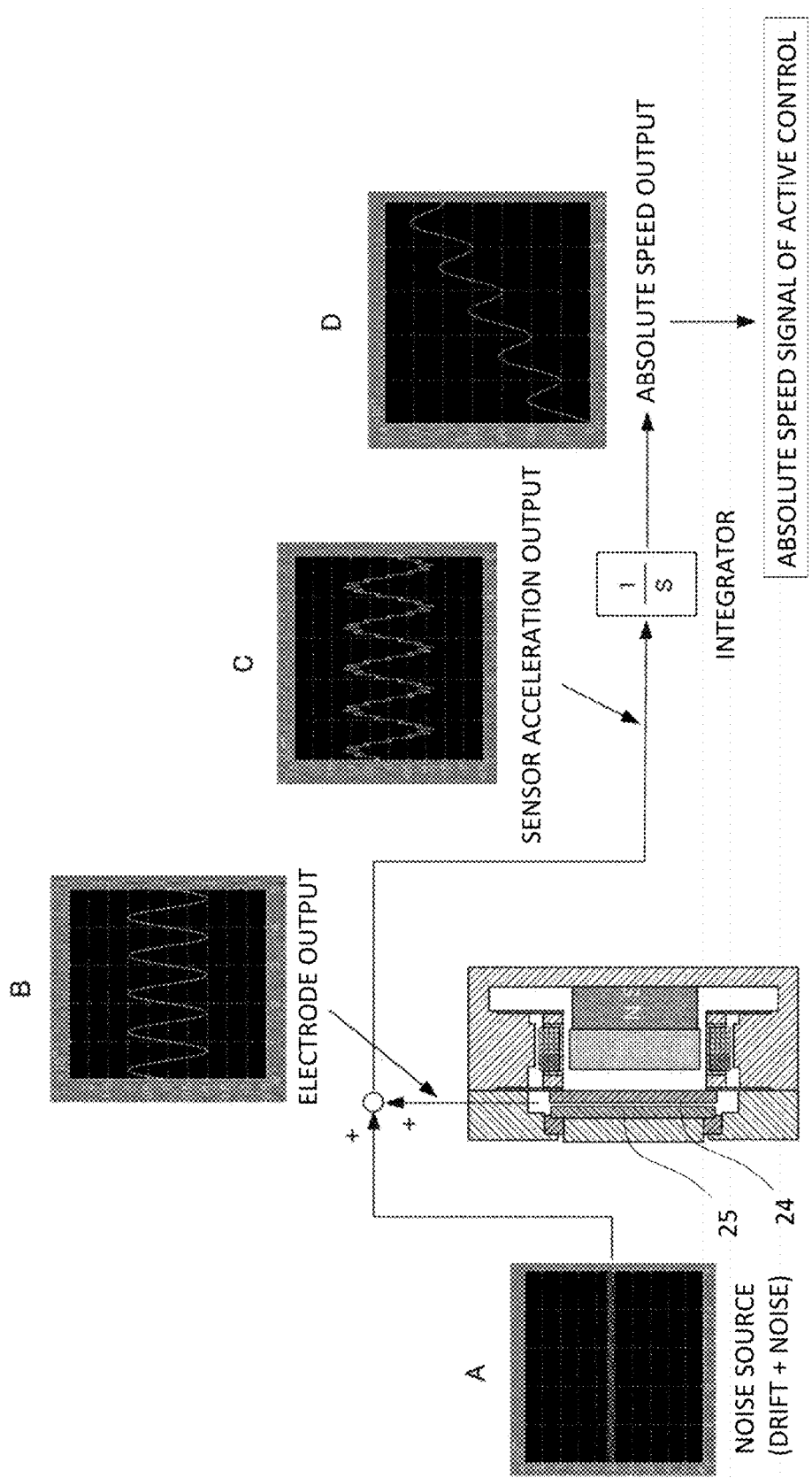
FIG. 25 is a view illustrating a relationship among electrode output, noise, drift, and sensor acceleration output in the case of a conventional acceleration sensor.

Hereinafter, the drift noise reduction effect of the sensor according to the present embodiment will be described on the basis of comparison with the conventional sensor. FIG. 25 illustrates the relationship among the electrode output, the noise, the drift, and the sensor acceleration output in the case of the conventional acceleration sensor (see FIG. 54). The electrode output is obtained by detecting electrostatic capacitance determined by a gap between the movable electrode 24 and the fixed electrode 25. A graph A of noise and drift is obtained by adding a minute positive bias value to a sine wave. The sensor acceleration output (graph C) is a result of applying noise and drift (graph A) to the electrode output (graph B).

Further, in the active vibration isolator, absolute speed feedback and absolute displacement feedback are performed in order to obtain vibration isolation performance in a low frequency range. In order to obtain an absolute speed signal, the acceleration signal needs to be integrated once, and in order to obtain an absolute displacement signal, the acceleration signal needs to be integrated twice. A graph D of FIG. 25 illustrates an absolute speed output obtained by integrating the sensor acceleration output (graph C) once by complete integration. The speed signal on which the noise is superimposed diverges due to the influence of the drift. In order to solve the above problem, in an actual active vibration isolator, the complete integration 1/s cannot be used, and the output of the acceleration sensor is integrated by the incomplete integration 1/(s+a) to obtain an approximate speed signal. Further, a method of integrating the speed signal by a similar integrator to obtain an approximate displacement signal is adopted. However, in the signal that has passed through the incomplete integration, the phase delay angle does not become the value in the case of the complete integration in the low frequency region, and as a result, an accurate negative feedback signal cannot be obtained. As a result, the phase is delayed in the low frequency region and the gain is increased, so that there is a problem that a sufficient vibration removal characteristic cannot be obtained.

Figure 26:
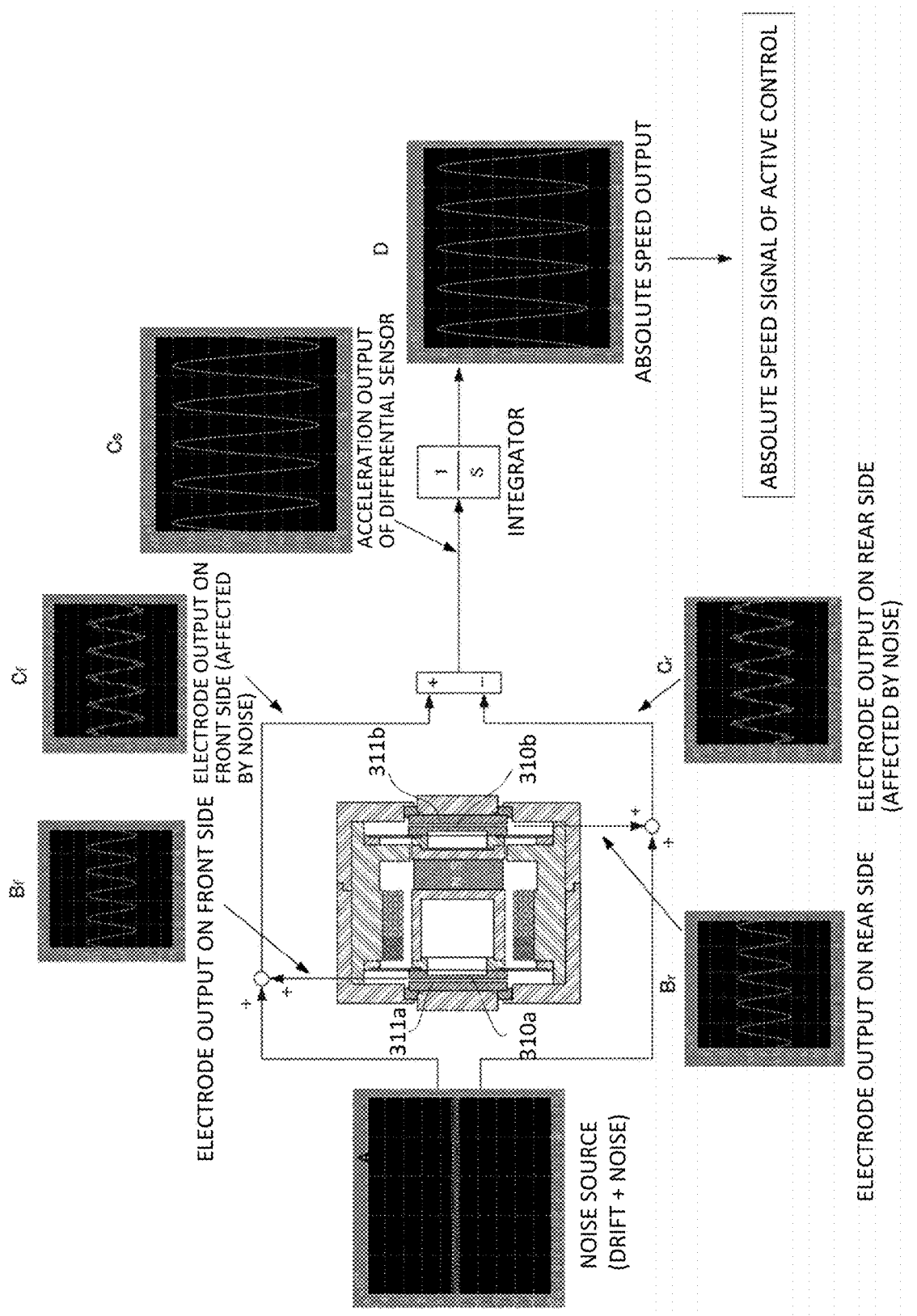
FIG. 26 is a view illustrating a relationship among two electrode outputs, noise and drift, and sensor acceleration output in the case of the acceleration sensor according to the tenth embodiment.

FIG. 26 illustrates a relationship between two electrode outputs, noise and drift, and sensor acceleration output in the case of the acceleration sensor according to the present embodiment.

The electrode output $B_f$ on the front side is obtained by detecting the electrostatic capacitance determined by the gap between the movable electrode 310a and the fixed electrode 311a, and the electrode output $B_r$ on the rear side is obtained by detecting the electrostatic capacitance determined by the gap between the movable electrode 310b and the fixed electrode 311b. By commonly adding noise and drift to these electrode outputs, the front-side electrode output becomes $B_f \rightarrow C_f$, and the rear-side electrode output becomes $B_r \rightarrow C_r$. As a result, the acceleration output $C_s$ of the differential sensor has a waveform in which noise and drift are canceled. Further, the absolute speed signal D obtained by completely integrating the acceleration output and the absolute displacement signal (not illustrated) do not diverge. Therefore, in a case where the acceleration sensor of the present embodiment is applied to the active vibration isolator, in addition to the effect (for example, the positioning accuracy of the stage is improved) by improving the sensor sensitivity, a significant vibration isolation characteristic improvement effect can be obtained in the low frequency region.

Eleventh Embodiment

Figure 27:
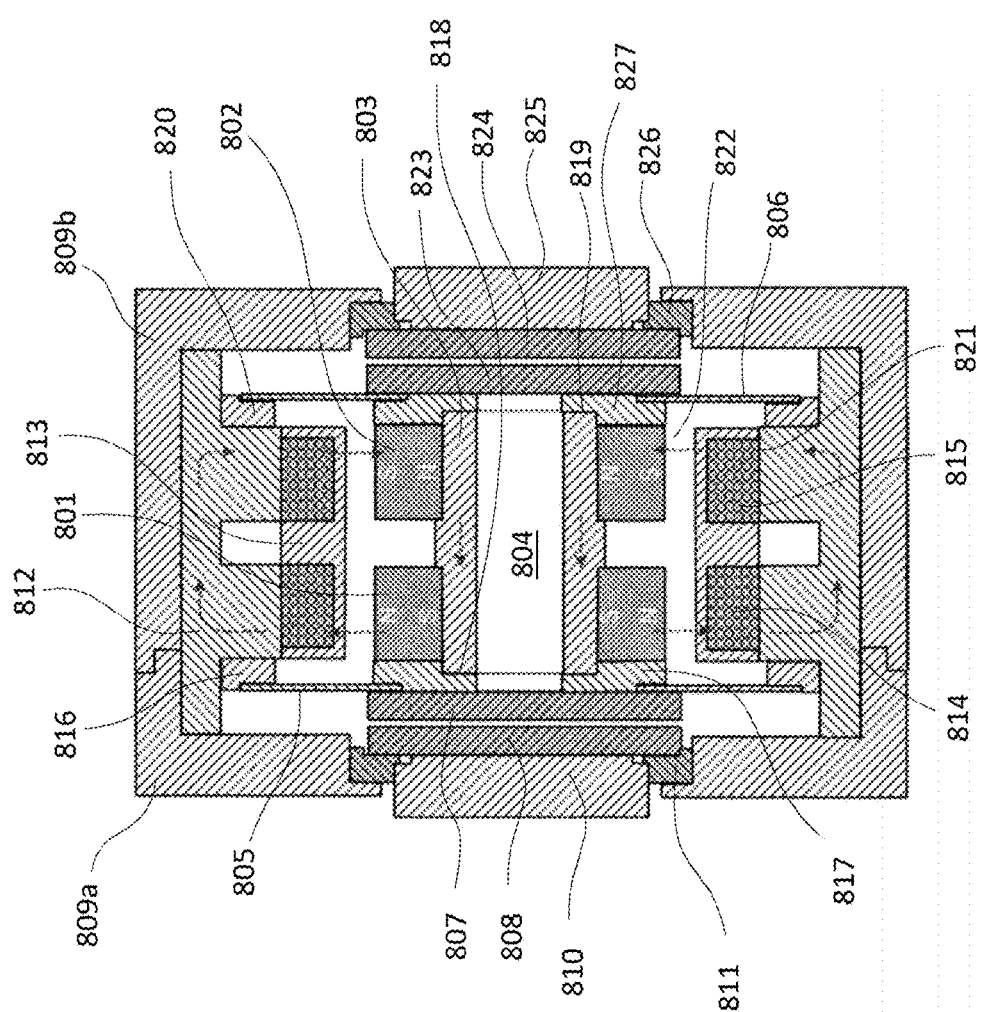
FIG. 27 is a front cross-sectional view of a servo-type acceleration sensor according to an eleventh embodiment of the present invention.

FIG. 27 is a front cross-sectional view of a differential servo-type acceleration sensor according to an eleventh embodiment of the present invention. Similarly to the tenth embodiment described above, a differential electrostatic capacitance-type sensor is configured by providing electrodes for detecting electrostatic capacitance at two locations on the left and right. Similarly to the ninth embodiment, the front-side permanent magnet is formed of a segment-type magnet magnetized in the radial direction, and the magnetic coupling portion is also formed of a segment-type magnet magnetized in the radial direction and a fixed coil.

Reference numeral 801 denotes a front-side permanent magnet, reference numeral 802 denotes a rear-side permanent magnet, reference numeral 803 denotes a pole piece, reference numeral 804 denotes a void portion of the pole piece, reference numeral 805 denotes a front-side disc, reference numeral 806 denotes a rear-side disc, reference numeral 807 denotes a front-side movable electrode, reference numeral 808 denotes a front-side fixed electrode, reference numeral 809a denotes a front-side panel, reference numeral 809b denotes a rear-side panel, reference numeral 810 denotes a front-side center plate, reference numeral 811 denotes a front-side fastening member, reference numeral 812 denotes a coil-side yoke material, reference numeral 813 denotes a coil bobbin, reference numeral 814 denotes a front-side coil, and reference numeral 815 denotes a rear-side coil. Reference numeral 816 denotes a front-side outer peripheral support ring, reference numeral 817 denotes a front-side inner peripheral support ring, reference numeral 818 denotes a front-side end surface of the pole piece, reference numeral 819 denotes a rear-side end surface of the pole piece, reference numeral 820 denotes an outer peripheral-side support ring of the rear-side disc, reference numeral 821 denotes a coil mounting portion which is an inner peripheral surface of the coil-side yoke material, and reference numeral 822 denotes a magnetic void portion formed between the coil mounting portion and two permanent magnets. Reference numeral 823 denotes a rear-side movable electrode, reference numeral 824 denotes a rear-side fixed electrode, reference numeral 825 denotes a rear-side center plate, reference numeral 826 denotes a rear-side fastening member, and reference numeral 827 denotes a rear-side inner peripheral support ring.

The two embodiments of the differential sensor have been described above. As the configuration of the differential actuator portion, the proposal described in the other embodiment (linear motion MM type) of the present invention can be applied.

Twelfth Embodiment Swing Type (1)

Figure 28:
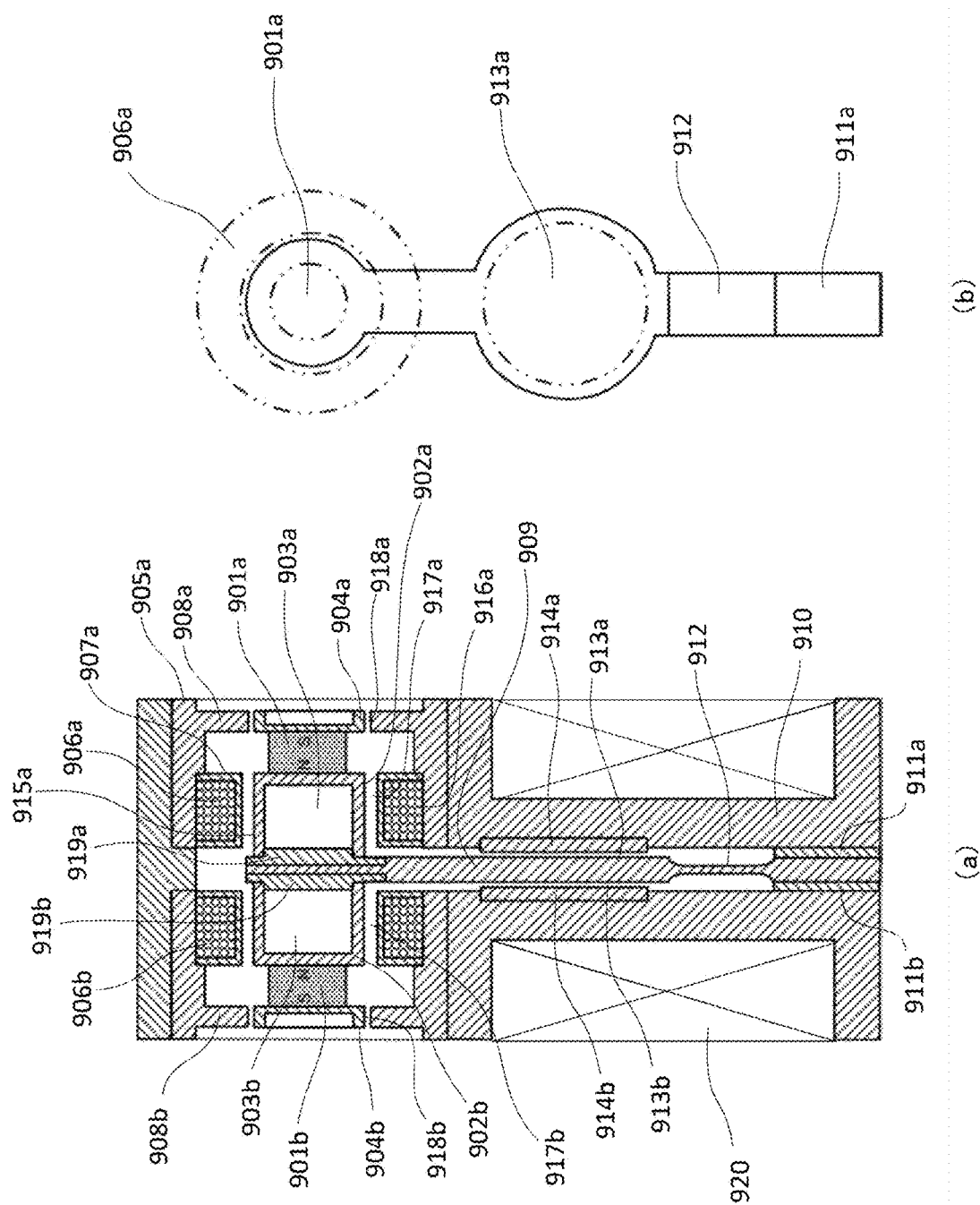
FIG. 28 illustrates a swing motion servo-type acceleration sensor according to a twelfth embodiment of the present invention, in which FIG. 28 at a is a front cross-sectional view, and FIG. 28 at b is a schematic view of a side surface of a pendulum which is one component constituting the sensor.

FIG. 28 illustrates a swing motion servo-type acceleration sensor according to a twelfth embodiment of the present invention, in which FIG. 28 at a is a front cross-sectional view, and FIG. 28 at b is a schematic view of a side surface of a pendulum which is one component constituting the sensor. In the servo-type acceleration sensor of the present embodiment, since the magnetic circuit including the permanent magnet is configured to be bilaterally symmetrical, the right side component will be first described.

Reference numeral 901a is a permanent magnet, reference numeral 902a is a front-side pole piece, reference numeral 903a is a cylindrical void portion formed to reduce the weight of the front-side pole piece, reference numeral 904a is a rear-side pole piece, reference numeral 905a is a coil-side yoke material, reference numeral 906a is an electromagnetic coil, reference numeral 907a is a coil bobbin, and reference numeral 908a is a protruding portion formed on the inner surface of the coil-side yoke material. The front-side pole piece 902a and the rear-side pole piece 904a are the movable-side yoke materials. A pendulum 909 is formed of a non-magnetic and conductive material. The pendulum includes a cantilever having one fixed end and the other free end, and a movable portion is provided on the free end side of the cantilever. A housing 910 has a cylindrical hollow portion in an upper portion. The housing is made of a non-magnetic material. A plate member 911a is formed of an insulating material at the lower end portion of the pendulum. The pendulum is fixed in a state of being sandwiched between the plate member 911a and the plate member 911b. Reference numeral 912 denotes a hinge portion. This hinge portion determines the spring rigidity of the entire pendulum that oscillates. Reference numeral 913a denotes a movable-side electrode formed on the pendulum, and reference numeral 914a denotes a fixed-side electrode. An electrical insulating film is formed on a wall surface where the fixed-side electrode and the housing 910 are in close contact with each other (not illustrated). The pendulum 909 made of a conductive material also serves as a conductive wire as a common earth connecting the detection signals of the electrostatic capacitance between the left and right electrodes to the control circuit. Reference numeral 915a denotes a coil opposing surface of the pole piece 902a, and reference numeral 916a denotes a coil mounting surface. A magnetic void portion 917a in the radial direction is formed between the coil opposing surface 915a and the coil mounting surface 916a. An annular void portion 918a formed by a narrow gap is provided between the protruding portion 908a of the coil-side yoke material and the rear-side pole piece 904a. Similarly to the first embodiment described above, a closed loop magnetic circuit (not illustrated) is formed by "permanent magnet 901a→front-side pole piece 902a→magnetic void portion 917a→coil-side yoke material 905a→annular void portion 918a→rear-side pole piece 904a". The gap of the annular void portion 918a is set such that the magnetic resistance is sufficiently smaller than that of the magnetic void portion 917a. The annular void portion is a magnetic coupling portion for forming a closed loop magnetic circuit in a magnetic circuit using a permanent magnet. A lead wire for exchanging signals between the electromagnetic coil 906a and a control circuit installed outside is provided using a through hole formed in the coil-side yoke material 905a and the housing 910 (not illustrated) as in the first embodiment described above.

Reference numeral 919a denotes a convex member made of an insulating material, and is bonded and fixed to the pendulum 909 at the upper portion of the pendulum 909. The convex member 919a is adhesively fitted to the front-side pole piece 902a. Since the convex member is made of an insulating material, the front-side pole piece 902a and the pendulum 909 can maintain electrical insulation. A control circuit 920 is provided in the lower void portion of the housing 910.

In the present embodiment, each member is configured as a left and right object with the pendulum 909 as a central axis. In the drawing symbol of the members such as the permanent magnet 901a and the pole piece 902a, the attached symbol of the right member is a, and the attached symbol of the left member is b. Focusing on the right-side component, as in the first embodiment described above, the electromagnetic coil 906a is disposed so as to wrap the permanent magnet 901a and the entire front-side pole piece 902a connecting the permanent magnets in series from the outer peripheral side. Further, the annular void portion 918a having sufficiently smaller magnetic resistance than the magnetic void portion 917a is disposed in the closed loop magnetic circuit. The movable member that moves in the axial direction is the permanent magnet 901a, the front-side pole piece 902a, and the rear-side pole piece 904a.

Figure 29:
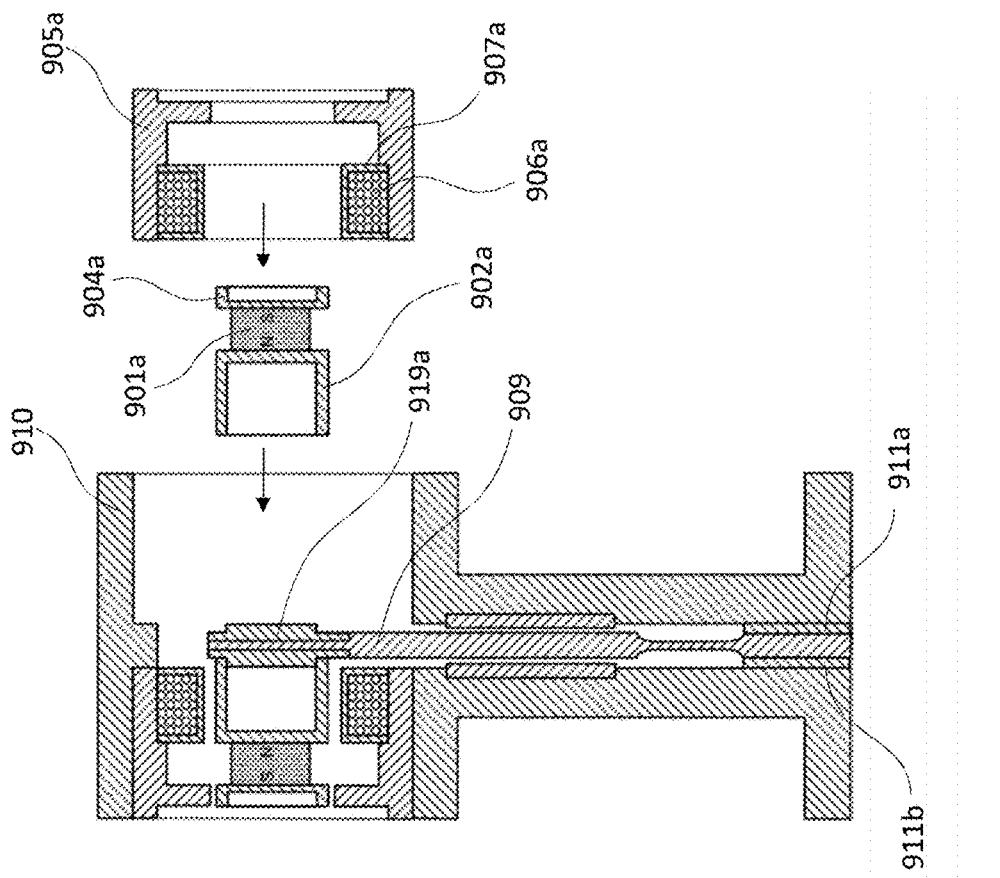
FIG. 29 is a view illustrating an example of an assembling method of the twelfth embodiment.

FIG. 29 illustrates an example of a method of assembling the acceleration sensor according to the present embodiment. Three components, that is, the front-side pole piece 902a, the permanent magnet 901a, and the rear-side pole piece 904a are integrated with an adhesive, and then attached to the convex member 919a of the pendulum. Further, the coil bobbin 907a in which the electromagnetic coil 906a is housed is mounted on the coil-side yoke material 905a, and then fitted in the hollow portion of the housing 910.

The configuration of the linear acceleration sensor in the first to eleventh embodiments described above can be applied to the components of the magnetic circuit. For example, the magnetic coupling portion may not be an annular void portion, but may be a combination of a segment-type permanent magnet magnetized in the radial direction and a fixed-side coil.

Features of the present embodiment will be described on the basis of comparison with a conventional swing acceleration sensor disclosed in Patent Literature 1. In the present embodiment, the pendulum 909 can be made of a conductive metal material. In the conventional swing acceleration sensor illustrated in FIG. 56, a non-conductive material such as quartz glass is used for the pendulum 590a because it is necessary to exchange a plurality of independent signals (coil and electrode signal) between the movable side of the sensor and the fixed-side control circuit. On the surface of the quartz glass, a conductive path for processing a plurality of independent signals is formed by a thin film on which gold (Au) is sputtered or vacuum-deposited. That is, selection of members and a special method are required because of the MC type. In the present embodiment of the MM type, the signal transmitted and received from the movable portion to the fixed side may be only the common earth of the left and right electrode signals. Therefore, expensive sputtering equipment and the like required in the conventional swing MC type (FIG. 56) production process are not required, and the production process can be greatly simplified and cost can be reduced. The common earth contact may be provided by using the fixed portions 911a and 911b of the pendulum (not illustrated).

Thirteenth Embodiment

Figure 30:
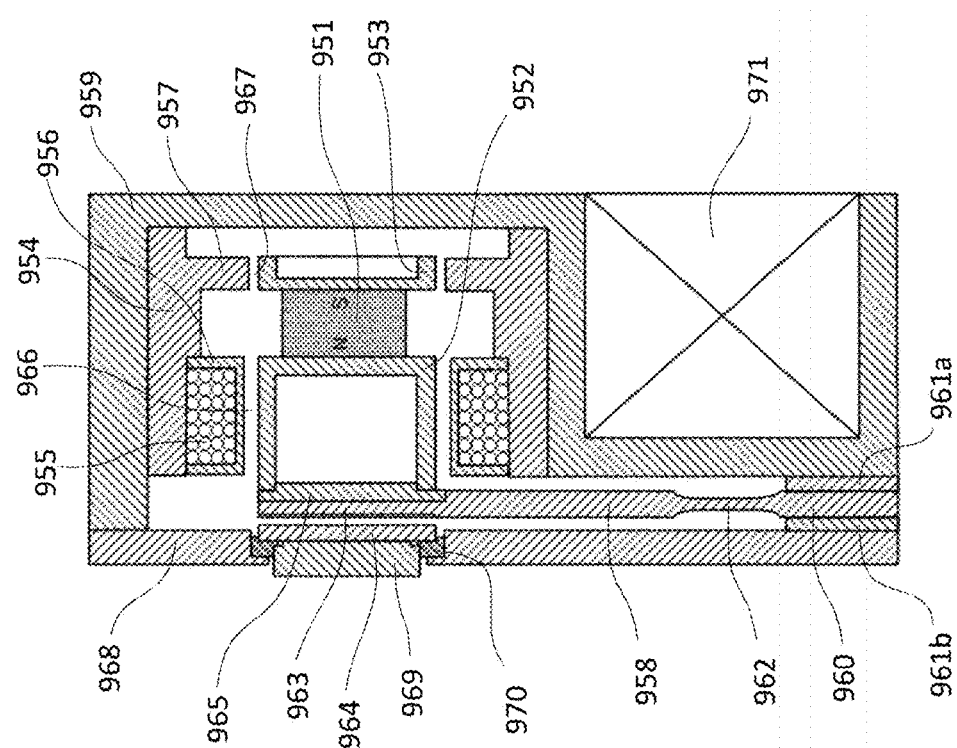
FIG. 30 is a front cross-sectional view of a swing motion servo-type acceleration sensor according to a thirteenth embodiment of the present invention.

FIG. 30 illustrates a swing motion servo-type acceleration sensor according to a thirteenth embodiment of the present invention. The above-described twelfth embodiment is simplified, and only one set of electrostatic capacitance detection electrodes is configured.

Reference numeral 951 denotes a permanent magnet, reference numeral 952 denotes a front-side pole piece, reference numeral 953 denotes a rear-side pole piece, reference numeral 954 denotes a coil-side yoke material, reference numeral 955 denotes a force coil, reference numeral 956 denotes a coil bobbin, and reference numeral 957 denotes a protruding portion formed on an inner surface of the coil-side yoke material.

Reference numeral 958 denotes a pendulum made of a non-magnetic and conductive material, reference numeral 959 denotes a rear-side housing made of a non-magnetic material having a cylindrical hollow portion at an upper portion, reference numeral 960 denotes a fixed portion of the pendulum, and reference numerals 961a and 961b denote plate members made of an insulating material at a lower end portion of the pendulum. The fixed portion 960 of the pendulum is fixed in a state of being sandwiched between the plate member 961a and the plate member 961b. Reference numeral 962 denotes a hinge portion (elastic deformation portion). This hinge portion determines the spring rigidity of the entire pendulum that oscillates. Reference numeral 963 denotes a movable-side electrode formed at an upper end portion of the pendulum, and reference numeral 964 denotes a fixed-side electrode. The pendulum 958 made of a conductive material also serves as a conductive path as a common earth connecting the detection signals of the electrostatic capacitance between the left and right electrodes to the control circuit.

Reference numeral 965 denotes a convex member made of an insulating material, and is bonded and fixed to the pendulum 958 at the upper portion of the pendulum 958. The convex member 965 is adhesively fitted to the front-side pole piece 952. Since the convex member is made of an insulating material, the front-side pole piece 952 and the pendulum 958 can maintain electrical insulation.

Reference numeral 966 denotes a magnetic void portion, and reference numeral 967 denotes an annular void portion. The gap of the annular void portion is set such that the magnetic resistance is sufficiently smaller than that of the magnetic void portion 966. The annular void portion is a magnetic coupling portion for forming a closed loop magnetic circuit in a magnetic circuit using a permanent magnet. As in the first and twelfth embodiments described above, a closed loop magnetic circuit (not illustrated) is formed by "permanent magnet 951→front-side pole piece 952→magnetic void portion 966→coil-side yoke material 954→annular void portion 967→rear-side pole piece 953".

Reference numeral 968 denotes a rear-side housing formed of a non-magnetic material, and the center plate 969 and the fixed-side electrode 964 are fastened to each other by a fastening member 970 at the upper portion. A control circuit 971 is provided in the lower void portion of the rear-side housing 959.

As described above, in the linear motion-type acceleration sensor and the swing motion-type acceleration sensor, when the difference between the basic structures of both is classified by the elastic support method of the movable portion, in the linear motion type, the spring is disposed in the circumferential direction of the shaft center with the moving direction of the movable portion as the shaft center. As described in the twelfth embodiment and the thirteenth embodiment, the swing motion type is a structure in which the movable portion is supported by a cantilever having one end as a fixed end and the other end as a free end. The operation principle of both the linear motion type and the swing motion type is the same in that the gap between the fixed electrode and the movable electrode is detected. Therefore, the proposal presented in another embodiment of the present invention can also be applied to the swing motion type. For example, the method of attaching the coil bobbin having good thermal conductivity described in the sixth embodiment, the method of forming a magnetic circuit using the segment-type magnet magnetized in the radial direction described in the seventh embodiment and the eighth embodiment, and the like can also be applied.

Fourteenth Embodiment

Figure 31:
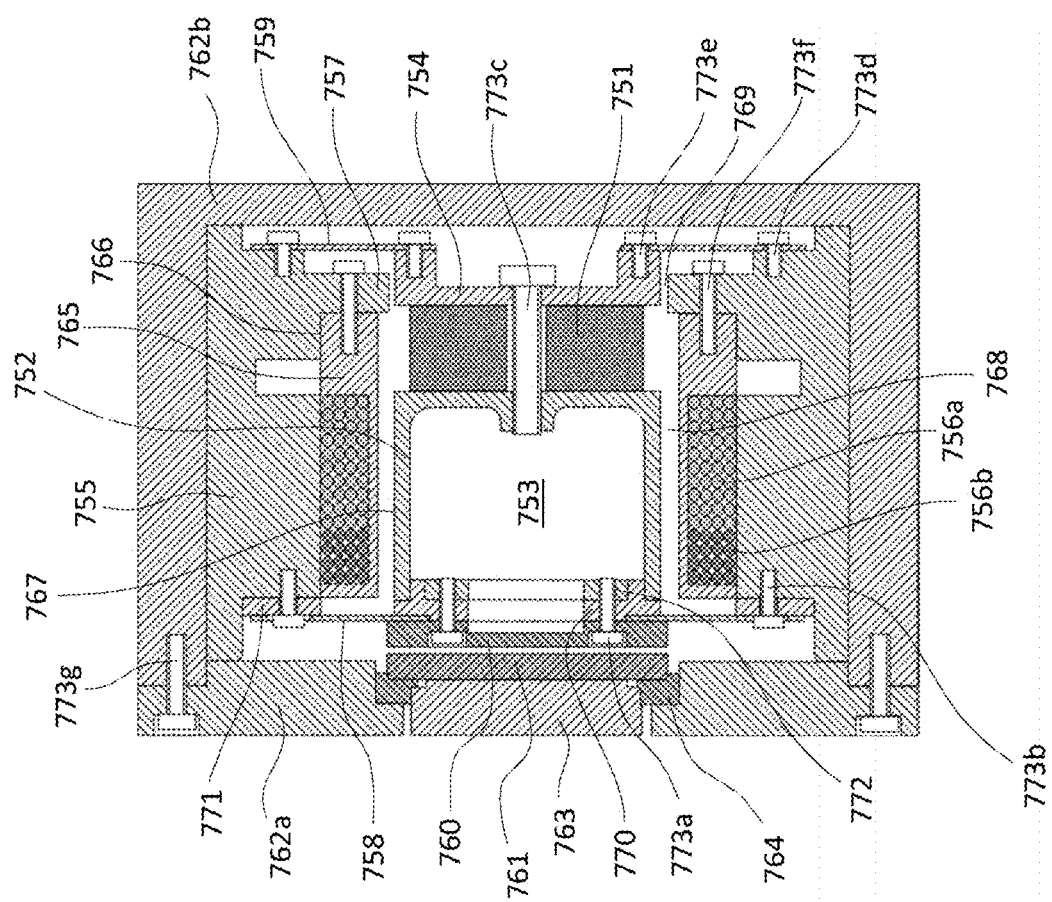
FIG. 31 is a front cross-sectional view of a servo-type acceleration sensor according to a fourteenth embodiment of the present invention.

FIG. 31 illustrates a servo-type acceleration sensor according to a fourteenth embodiment of the present invention, and illustrates a structure in which many components constituting the sensor are bolted. FIGS. 32 to 41 illustrate an assembly process of the sensor according to the present embodiment. The conventional servo MC-type acceleration sensor is configured by a bonding method as shown in the cases of FIGS. 54 and 56. This is mainly because (1) the component shape is micro, and (2) the movable portion needs to be reduced in weight. In the case of the linear acceleration sensor, the configuration by the bolt fastening method is difficult because of the complicated configuration that requires "cutting, insulation, and soldering" of the disc spring that supports both ends of the movable portion. When a product is formed by a bonding method, a product body has to be discarded if it is rejected at the stage of quality evaluation during mass production.

In the present embodiment, a minimum bolt fastening method of M 0.5 to M 1.0 mm, which is applied in a special field such as a watch, is applied to a servo-type acceleration sensor including micro components. The outer diameter of the servo-type acceleration sensor to which the present invention is applied is about Φ25 mm, and is smaller than the outer diameter of the 500 yen coin. The reason why the bolt fastening method can be applied in the present embodiment is that attention is paid to the characteristics of the MM type in which the ultrafine wire processing is unnecessary and the component configuration of the movable portion can be simplified. The acceleration sensor according to the present embodiment can reuse many parts, and can greatly improve the yield during mass production. In addition, in the case of the bonding method, the thickness of the adhesive interposed between the parts to be bonded and the non-uniformity of the thickness have been factors that lower the assembly accuracy. In the case of the bolt fastening method, high assembly accuracy can be secured as long as processing accuracy of each component is obtained. In addition, since the operator is not required to have skill, variations in product performance can be reduced.

(1) Overall Configuration of Sensor According to Embodiment

In FIG. 31, reference numeral 751 denotes a permanent magnet having a hollow portion, reference numeral 752 denotes a front-side pole piece, reference numeral 753 denotes a cylindrical void portion, reference numeral 754 denotes a rear-side pole piece, reference numeral 755 denotes a coil-side yoke material, reference numeral 756a denotes a force coil, reference numeral 756b denotes a verification coil, and reference numeral 757 denotes a protruding portion formed on a rear side inner surface of the coil-side yoke material. Reference numeral 758 denotes a front-side disc, reference numeral 759 denotes a rear-side disc, reference numeral 760 denotes a movable-side electrode, reference numeral 761 denotes a fixed-side electrode, reference numeral 762a denotes a front-side panel, reference numeral 762b denotes a rear-side panel, reference numeral 763 denotes a center plate, and reference numeral 764 denotes a fastening member made of a non-conductive material of the fixed-side electrode and the front-side panel.

Reference numeral 765 denotes a coil bobbin, reference numeral 766 denotes a coil bobbin mounting portion formed on an inner surface of the coil-side yoke material, and reference numeral 767 denotes a coil opposing surface which is an outer surface of the front-side pole piece. A magnetic void portion 768 in the radial direction is formed between the coil opposing surface 767 and the coil bobbin mounting portion 766. An annular void portion (magnetic coupling portion) 769 formed by a narrow gap is provided between the protruding portion 757 of the coil-side yoke material and the rear-side pole piece 7544.

Reference numeral 770 denotes an inner peripheral-side disc support member, and reference numeral 771 denotes an outer peripheral-side disc support member. The two disc support members 770 and 771 are made of a non-conductive material (insulating material). Reference numeral 772 denotes a ring-shaped nut made of a metal material attached to one end surface of the inner peripheral-side disc support member 770. Hereinafter, bolts for fastening the respective members will be described.

(2) Role of Each Fastening Bolt

A bolt 773a fastens three components of the movable electrode 760, the inner peripheral-side disc support member 770, and the ring-shaped nut 772. The front-side disc 758 is sandwiched between the movable electrode 760 and the inner peripheral-side disc support member 770. A bolt 773b fixes the outer peripheral-side disc support member 771 to the coil-side yoke material 755. As will be described later, the front-side disc 758 is bonded and fixed to the outer peripheral-side disc support member. Therefore, the bolt 773b has a role of fixing the outer peripheral end of the front-side disc 758.

A bolt 773c fastens three parts of the front-side pole piece 752, the permanent magnet 751, and the rear-side pole piece 754. Reference numeral 773*d* denotes a bolt that fastens the outer peripheral portion of the rear-side disc 759 and the coil-side yoke material 755, and 773*e* denotes a bolt that fastens the inner peripheral portion of the rear-side disc 759 and the rear-side pole piece 754. A bolt 773*f* fastens the coil bobbin 765 to the coil-side yoke material 755. A bolt 773*g* fastens the front-side panel 762*a* and the rear-side panel 762*b*.

(3) Description of Assembly Process

Hereinafter, the assembly process will be described in each stage.

(3-1) Assembly Preparation Stage

Figure 32:
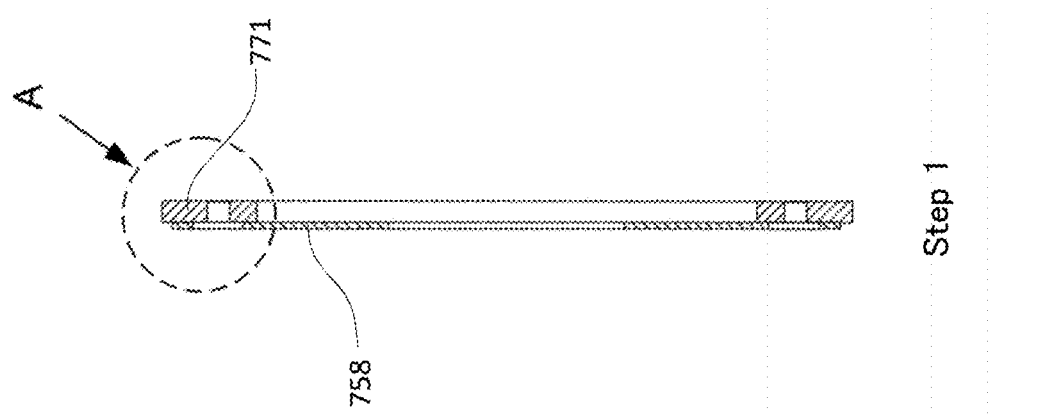
FIG. 32 is a view illustrating Step 1 of an assembly process of the fourteenth embodiment.
Figure 33:
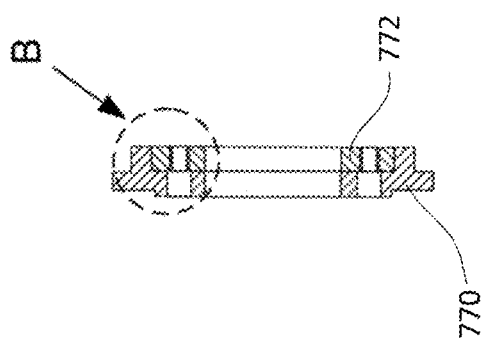
FIG. 33 is a view illustrating Step 2 of the assembly process of the fourteenth embodiment.
Figure 34:
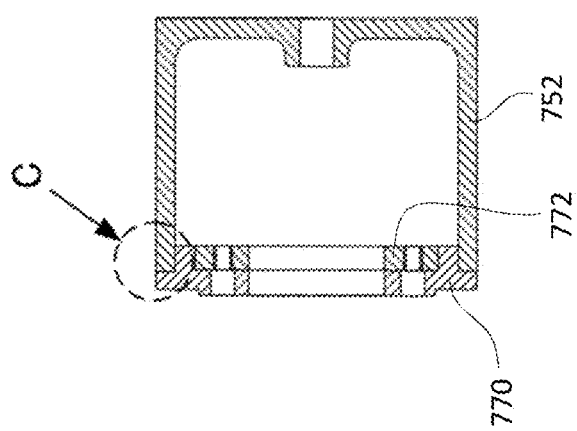
FIG. 34 is a view illustrating Step 3 of the assembly process of the fourteenth embodiment.

The basic assembly process of the sensor of the present embodiment is bolt fastening. However, it is not necessary to fasten all the components with bolts, and for example, for a component that needs to be electrically insulated, a conductive material (metal) and an insulating material (ceramics or the like) may be integrated in advance with an adhesive. FIGS. 32 to 34 illustrate an assembly preparation stage, and in Step 1, the outer peripheral-side disc support member 771 and the front-side disc 758 made of ceramic are bonded and fixed at a position of a chain line circle A. In Step 2, the inner peripheral-side disc support member 770 made of ceramic and the ring-shaped nut 772 made of metal are bonded and fixed at a position of a chain line circle B. In Step 3, the part in which the inner peripheral-side disc support member 770 and the ring-shaped nut 772 are integrated is bonded and fixed to the opening of the front-side pole piece 752.

(3-2) Mounting of Coil Bobbin and Coil Lead Wire Processing

Figure 35:
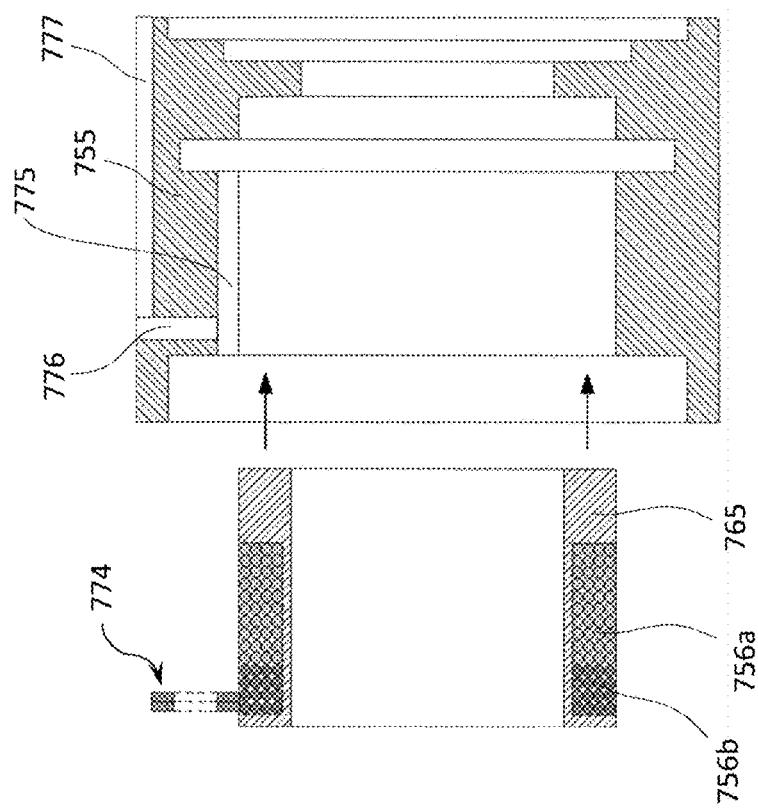
FIG. 35 is a view illustrating Step 4 of the assembly process of the fourteenth embodiment.
Figure 36:
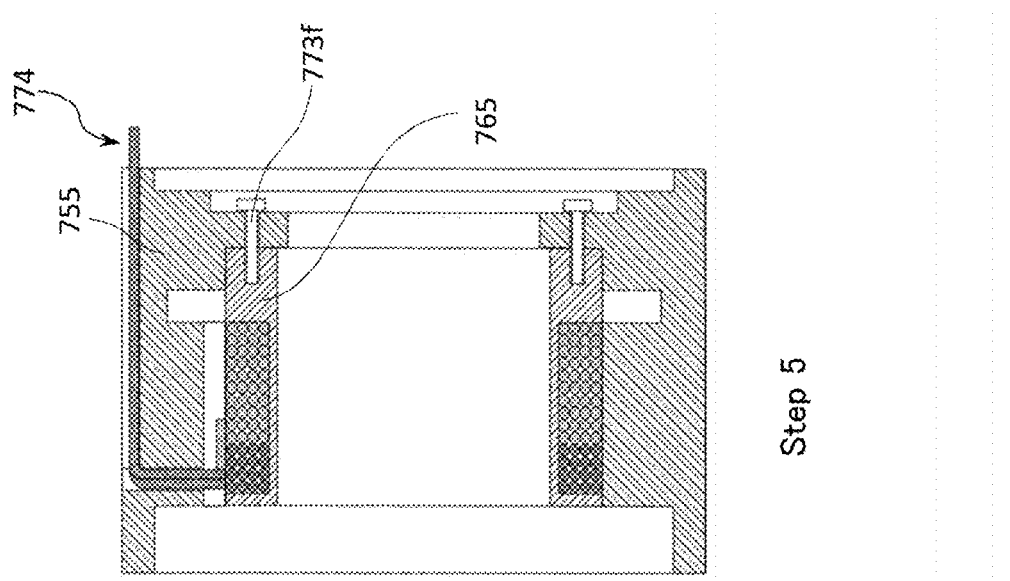
FIG. 36 is a view illustrating Step 5 of the assembly process of the fourteenth embodiment.

FIGS. 35 and 36 illustrate steps of mounting the coil bobbin 765 and processing the coil lead wire. Reference numeral 774 denotes a lead wire of the force coil 756*a* and the verification coil 756*b*, reference numeral 775 denotes an inner groove portion formed on the inner surface of the coil-side yoke material 755, reference numeral 776 denotes a through hole formed in the radial direction of the coil-side yoke material, and reference numeral 777 denotes an outer groove portion formed on the outer peripheral side of the coil-side yoke material. The inner groove portion 775, the through hole 776, and the outer groove portion 777 are not illustrated in FIG. 31.

In Step 4, the coil bobbin 765 is inserted into the coil-side yoke material, and at the same time, the distal end portion of the coil lead wire 774 is drawn to the outside using the inner groove portion, the through hole, and the outer groove portion. In Step 5, the coil bobbin 765 is fastened to the coil-side yoke material 755 with the bolt 773*f*.

Figure 37:
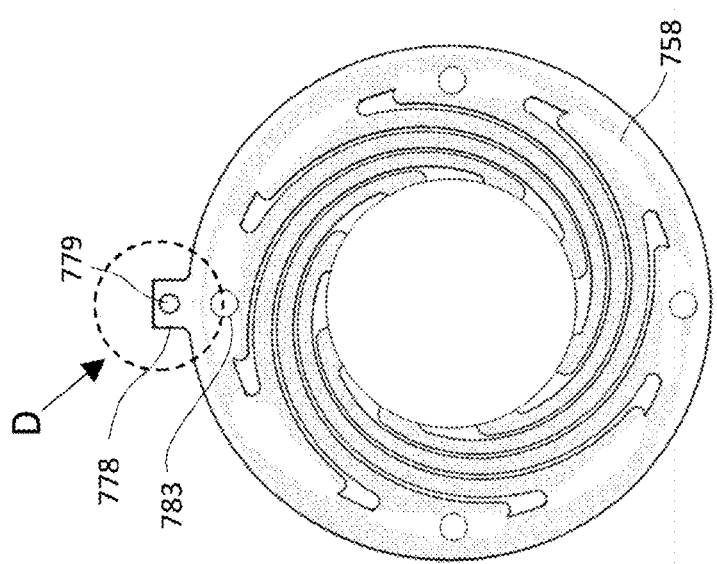
FIG. 37 is a view illustrating a spiral disc of the fourteenth embodiment.
Figure 38:
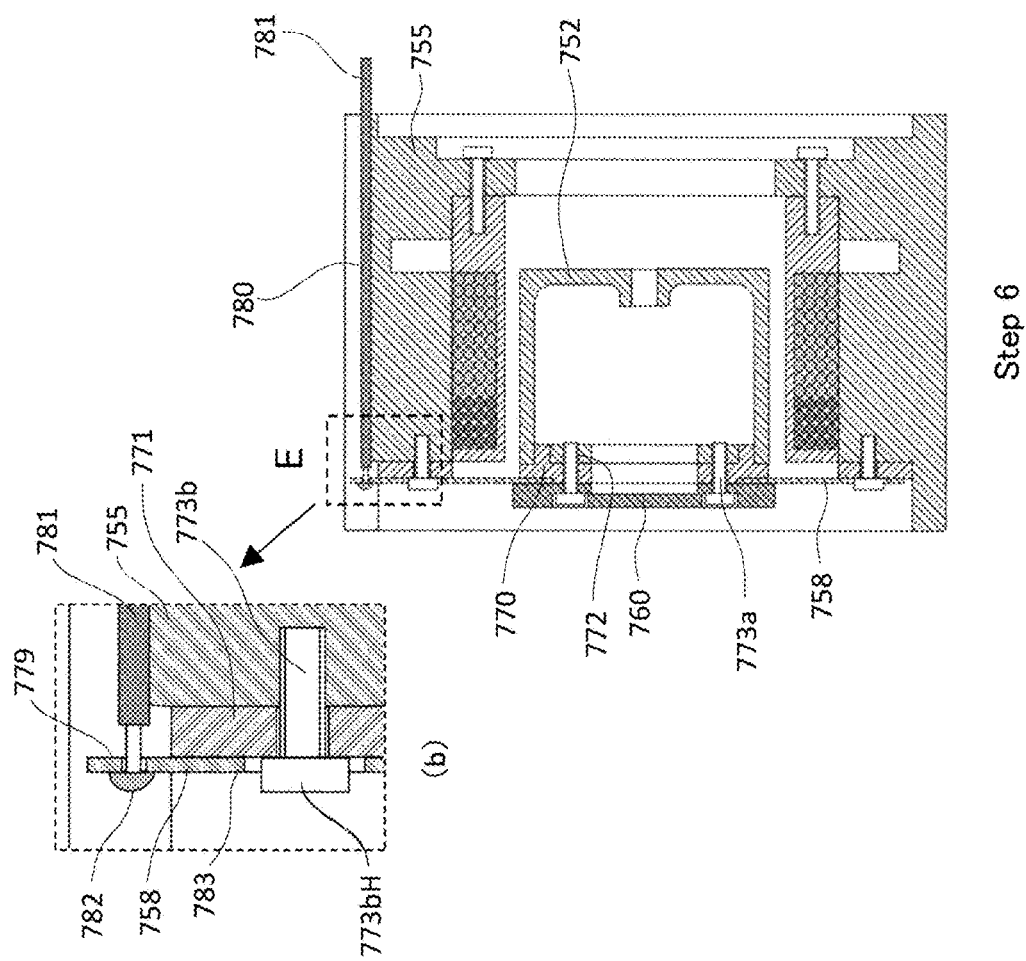
FIG. 38 is a view illustrating Step 6 of the assembly process of the fourteenth embodiment.

(3-3) Lead Wire Processing of Movable-Side Electrode and Mounting of Front-Side Pole Piece FIG. 37 illustrates a shape of the front-side disc 758 applied to the present embodiment. In chain line D, reference numeral 778 denotes a protruding end portion, and reference numeral 779 denotes a through hole formed in the protruding end portion. In Step 6, FIG. 38 at a is a view illustrating a state in which the front-side pole piece 752 is mounted inside the coil-side yoke material 755. FIG. 38 at b is a partially enlarged view of a chain line E. Reference numeral 780 denotes an electrode groove portion formed on the outer peripheral surface of the coil-side yoke material 755, and reference numeral 781 denotes a lead wire of the movable-side electrode 760. Reference numeral 782 denotes a state in which the lead wire 781 and the front-side disc 758 are electrically conducted using the through hole 779 in a state in which the cover of the lead wire 781 is peeled off. Soldering, a conductive adhesive, and the like can be selected as means for electrical conduction. A plurality of through holes 783 are formed in the front-side disc 758, and the inner diameter thereof is formed larger than the head 773*b*H of the fastening bolt 773*b*.

As described above, the front-side disc 758 and the outer peripheral-side disc support member 771 are already bonded and fixed. Therefore, if the outer peripheral-side disc support member 771 is fixed to the coil-side yoke material 755 by the fastening bolt 773*b*, electrical insulation can be maintained between the front-side disc 758 and the coil-side yoke material 755. The head 773*b*H of the fastening bolt 773*b* and the through hole 783 are kept in a non-contact state. The movable-side electrode 760 is fastened to the ring-shaped nut 772 by the fastening bolt 773*a* while holding the front-side disc 758 and the inner peripheral-side disc support member 770. As described above, the disc support member 770 and the ring-shaped nut 772 are integrated in advance with an adhesive.

(3-4) Final Assembly Stage

Figure 39:
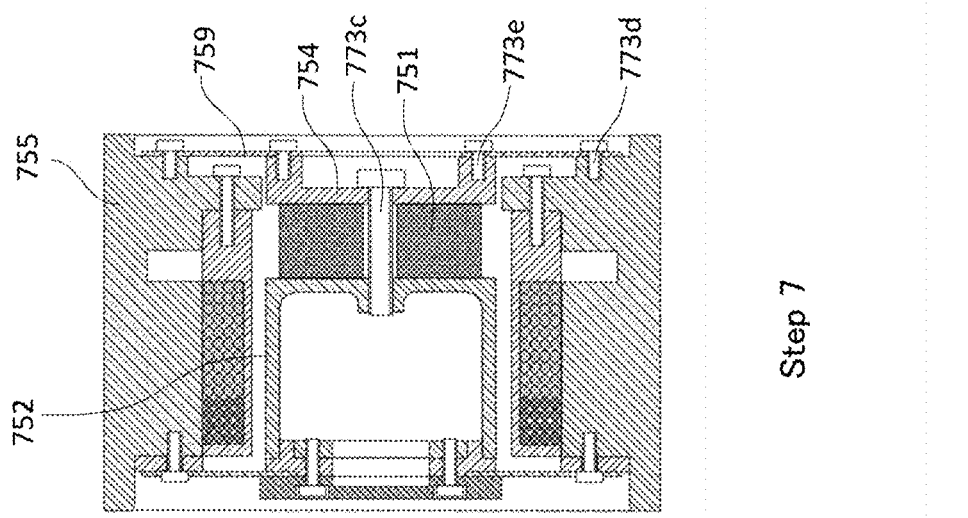
FIG. 39 is a view illustrating Step 7 of the assembly process of the fourteenth embodiment.

Step 7 shows a step of fastening the permanent magnet 751 and the rear-side disc 759. As illustrated in FIG. 39, the permanent magnet 751 is fastened to the front-side pole piece 752 with the rear-side pole piece 754 interposed therebetween by the fastening bolt 773*c*. The rear-side disc 759 is fastened to the coil-side yoke material 755 and the rear-side pole piece 754 by the fastening bolt 773*d* and the fastening bolt 773*e*.

Figure 40:
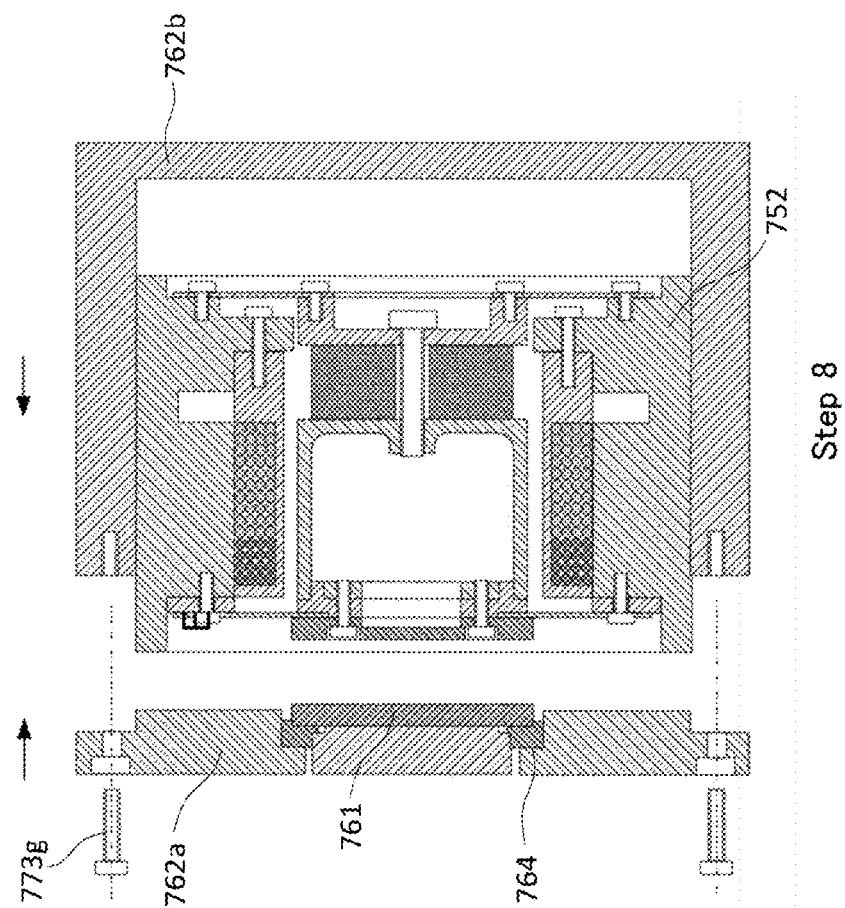
FIG. 40 is a view illustrating Step 8 of the assembly process of the fourteenth embodiment.

Step 8 shows a step of mounting the sensor storage case in the final stage. As illustrated in FIG. 40, the fixed-side electrode 761 is temporarily fixed to the front-side panel 762*a* by the fastening member 764. The front-side panel 762*a* is fastened to the rear-side panel 762*b* with the fastening bolt 773*g* so as to house the coil-side yoke material 755.

Incidentally, the structure for taking out the signal line 781 of the electrode and the lead wire 774 of the coil to the outside is not limited to the present embodiment which is the bolt fastening structure. The present invention can be similarly applied to other embodiments which are bonding methods.

Fifteenth Embodiment

In the above-described embodiment, the bolt fastening method is applied until the final assembly stage except for the initial preparation stage. In the present embodiment, the gap between the movable side and the fixed side is adjusted to an optimum value while the electrostatic capacitance is actually measured by applying the bonding method in the final assembly stage. That is, it is a measure for absorbing all errors accumulated in the final process.

Figure 41:
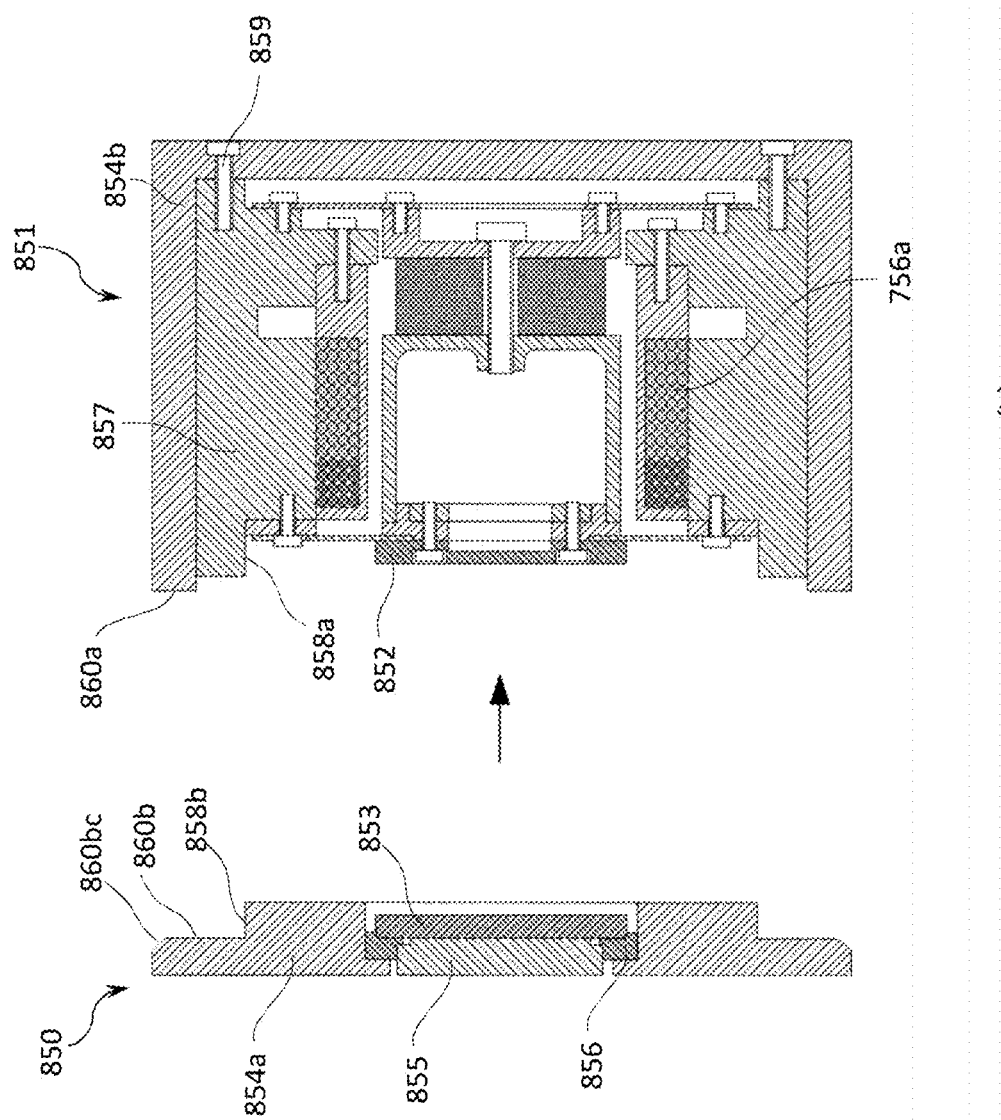
FIG. 41 illustrates a servo-type acceleration sensor according to a fifteenth embodiment of the present invention, in which FIG. 41 at a is a front cross-sectional view of a fixed-side electrode unit, and FIG. 41 at b is a front cross-sectional view of the fixed-side electrode unit.
Figure 42:
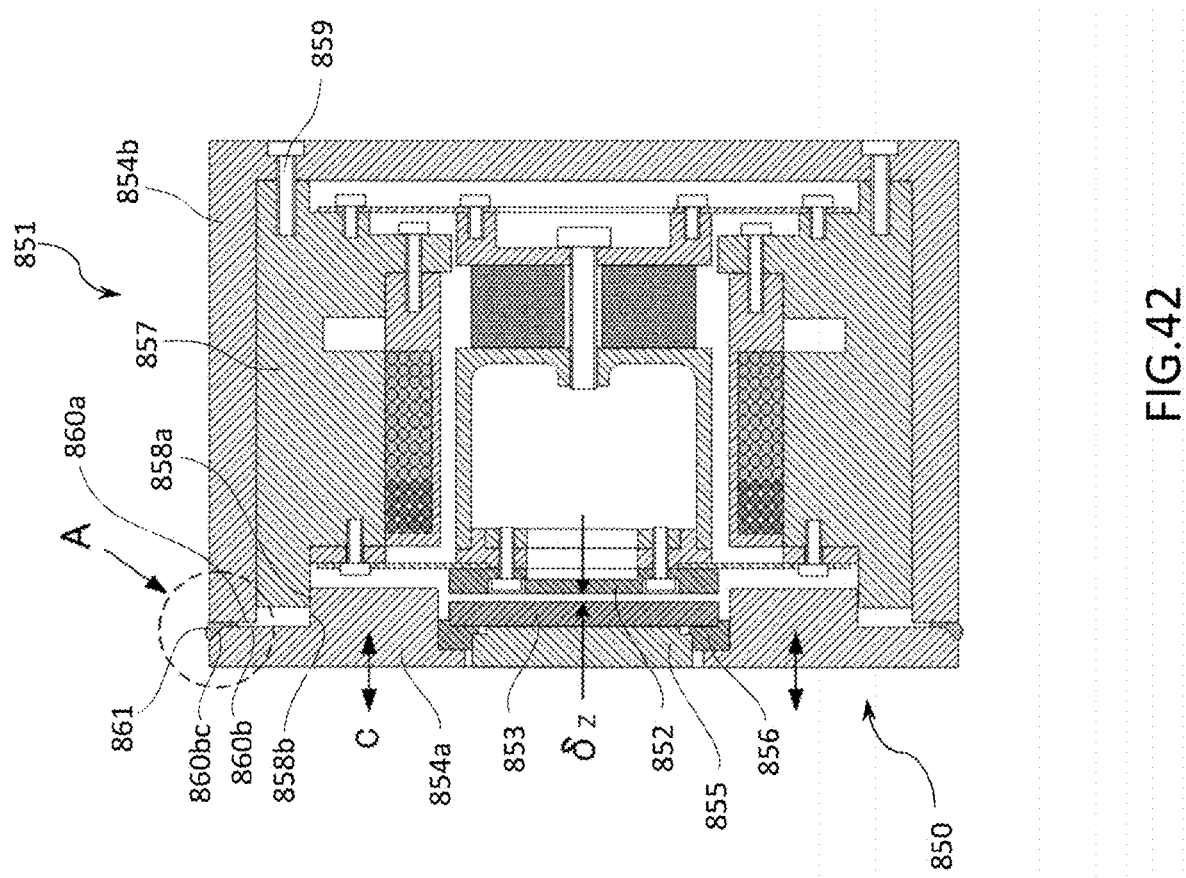
FIG. 42 is a front cross-sectional view illustrating a state where two units in the fifteenth embodiment are fastened.

FIG. 41 illustrates two units to be fastened, in which FIG. 41 at a is referred to as a fixed-side electrode unit 850, and FIG. 41 at b is referred to as a movable-side electrode unit 851. FIG. 42 is a view illustrating a state in which the two units are joined by an adhesive.

Hereinafter, only portions to be particularly described with respect to the fifteenth embodiment will be described. Reference numeral 852 denotes a movable-side electrode, reference numeral 853 denotes a fixed-side electrode, reference numeral 854*a* denotes a front-side panel, reference numeral 854*b* denotes a rear-side panel, reference numeral 855 denotes a center plate, and reference numeral 856 denotes a fastening member made of a non-conductive material of the fixed-side electrode and the front-side panel. Reference numeral 857 denotes a coil-side yoke material, reference numeral 858a denotes a movable-unit-side fitting element, reference numeral 858b denotes a fixed-unit-side fitting element, and reference numeral 859 denotes a bolt for fastening the rear-side panel and the coil-side yoke material. Reference numeral 860a denotes a movable-unit-side bonding surface, reference numeral 860b denotes a fixed-unit-side bonding surface, and reference numeral 860bc denotes a tapered portion formed on the fixed-unit-side bonding surface. The movable-unit-side fitting element 858a and the fixed-unit-side fitting element 858b form a fitting structure.

In FIG. 42, reference numeral 861 denotes an adhesive applied between the movable-unit-side bonding surface 860a and the fixed-unit-side bonding surface 860b. In the present embodiment, an ultraviolet curing type is applied to the adhesive. This adhesive is cured by irradiation with an LED light. Therefore, before the LED light irradiation, the two units can relatively move in the axial direction in a state in which the radial movement is restricted by the fitting elements 858a and 858b forming the fitting structure. The gap 6z between electrodes (gap between the movable-side electrode 852 and the fixed-side electrode 853) is obtained from a measurement value of electrostatic capacitance. For example, the movable unit 850 is moved in the axial direction (arrow C) while the fixed unit 851 is fixed. When the adhesive is cured by irradiating the adhesive with an LED light when the electrostatic capacitance reaches the target value, the two units can be fastened.

The actuator function of the sensor can be measured and evaluated before the two units are fastened (FIG. 41 at b), that is, in a state of the movable-side electrode unit 851 alone. For example, if a displacement sensor that detects axial displacement of the movable-side electrode 852 is separately disposed, frequency response characteristics, transient response characteristics, and the like with respect to the force coil 756a current can be evaluated. Depending on the evaluation result, it is easy to replace and reuse each component by utilizing the characteristics of the bolt fastening method.

In addition to the above-described method of adjusting the gap $\delta_z$ between two electrodes, the fastening member 856 may be used to adjust the inclination angle $\delta_\theta$ of the gap between the two electrodes. In this case, for example, an ultraviolet curable adhesive may be applied to the fastening member 856. The method for adjusting $\delta_z$ (or $\delta_\theta$) of the gap between two electrodes shown in the present embodiment can also be applied to other embodiments of the present invention.

Sixteenth Embodiment

Figure 43:
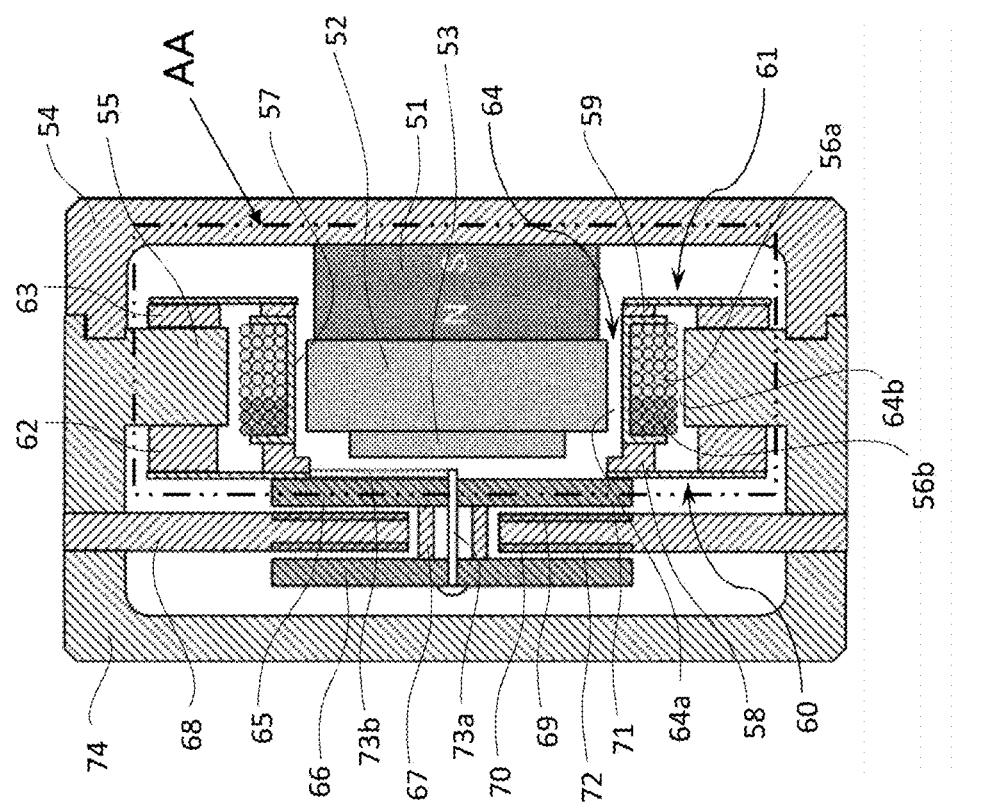
FIG. 43 is a front cross-sectional view of a servo-type acceleration sensor according to a sixteenth embodiment of the present invention.

FIG. 43 is a front cross-sectional view of a differential servo-type acceleration sensor according to a sixteenth embodiment of the present invention. However, a moving coil type (MC type) in which a coil moves is applied to the movable portion. Reference numeral 51 denotes a permanent magnet, reference numeral 52 denotes a pole piece, reference numeral 53 denotes a pole piece convex portion, reference numeral 54 denotes a permanent magnet-side yoke material, reference numeral 55 denotes a coil-side yoke material, reference numeral 56a denotes a force coil, 56b denotes a verification coil, reference numeral 57 denotes a coil bobbin, reference numerals 58 and 59 denote coil bobbin supporting members, reference numeral 60 denotes a front-side disc, reference numeral 61 denotes a rear-side disc, reference numeral 62 denotes a front-side connecting member of the front-side disc 60 and the coil-side yoke material 55, and reference numeral 63 denotes a rear-side connecting member of the rear-side disc-shaped spring 61 and the coil-side yoke material 55. A magnetic void portion 64 in the radial direction is formed between the outer peripheral portion of the pole piece 52 and the inner peripheral portion of the coil-side yoke material 55. Reference numeral 64a denotes a permanent magnet-side void portion, and reference numeral 64b denotes a yoke material-side void portion. The closed loop magnetic circuit is formed by "permanent magnet 51→pole piece 52→magnetic void portion 64→coil-side yoke material 55→permanent magnet-side yoke material 54" similarly to the conventional MC servo-type acceleration sensor.

Reference numeral 65 denotes a movable-side first electrode (electrode surface Sa), reference numeral 66 denotes a movable-side second electrode (electrode surface Sb), reference numeral 67 denotes a cylindrical member, and reference numeral 68 denotes a fixed-side electrode support member formed of a non-conductive material. Reference numeral 69 denotes a fixed-side first electrode (electrode surface SA) formed in the fixed-side electrode support member 68, reference numeral 70 denotes a fixed-side second electrode (electrode surface SB), reference numeral reference numeral 71 denotes a first void portion formed by the movable-side first electrode 65 and the fixed-side first electrode 69, and reference numeral 72 denotes a second void portion formed by the movable-side second electrode 66 and the fixed-side second electrode 70. The movable-side first electrode 65 and the movable-side second electrode 66 are bonded and fixed with a cylindrical member 67 interposed therebetween. The movable-side first electrode 65 is bonded and fixed to the front-side disc-shaped spring 60 at the outer peripheral portion. Assuming that the electrostatic capacitance signal A is determined by the gap of the first void portion 71 and the electrostatic capacitance signal B is determined by the gap of the second void portion 72, the two electrostatic capacitance signals A and B have opposite phases. That is, a differential sensor is configured by independently detecting the two electrostatic capacitance signals A and B. Reference numeral 73a denotes an axial conductor line that transmits the electrostatic capacitance signal B in the axial direction, and reference numeral 73b denotes a radial conductor line that transmits the electrostatic capacitance signal B in the radial direction. The two electrostatic capacitance signals A and B, and the currents flowing through the force coil 56a and the verification coil 56b are transmitted to the fixed side via the front-side disc-shaped spring 60 and the rear-side disc-shaped spring 61. The two disc-shaped springs are divided in the circumferential direction and constitute a plurality of independent signal transmission paths (not illustrated). Reference numeral 74 denotes a front-side panel.

In FIG. 43, a portion indicated by a two-dot chain line AA indicates an actuator portion that drives the two movable electrodes 65 and 66 in the axial direction. In the present embodiment, the MC type (moving coil type) is applied to the actuator portion. Instead of the MC type, the MM type (moving magnet type) described in the above-described embodiment may be used. Alternatively, an actuator of any form such as an MC type, a MM type, or an MI type may be applied.

Seventeenth Embodiment

Figure 44:
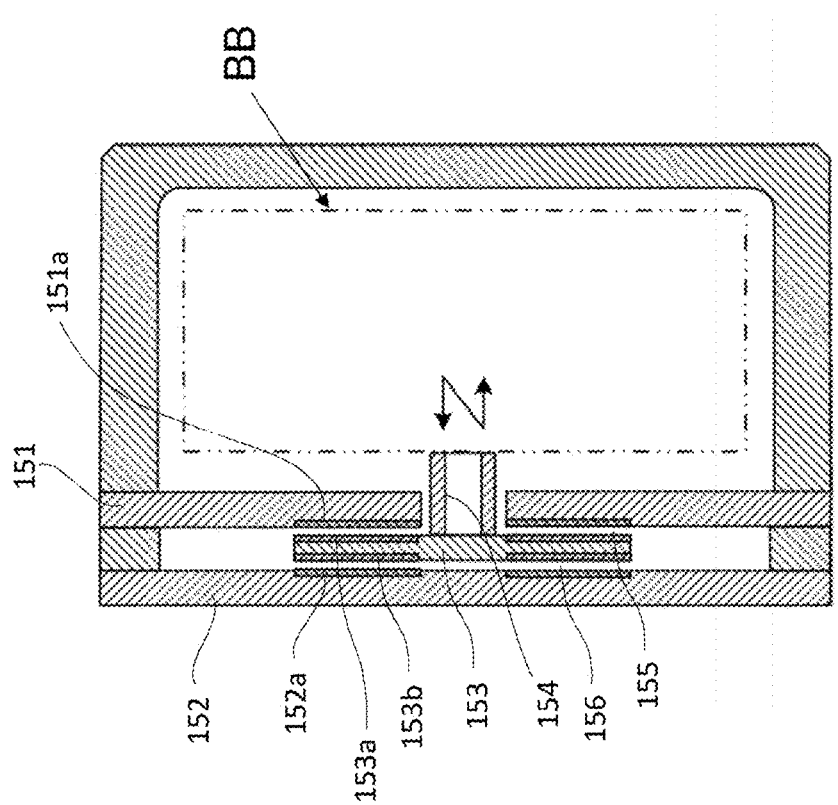
FIG. 44 is a front cross-sectional view of a servo-type acceleration sensor according to a seventeenth embodiment of the present invention.

In the above-described embodiment, two sets of electrostatic capacitance sensors are configured by sandwiching one fixed-side electrode support member between two movable electrodes. Contrary to this configuration, even if one movable electrode member is sandwiched between two fixed-side electrode support members, two sets of electrostatic capacitance sensors can be configured. In FIG. 44, reference numeral 151 denotes a first fixed-side electrode support member, reference numeral 152 denotes a second fixed-side electrode support member, reference numeral 153 denotes a movable-side electrode member, reference numeral 154 denotes a cylindrical coupling member, reference numeral 151a denotes a fixed-side first electrode (electrode surface Saa) formed on the surface of the first fixed-side electrode support member 151, and reference numeral 153a denotes a movable-side first electrode (electrode surface SAA) formed on the surface of the movable-side electrode member 153. Reference numeral 152a denotes a fixed-side second electrode (electrode surface Sbb) formed on the surface of the second fixed-side electrode support member 153, and reference numeral 153b denotes a movable-side second electrode (electrode surface SBB) formed on the surface of the movable-side electrode member 153. Reference numeral 155 denotes a first void portion formed by the movable-side first electrode 153a and the fixed-side first electrode 151a, and 156 denotes a second void portion formed by the movable-side second electrode 153b and the fixed-side second electrode 152a.

Assuming that the electrostatic capacitance signal A is determined by the gap of the first void portion 155 and the electrostatic capacitance signal B is determined by the gap of the second void portion 156, the two electrostatic capacitance signals A and B have opposite phases. That is, similarly to the above-described embodiment, a differential sensor is configured by independently detecting the two electrostatic capacitance signals A and B. A two-dot chain line BB in the drawing is an actuator portion that outputs the coupling member 154. An actuator of an MC type, an MM type, or any form may be applied to the actuator portion BB.

Eighteenth Embodiment

Figure 45:
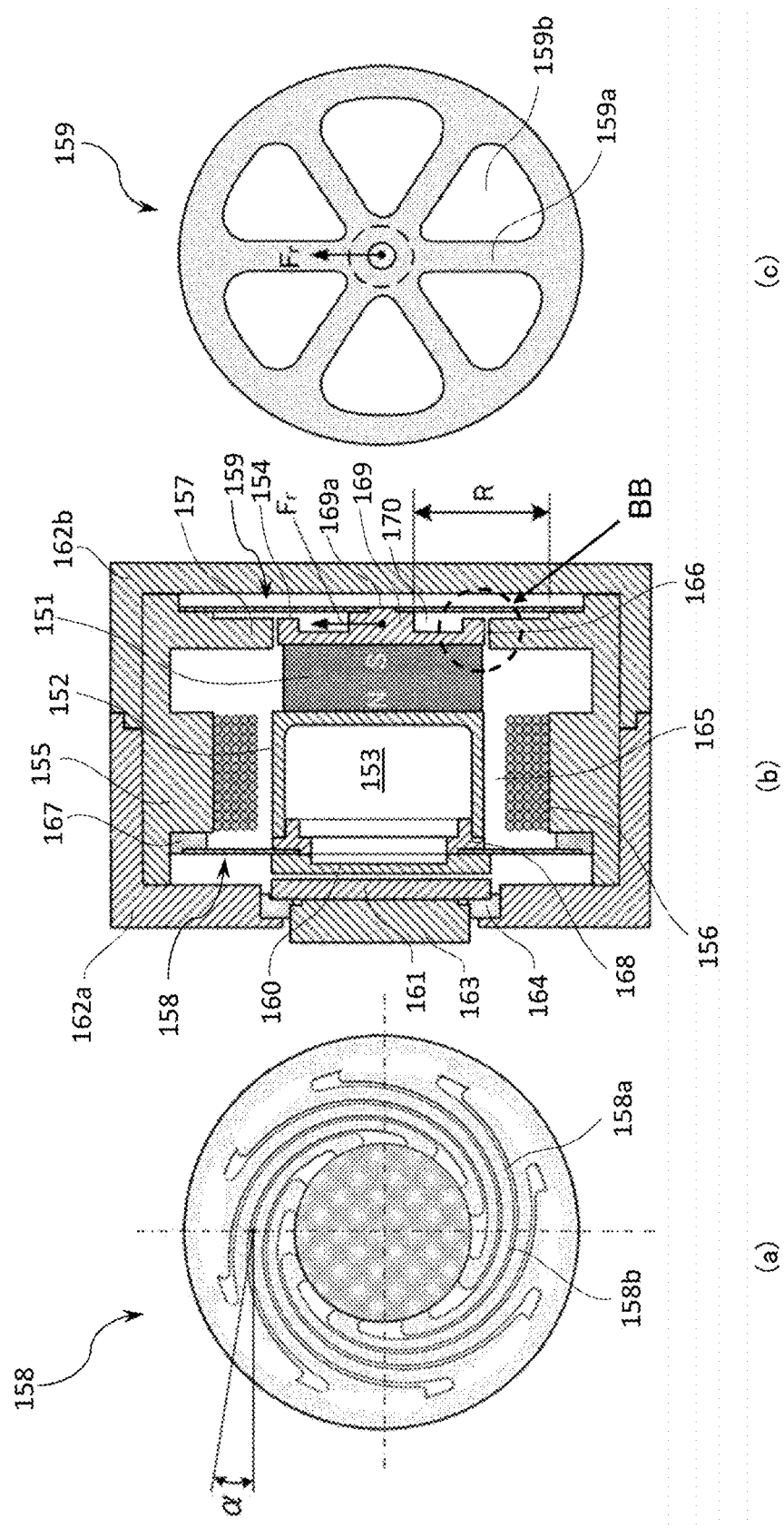
FIG. 45 illustrates a servo-type acceleration sensor according to an eighteenth embodiment of the present invention, in which FIG. 45 at a is a view illustrating a shape of a front-side spiral disc, FIG. 45 at b is a front cross-sectional view of the acceleration sensor, and FIG. 45 at c is a view illustrating a shape of a rear-side disc.

FIG. 45 illustrates a servo-type acceleration sensor according to an eighteenth embodiment of the present invention, in which FIG. 45 at a illustrates a shape of a front-side disc, FIG. 45 at b illustrates a front cross-sectional view of an acceleration sensor body, and FIG. 45 at c illustrates a shape of a rear-side disc. In a magnetic coupling portion (chain line circle BB) which is a magnetic path constituting a closed loop magnetic circuit, when component accuracy and assembly accuracy are not sufficiently obtained and the axial centers on the fixed side and the movable side are eccentric, a magnetic attractive force in the centrifugal direction ($F_r$ in the drawing) is generated. The present embodiment illustrates a disc shape that reduces this influence as much as possible.

Reference numeral 151 denotes a permanent magnet magnetized in the axial direction, reference numeral 152 denotes a front-side pole piece, reference numeral 153 denotes a space formed inside the pole piece, reference numeral 154 denotes a rear-side pole piece, reference numeral 155 denotes a coil-side yoke material, reference numeral 156 denotes a force coil, reference numeral 157 denotes a protruding portion formed on an inner surface of the coil-side yoke material, and reference numerals 158 and 159 denote a front-side disc and a rear-side disc that support a movable portion. Reference numeral 160 denotes a movable-side electrode, reference numeral 161 denotes a fixed-side electrode, reference numeral 162a denotes a front-side panel, reference numeral 162b denotes a rear-side panel, reference numeral 163 denotes a center plate, reference numeral 164 denotes a fastening member, and reference numeral 165 denotes a magnetic void portion. A point that an annular void portion 166 formed by a narrow gap is provided between the protruding portion 157 of the coil-side yoke material and the rear-side pole piece 154 is the same as in the above-described embodiment. Reference numeral 167 denotes an outer peripheral-side support ring, and reference numeral 168 denotes an inner peripheral-side support ring. By "permanent magnet 151→front-side pole piece 152→magnetic void portion 165→coil-side yoke material 155→protruding portion 157→annular void portion 166→rear-side pole piece 154→permanent magnet 151", a closed loop magnetic circuit is formed as indicated by a chain arrow in the same manner as in the above-described embodiment. The shape of the rear-side pole piece 154 is different from that of the above-described embodiment. Reference numeral 169 denotes a convex portion formed at the central portion of the rear-side pole piece, reference numeral 169a denotes a central convex portion for positioning the central portion of the rear-side disc, and reference numeral 170 denotes a void portion.

In the present embodiment, as illustrated in FIGS. 45 at a and 45 at c, the disc shape supporting the movable portion is greatly different between the front side and the rear side. The front-side disc (FIG. 45 at a) is a spiral spring having a ridge portion 158a and a groove portion 158b that are long in the circumferential direction. On the other hand, the rear-side disc (FIG. 45 at c) includes six ridge portions 159a perpendicular to the circumferential direction and a groove portion 159b between the ridge portions. In order to reduce the axial rigidity $K_a$ of the rear-side disc, the width of the ridge portion 159a is set to be narrow, and the support interval R between the central portion and the outer peripheral portion is set to be sufficiently long. A plate thickness of the rear-side disc is sufficiently thinner than that of the front-side disc. Since the rigidity of the disc is inversely proportional to the cube of the plate thickness, for example, when the plate thickness becomes ½, the rigidity becomes ⅛. The axial rigidity $k_a$ of the rear-side disc is small like the front-side disc, and the radial rigidity $K_r$ is extremely high. That is, in the magnetic coupling portion BB, when the axial centers on the fixed side and the movable side are eccentric, the axial centers on the movable side can be maintained at the same radius position by the centripetal direction rigidity $k_r$ sufficiently high with respect to the magnetic attractive force $F_r$ generated in the centrifugal direction. Here, the misalignment amount of the movable side axis with respect to the fixed side axis is $\delta_r$. When $\delta_r=0$, the magnetic attractive force $F_r$ in the centrifugal direction is 0. However, when eccentricity satisfying $\delta_r>0$ occurs, the magnetic attractive force $F_r$ and the misalignment amount $\delta_r$ further increase. The relationship between the magnetic attractive force $F_r$ in the centrifugal direction and the misalignment amount $\delta_r$ is nonlinear, and the axis on the movable side placed in the magnetic field is under an unstable balance condition. Here, when $K_{mr}=F_r/\delta_r$ is defined, $K_{mr}$ is a negative spring rigidity formed by the magnetic circuit. Here, $F_{mr}>0$ and $K_{mr}>0$ are defined. Therefore, if the centripetal direction rigidity of the disc is selected to satisfy $K_r>K_{mr}$, the magnetic coupling portion BB can maintain a stable state. The shape of the rear-side disc is not limited to that described in the present embodiment. Any shape may be used as long as the radial rigidity $k_r$ is sufficiently high with respect to the axial rigidity $k_a$. For example, in the case of the spiral shape, if the spiral angle α(see FIG. 45 at a) is defined as the gradient of the curve with respect to the circumferential direction, the curve may have a sufficiently large angle α. Sufficiently high radial rigidity $k_r$ is obtained in the range of 45≤α≤90 deg. The shape of the front-side disc is not limited to the spiral curve described in the present embodiment. The disc may have a shape close to the rear-side disc in the present embodiment as long as the disc has a sufficiently thin plate thickness and can be kept within the elastic limit of the material.

In the present embodiment, precipitation hardening type high-strength stainless steel (SUS631) is applied to the rear-side disc shown in FIG. 45 at c. This material is a stainless steel obtained with very high hardness by generating an intermetallic compound containing fine Al in martensite by a precipitation hardening treatment after cold rolling. The special steel material is used for the following reasons. In order to maintain a small disc outer diameter and reduce the axial rigidity $k_a$, it is necessary to reduce the plate thickness and to narrow the width of the ridge portion. Therefore, it is necessary to withstand a large generated stress as compared with the case where the spiral angle α illustrated in FIG. 45 at a is sufficiently small. The high strength stainless steel applied has, for example, three times the tensile strength (1400 to 1500 N/m²) and a spring limit value compared to a normal steel material such as SUS304. In addition, for example, stainless steel such as SUS632J1 may be used, and if the tensile strength is >1000 N/m², it can be applied to the present invention. The above findings and measures regarding the disc shape, the strength of the disc material, and the like described in the present embodiment are applicable to all the embodiments of the present invention.

(II) Moving Yoke Type (MY Type) Acceleration Sensor

The embodiment of the present invention described above is a proposal of the MM type in which the permanent magnet moves as compared with the conventional MC type in which the coil moves. Returning to the origin again, attention is paid to the fact that the magnetic circuit of the actuator portion constituting the servo-type acceleration sensor forms a closed loop with only three elements of "permanent magnet", "coil", and "yoke material". Here, the proposal of the present embodiment is whether the servo-type acceleration sensor can be configured by fixing both the "permanent magnet" and the "coil" and moving only the "yoke material". That is, it is a proposal of a moving yoke type (MY type (provisional name)), which is also referred to as a "third linear motor". The characteristics of the MY-type acceleration sensor include:

(1) The weight of the movable portion mass can be reduced similarly to the MC type.
(2) Similarly to the MM type, the ultrafine wire processing of the coil is unnecessary.

That is, it is possible to eliminate both disadvantages of the MM type and the MC type and to combine both advantages.

Nineteenth Embodiment

Figure 46:
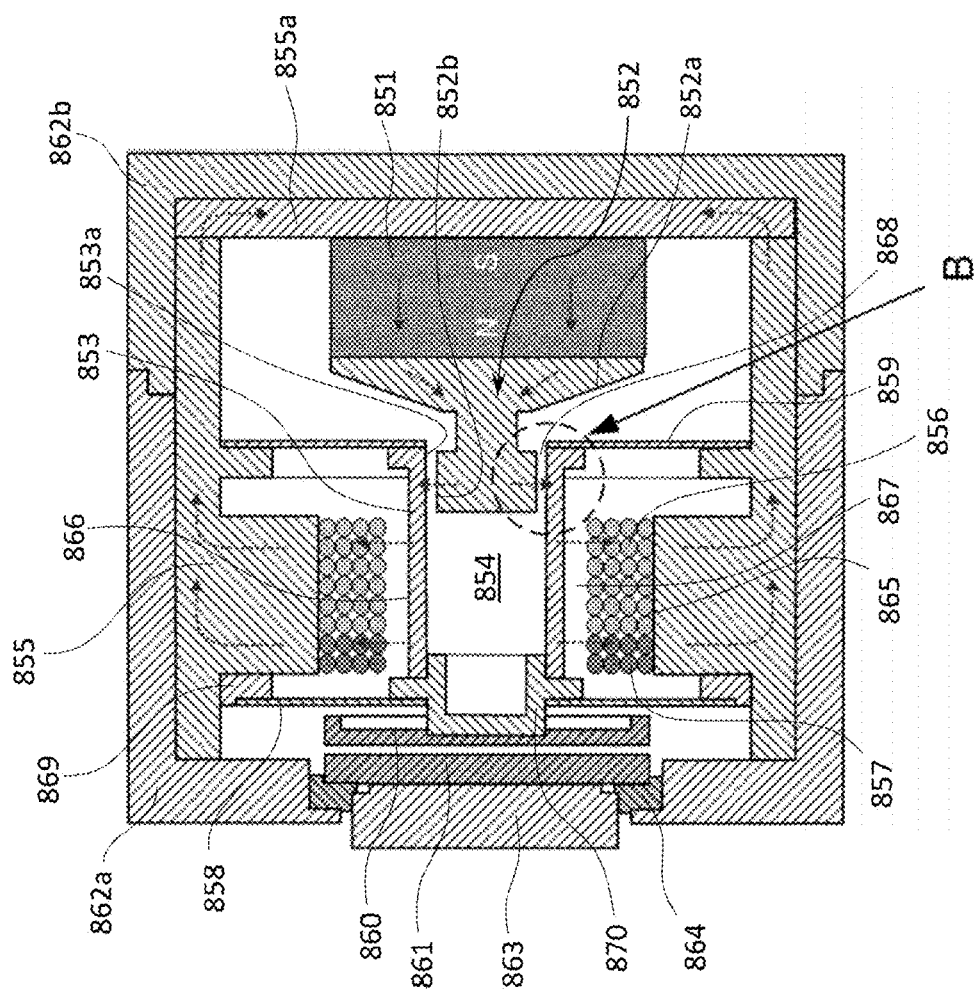
FIG. 46 is a front cross-sectional view of a servo-type acceleration sensor according to a nineteenth embodiment of the present invention.

FIG. 46 is a front cross-sectional view of a MY-type servo-type acceleration sensor according to a nineteenth embodiment of the present invention. Reference numeral 851 denotes a permanent magnet magnetized in the axial direction, reference numeral 852 denotes a fixed-side pole piece (pole piece-side yoke material), reference numeral 852a denotes a tapered portion of the fixed-side pole piece, and reference numeral 852b denotes a columnar portion of the fixed-side pole piece. Reference numeral 853 denotes a movable-side pole piece (movable-side yoke material), and 853a denotes an opposing surface of the columnar portion 852b in the fixed-side pole piece. A space 854 is formed for weight reduction inside the movable-side pole piece. Reference numeral 855 denotes a coil-side yoke material, 855a denotes a permanent magnet-side yoke material, 856 denotes a force coil, and 857 denotes a bias coil. Reference numeral 858 denotes a front-side disc, 859 denotes a rear-side disc, 860 denotes a movable-side electrode, 861 denotes a fixed-side electrode, 862a denotes a front-side panel, 862b denotes a rear-side panel, 863 denotes a center plate, 864 denotes a fastening member, 865 denotes a coil mounting portion on an inner peripheral surface of the coil-side yoke material, 866 denotes a coil opposing surface of the movable-side pole piece, and a magnetic void portion 867 (first void portion) in a radial direction is formed between the coil opposing surface 866 and the coil mounting portion 865. Between the columnar portion 852B of the fixed-side pole piece and the opposing surface 853a thereof, a void portion 868 (second void portion) is provided by a narrow gap (chain line circle B). This chain line circle B is a magnetic coupling portion. Reference numerals 869 and 870 denote an outer peripheral-side support ring and an inner peripheral-side support member made of a non-conductive material. In the present embodiment, when a minute axial force is generated in the movable-side pole piece 853 in a state where no current is applied to the force coil 856, the pole piece 853 can be maintained at a constant position by flowing a bias current to the bias coil 857. By "permanent magnet 851 →fixed-side pole piece 852→void portion 868→movable-side pole piece 853→magnetic void portion 867→coil-side yoke material 855→permanent magnet-side yoke material 855a→permanent magnet 851", a closed loop magnetic circuit is formed as indicated by a chain arrow.

The operation principle of the sensor according to the present embodiment is similar to that of the MM type described above. When a current is applied to the force coil 856, a reaction force of the Lorentz force, which is the operation principle of the linear motor, acts on the movable-side pole piece 853. Since the current of the force coil 856 and the acceleration due to the external force are in a proportional relationship, the acceleration is measured by detecting the current of the force coil 856. The method for extracting the force coil 856, the lead wire of the bias coil 857, and the signal line of the electrode to the outside is the same as that in the above-described embodiment. The same method as in FIG. 1 at b of the first embodiment or FIGS. 36 and 38 at a of the fourteenth embodiment with the bolt fastening structure may be used. As shown in FIG. 36, one example is a method in which the outer groove portion 777 is formed in the outer peripheral portion of the coil-side yoke material 755, and the coil 774 lead wire is attached to this groove portion. The same configuration can be applied to the present embodiment and embodiments described later (not illustrated).

The characteristics of the MY-type acceleration sensor according to the present invention are summarized as follows.

(1) The inertial mass of the movable portion can be selected in a wide range. In the present embodiment, the movable-side pole piece 853 is formed in a cylindrical shape, but if the cylindrical portion is made thin and the weight thereof is reduced, it is possible to achieve performance focusing on high frequency characteristics that are characteristics of the MC type. When the movable-side pole piece 853 is formed in a solid cylindrical shape to increase the inertial mass, it is possible to achieve performance focusing on low-frequency characteristics that are characteristics of the MM type. That is, depending on the shape of the movable-side pole piece 853, it is possible to arbitrarily select the sensor specification according to the characteristics required by the target (active vibration isolator or the like) to which the present sensor is applied.

(2) The performance of the permanent magnet can be selected in a wide range. Since there are no restrictions on the size and shape of the permanent magnet 851, demagnetization characteristics (holding force $H_c$, saturation magnetic flux density $B_r$), which are indexes of permanent magnet performance, can be widely selected. Since there is a margin in the performance of the permanent magnet, the void portion 868 in the magnetic coupling portion B may be sufficiently large. Although the void portion 868 becomes a magnetic resistance, performance of the permanent magnet sufficient to compensate for the loss can be obtained.

(3) The coil specification can also be selected in a wide range. As shown in the present embodiment, when the movable-side pole piece 853 has a thin cylindrical shape, an increase in inertial mass is small even when the movable-side pole piece 853 is lengthened. By utilizing this point, since the coil housing volume can be sufficiently increased, the coil wire diameter and the number of coil turns can be selected without increasing the electrical resistance. Further, according to the features (1) to (3), since the generated force of the actuator can be selected in a wide range, an acceleration sensor having excellent sensor sensitivity from low frequency characteristics to high frequency characteristics can be realized.

The same applies to the present embodiment relating to the MY-type acceleration sensor and the embodiments described later, but many findings and devices relating to the MM-type acceleration sensor of the present invention described in Section (I) can also be applied to the MY-type acceleration sensor. For example, (i) a structure in which heat generated from a coil is dissipated using a non-magnetic coil bobbin having good thermal conductivity, (ii) a cantilever pendulum structure in which one end is a fixed end and the other end is a free end on an elastic member that supports a movable portion, (iii) a structure in which a bonding method and a minimum bolt fastening method are combined for joining between members, (iv) a structure in which the inner peripheral side and the outer peripheral side of the elastic member are fastened to the fixed side with a non-conductive material interposed therebetween in order to achieve electrical insulation, (v) a structure in which the movable-side electrode and the movable member (pole piece) are electrically insulated, (vi) a structure in which a disc-shaped spring made of a magnetic material and having sufficiently small axial rigidity is used for a magnetic coupling portion, and the like can be applied.

In addition, a laminated steel plate (for example, the plate thickness is 0.1 to 0.2 mm) in which a ring-shaped disc having a thin plate thickness is superposed is attached to a place corresponding to the fixed-side pole piece 852 constituting the magnetic coupling portion B and the movable-side pole piece 853 which is an opposing surface of the fixed-side pole piece 852. As applied in a motor, a magnetically controlled bearing, and the like, an eddy current loss generated at a relative moving location can be reduced, so that characteristics advantageous for high frequency characteristics can be obtained. The present invention is not limited to the present embodiment, and the same applies to a magnetic coupling portion (for example, a portion B in FIG. 1 that is the first embodiment) in the embodiment described later and the MM type described in Section (I) (not illustrated).

Twentieth Embodiment

Figure 47:
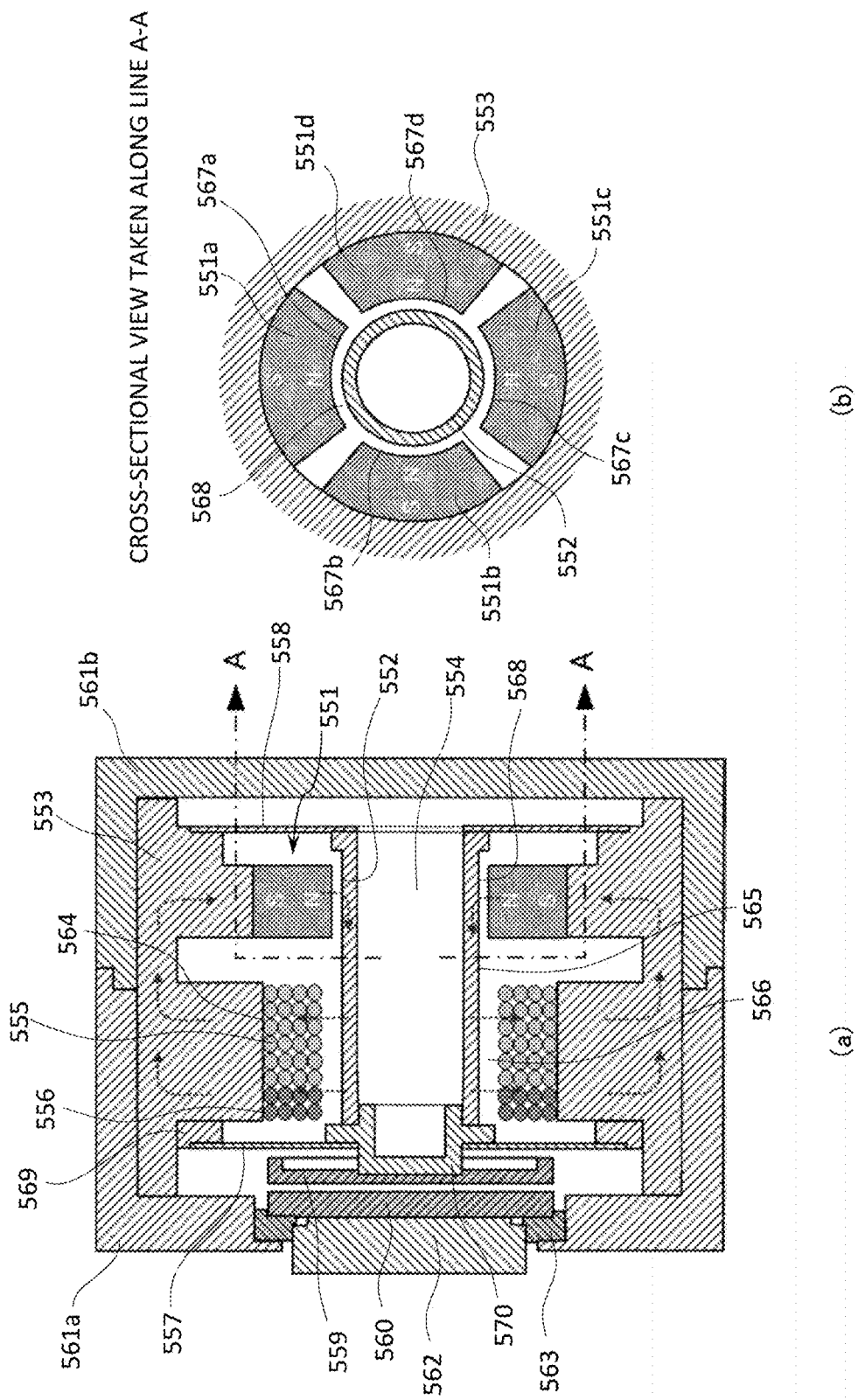

FIG. 47 illustrates a servo-type acceleration sensor of the MY type according to a twentieth embodiment of the present invention, in which FIG. 47 at a is a front cross-sectional view, and FIG. 47 at b is a cross-sectional view taken along line A-A of FIG. 47 at a. In the present embodiment, a magnetic circuit is configured using a plurality of segment-type permanent magnets magnetized in the radial direction.

Reference numeral 551 denotes a permanent magnet, reference numeral 552 denotes a pole piece (movable-side yoke material), and reference numeral 553 denotes a fixed-side yoke material. The permanent magnet includes segment-type permanent magnets 551*a*, 551*b*, 551*c*, and 551*d* magnetized in the radial direction, and is attached to the yoke material. Reference numeral 554 denotes an internal space of the pole piece, reference numeral 555 denotes a force coil, reference numeral 556 denotes a verification coil, reference numeral 557 denotes a front-side disc, reference numeral 558 denotes a rear-side disc, reference numeral 559 denotes a movable-side electrode, reference numeral 560 denotes a fixed-side electrode, reference numeral 561*a* denotes a front-side panel, reference numeral 561*b* denotes a rear-side panel, reference numeral 562 denotes a center plate, reference numeral 563 denotes a fastening member, reference numeral 564 denotes a coil mounting portion on an inner peripheral surface of the yoke material, and reference numeral 565 denotes a coil opposing surface of the pole piece, and a magnetic void portion 566 (first void portion) in a radial direction is formed between the coil opposing surface 565 and the coil mounting portion 564. Between the pole pieces facing the inner peripheral surfaces 567*a*, 567*b*, 567*c*, 567*d* of the permanent magnet 551, a void portion 568 (second void portion) is provided by a narrow gap. The void portion 568 is a magnetic coupling portion. Reference numerals 569 and 570 denote an outer peripheral-side support ring and an inner peripheral-side support member made of a non-conductive material. By "permanent magnet 551→void portion 568→pole piece 552→magnetic void portion 566→fixed-side yoke material 553→permanent magnet 551", a closed loop magnetic circuit is formed as indicated by a chain arrow.

In the present embodiment, since the permanent magnet is a segment-type permanent magnet magnetized in the radial direction, no electromagnetic force (unbalanced force) in the axial direction is generated in the pole piece 552 in a state where no current is applied to the force coil 555. Therefore, since the pole piece 552 can be maintained at the same position, fine adjustment by the bias coil current as in the above-described embodiment is unnecessary.

Instead of using a segment-type permanent magnet magnetized in the radial direction, a permanent magnet magnetized in the axial direction may be used and connected to a yoke material in which a magnetic flux flows in the radial direction. The shape of the yoke material may be a shape like the segment-type permanent magnet described above. The fixed-side yoke material may be disposed so as to wrap the outer peripheral portion of the pole piece (not illustrated).

Alternatively, a plurality of thin segment-type permanent magnets magnetized in the radial direction may be mounted on the outer peripheral surface of the pole piece 552 facing the inner peripheral surfaces 567*a* to 567*d* of the permanent magnet 551. That is, it is a hybrid structure of MY type and MC type. With this configuration, the magnetic resistance of the magnetic coupling portion (magnetic void portion 568) can be reduced.

Twenty-First Embodiment

Figure 48:
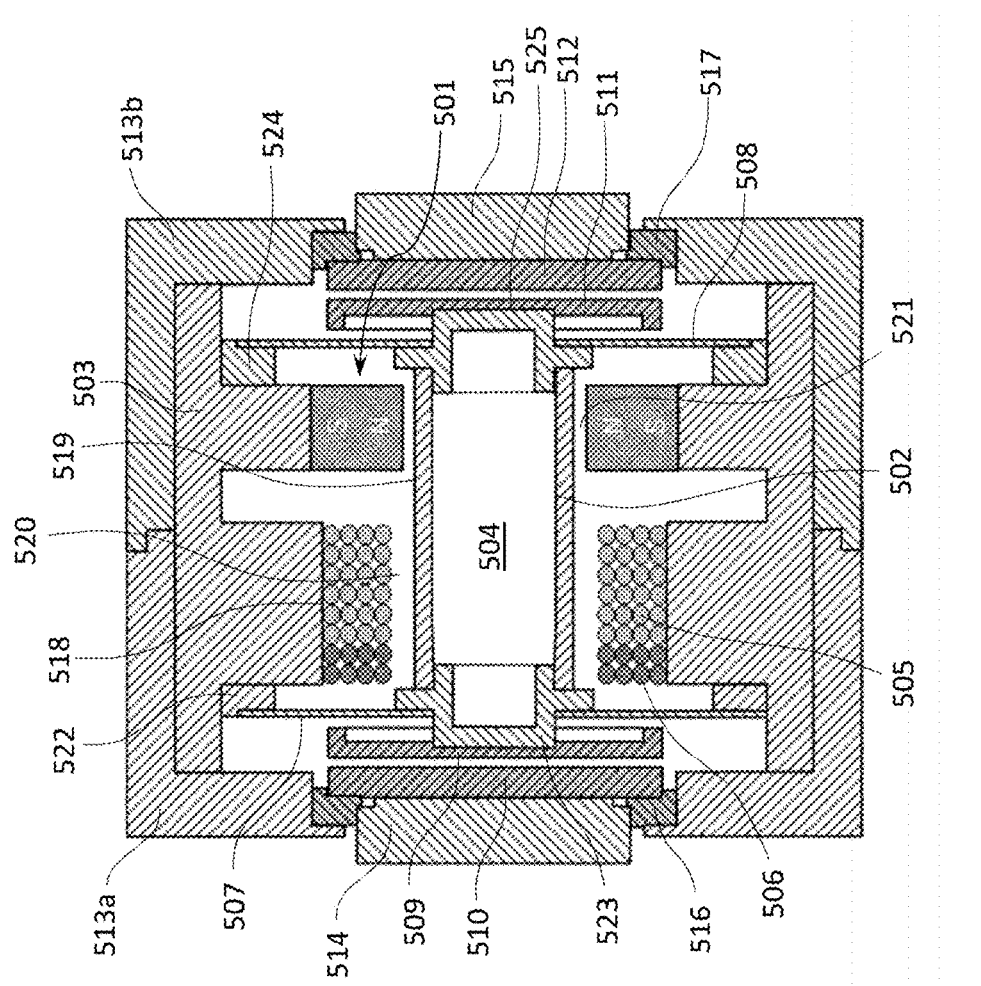
FIG. 48 is a front cross-sectional view of a servo-type acceleration sensor according to a twenty-first embodiment of the present invention.

FIG. 48 is a front cross-sectional view of a differential servo-type acceleration sensor according to the MY type according to a twenty-first embodiment of the present invention. It focuses on the fact that both the left and right output shafts are open ends by forming a magnetic circuit using a permanent magnet of MY type and magnetized in the radial direction. By providing electrodes for detecting electrostatic capacitance at two locations on the left and right, a differential electrostatic capacitance-type sensor can be realized. By making the acceleration sensor differential, it is possible to realize a high-resolution sensor in which the sensor output is hardly affected by disturbance signals such as noise and drift.

Reference numeral 501 denotes a permanent magnet, reference numeral 502 denotes a pole piece, and reference numeral 503 denotes a yoke material. The permanent magnet includes a plurality of segment-type permanent magnets magnetized in a radial direction, and is attached to the yoke material. Reference numeral 504 denotes an internal space of the pole piece, 505 denotes a force coil, reference numeral 506 denotes a verification coil, reference numeral 507 denotes a front-side disc, reference numeral 508 denotes a rear-side disc, reference numeral 509 denotes a front-side movable electrode, reference numeral 510 denotes a front-side fixed electrode, reference numeral 511 denotes a rear-side movable electrode, reference numeral 512 denotes a rear-side fixed electrode, reference numeral 513*a* denotes a front-side panel, reference numeral 513*b* denotes a rear-side panel, reference numeral 514 denotes a front-side center plate, reference numeral 515 denotes a rear-side center plate, reference numeral 516 denotes a front-side fastening member, and reference numeral 517 denotes a rear-side fastening member. Reference numeral 518 denotes a coil mounting portion on an inner peripheral surface of the yoke material, reference numeral 519 denotes a coil opposing surface of the pole piece, reference numeral 520 denotes a magnetic void portion, reference numeral 521 denotes a void portion which is a magnetic coupling portion, and reference numerals 522 and 523 denote a front-side outer peripheral support ring and a front-side inner peripheral-side support member made of a non-conductive material. Reference numerals 524 and 525 denote a rear-side outer peripheral support ring and a rear-side inner peripheral support member made of a non-conductive material.

The method for connecting the conductive wire for detecting the electrostatic capacitance between the movable electrode and the fixed electrode and the outside is the same as that in the above-described embodiment (not illustrated).

The absolute speed signal and the absolute displacement signal obtained by completely integrating the acceleration output of the sensor of the present invention which is a differential type do not diverge easily. Therefore, in a case where the sensor of the present invention is applied to an active vibration isolator, in addition to the effect of improving the sensor sensitivity (for example, the positioning accuracy of the stage is improved), a significant vibration isolation characteristic improvement effect can be obtained in a low frequency region.

(III) Other Embodiments

The above-described embodiments (I) and (II) are examples of the MM-type and the MY-type acceleration sensors including the voice coil that generates the Lorentz force and the permanent magnet. In the following embodiment, an electromagnet that generates a magnetic attractive force by Maxwell stress instead of Lorentz force is applied. The present embodiment is the same as the embodiments (I) and (II) in that a coil constituting an electromagnet is fixed. In addition, the present embodiment may be considered as one of other forms of the MY type of section (II) in that neither the coil nor the permanent magnet is moved, and only the yoke material constituting the closed loop magnetic circuit is moved.

Twenty-Second Embodiment

Figure 49:
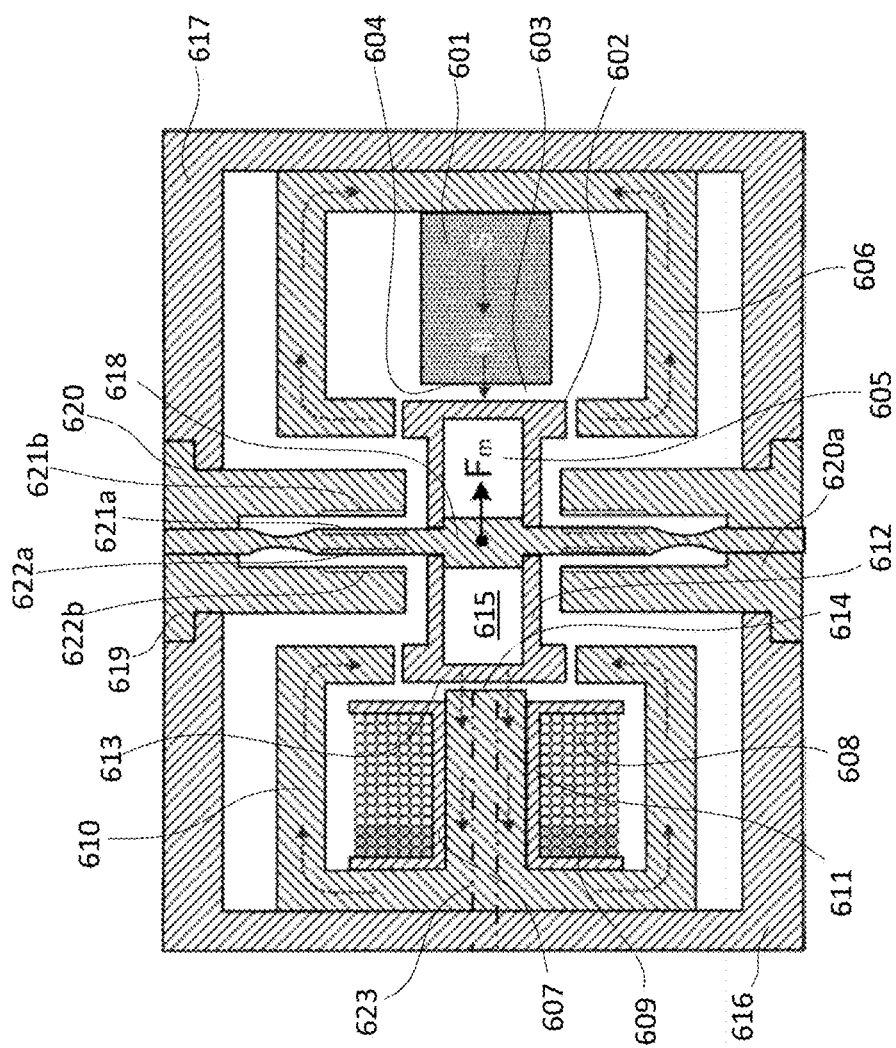
FIG. 49 is a front cross-sectional view of a servo-type acceleration sensor according to a twenty-second embodiment of the present invention.

FIG. 49 is a front cross-sectional view of a servo-type acceleration sensor according to a twenty-second embodiment of the present invention. A servo-type acceleration sensor is configured by combining an electromagnet that generates a magnetic attractive force and a permanent magnet.

Reference numeral 601 denotes a permanent magnet magnetized in the axial direction, reference numeral 602 denotes a permanent magnet-side pole piece, reference numeral 603 denotes the permanent magnet-side opposing surface of the pole piece 602, reference numeral 604 denotes the pole piece-side opposing surface of the permanent magnet, reference numeral 605 denotes a space formed inside the pole piece 602, and reference numeral 606 denotes a permanent magnet-side yoke material. Reference numeral 607 denotes a coil bobbin, reference numeral 608 denotes a force coil (control coil) of an electromagnet, and reference numeral 609 denotes a bias coil. Yoke materials on an electromagnet side are constituted by 610 and 611, reference numeral 610 denotes an outer circumferential-side yoke material with respect to the shaft cores of coils 608 and 609, and reference numeral 611 denotes a shaft core-side yoke material.

Reference numeral 612 denotes a pole piece on the electromagnet side (movable member-side yoke material), reference numeral 613 denotes the central axis-side opposing surface of the pole piece 612, reference numeral 614 denotes the pole piece-side opposing surface of the central axis, and reference numeral 615 denotes a space formed inside the pole piece 612.

Reference numeral 616 denotes an electromagnet-side housing, reference numeral 617 denotes a permanent magnet-side housing, reference numeral 618 denotes a movable member made of a non-magnetic material, and reference numerals 619 and 620 denote fastening members holding the movable member 618 from the left and right. The fastening member is fixed from left and right by the permanent magnet-side housing and the electromagnet-side housing. Reference numerals 621*a* and 621*b* denote the movable-side electrode R and the fixed-side electrode R. Reference numerals 622*a* and 622*b* denote the movable-side electrode L and the fixed-side electrode L. The two electrodes formed on the left and right sides of the movable portion constitute a differential acceleration sensor. The shaft core-side yoke material 611 and the imaginary line 623 in the electromagnet-side housing 616 are through passages necessary when a displacement sensor other than an electrostatic capacitance type is used (described later in Supplement (3)).

The permanent magnet-side pole piece 602 and the electromagnet-side pole piece 612 are made of a magnetic material, and are fixed to the left and right at the central portion of the movable member 618 made of a non-magnetic material. On the electromagnet side, a closed loop magnetic circuit is formed by a member including "central axis 611→electromagnet-side yoke material 610→electromagnet-side pole piece 612". On the permanent magnet side, a closed loop magnetic circuit is formed by a member including "permanent magnet 601→permanent magnet-side pole piece 602→permanent magnet-side yoke material 606". As illustrated in the drawing, the attractive force $F_m$ by the permanent magnet 601 always acts on the movable portion 618. When the acceleration sensor is activated, the movable portion 618 is maintained at the origin position by causing a current to flow through the bias coil 609. In this state, when an external force is applied to the entire movable portion, a current flows through the force coil 608 so as to return the movable portion 618 to the origin position. Since the current of the force coil 608 and the acceleration due to the external force are in a proportional relationship, the acceleration is measured by detecting the current of the force coil 608.

In the acceleration sensor of the present embodiment, the magnetic attractive force by the Maxwell stress is used to drive the movable portion. When the external dimensions of the actuators are compared under the same conditions, in the Maxwell stress, the electromechanical conversion efficiency (thrust constant) of the generated force with respect to the input current is overwhelmingly higher than that of the Lorentz force, and is usually 20 times or more. By using this point, the acceleration sensor of the present embodiment can extremely increase the upper limit value of the measurable acceleration.

However, in a case where the upper limit value of the measurable acceleration may be small, instead of the Maxwell stress actuator, a configuration in which a Lorentz force actuator according to the embodiment of section (I) and a permanent magnet are combined may be used (not illustrated).

Twenty-Third Embodiment

Figure 50:
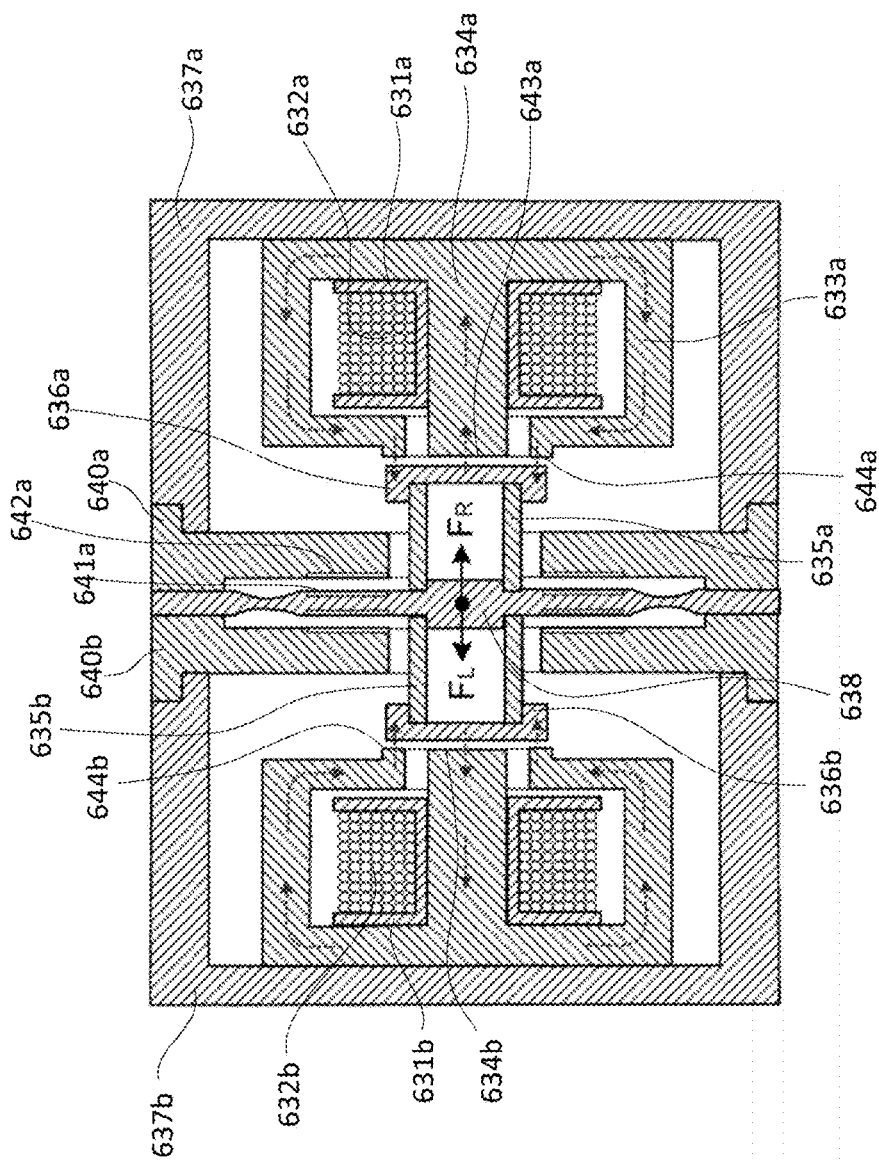
FIG. 50 is a front cross-sectional view of a servo-type acceleration sensor according to a twenty-third embodiment of the present invention.

FIG. 50 is a front cross-sectional view of a servo-type acceleration sensor according to a twenty-third embodiment of the present invention. A servo-type acceleration sensor is configured by combining two electromagnets that generate magnetic attractive force by Maxwell stress symmetrically.

Since the component configuration of the present acceleration sensor is bilaterally symmetrical, the subscript on the right side of the drawing is a, and the subscript on the left side is b. First, the component configuration on the right side will be described. Reference numeral 631a denotes a coil bobbin, and 632a denotes a force coil of an electromagnet.

The yoke material on the electromagnet side is constituted by 633a and 634a, where 633a is an outer circumferential-side yoke material with respect to the axis of the coil 632a, and 634a is a shaft core-side yoke material (central axis). Reference numeral 635a denotes a cylindrical portion of the pole piece made of a non-magnetic material, reference numeral 636a denotes a flat plate portion (movable member-side yoke material) of the pole piece made of a magnetic material, reference numeral 637a denotes a housing, reference numeral 638 denotes a movable member made of a non-magnetic material, and reference numerals 640a and 640b denote fastening members that hold the movable member 638 from the left and right. The movable member is fastened from the left and right by fastening members 640a and 640b. Reference numeral 641a denotes a movable-side electrode, and reference numeral 642a denotes a fixed-side electrode. The two electrodes formed on the left and right sides of the movable portion constitute a differential acceleration sensor. Reference numeral 643a denotes a first magnetic pole that is a tip of the central axis, and reference numeral 644a denotes a second magnetic pole that is a tip of the yoke material on the outer peripheral side of the central axis. A closed loop magnetic circuit is formed by "central axis 634a→yoke material 633a→second magnetic pole 644a→flat plate portion 636a of pole piece→first magnetic pole 643a→central axis 634a".

The shape of the yoke material constituting the electromagnet, the position of the coil, and the like may take any form as long as the closed loop magnetic circuit is formed between the yoke material and the movable-side member.

In a state where no current is applied to the force coils 632a and 632b of the left and right electromagnets, no attractive force acts on the movable member 638, so that the movable member 638 maintains the original position. When an external force is applied to the entire movable portion, a reverse current flows through each of the force coils 632a and 632b so as to return the movable portion 638 to the origin position. For example, a current of $I_R = I_0 + \delta I$ flows through the right force coil 632a, and a current of $I_L = I_0 - \delta I$ flows through the left force coil 632b. At this time, the right and left current difference is $\Delta I = I_R - I_L = 2\delta I$. Since the current difference $\Delta I$ flowing to each force coil and the acceleration due to the external force are in a proportional relationship, the acceleration is measured by detecting the current difference $\Delta I$.

As described above, in the Maxwell stress, the electromechanical conversion efficiency (thrust constant) of the generated force with respect to the input current is overwhelmingly higher than that of the Lorentz force. Therefore, by using this point, the acceleration sensor of the present embodiment can measure extremely large acceleration. In addition, for the purpose of slight vibration measurement, a large force can be generated even when the number of turns of the coil is small, so that the entire acceleration sensor including the actuator can be greatly reduced in size.

(Note) (1) Magnetic Material

Hereinafter, contents common to the embodiments described in sections (I) to (III) will be supplemented.

As the magnetic material used for the actuator portion of the servo-type acceleration sensor, electromagnetic stainless steel, pure iron, permalloy, tufpalm, permendur, amorphous, or the like can be applied. In addition, a magnetic material may be used for components constituting the closed loop magnetic circuit, and a non-magnetic material may be used for a housing or the like that is a case for housing an actuator.

(2) Characteristics of Acceleration Sensor Required When Active Vibration Isolator is Mounted For example, the reason why a high resonance frequency of several hundred Hz is required for an acceleration sensor used in an active pneumatic servo vibration isolator in which the responsiveness (eigenvalue) of the entire system is about several Hz to a little more than ten Hz will be described. In the active vibration isolator, acceleration feedback is applied in addition to proportional displacement feedback. Mainly application of acceleration feedback is a prerequisite to reduce resonance peaks. If the following two points are satisfied on the Bode diagram of the round transfer function, the system is stable as is well known.

(i) There is a positive gain margin at the phase intersection.
(ii) There is a positive phase margin at the gain intersection. Acceleration feedback increases the gain and delays the phase by 180 degrees.

Therefore, even when the responsiveness (eigenvalue) of the entire system is about several Hz to a little more than ten Hz, the acceleration feedback gives the gain margin and the phase margin of the frequency having a high influence. Therefore, a high resonance frequency (high-speed responsiveness) is required for the acceleration sensor and the pneumatic servo-valve which are control elements constituting the active vibration isolator. As the resonance frequency $f_0$ is higher, the phase delay in the vicinity of f=100 Hz can also be reduced. According to many experimental results, $f_0$>200 Hz is an allowable range, but as described above, $f_0$≥250 Hz is more preferable. In the vicinity of f=100 Hz, the phase delay $\Delta\Phi_p$<20 deg is an allowable range, but $\Delta\Phi_p$≤10 deg is more preferable.

(3) Types of Displacement Detecting Units Applicable to the Present Invention

The displacement detecting means in the embodiment of the present invention described in sections (I) to (III) all show a case where the electrostatic capacitance type is applied. However, the feature of the present invention is a unique effect as a servo-type sensor obtained by applying an actuator structure different from the conventional one. For example,
 (i) Since the ultrafine wire processing of handling the plurality of coil signals is simplified, the yield at the time of mass production can be greatly improved.
 (ii) High frequency characteristics can be improved by devising to reduce the weight of the movable portion while maintaining the characteristics of the (i). Alternatively, by selecting the inertial mass of the movable portion, it is possible to realize an acceleration sensor focusing on any of characteristics of a high frequency and a low frequency.
 (iii) Application of the differential type can reduce drift and noise of the sensor signal, etc.

Figure 51:
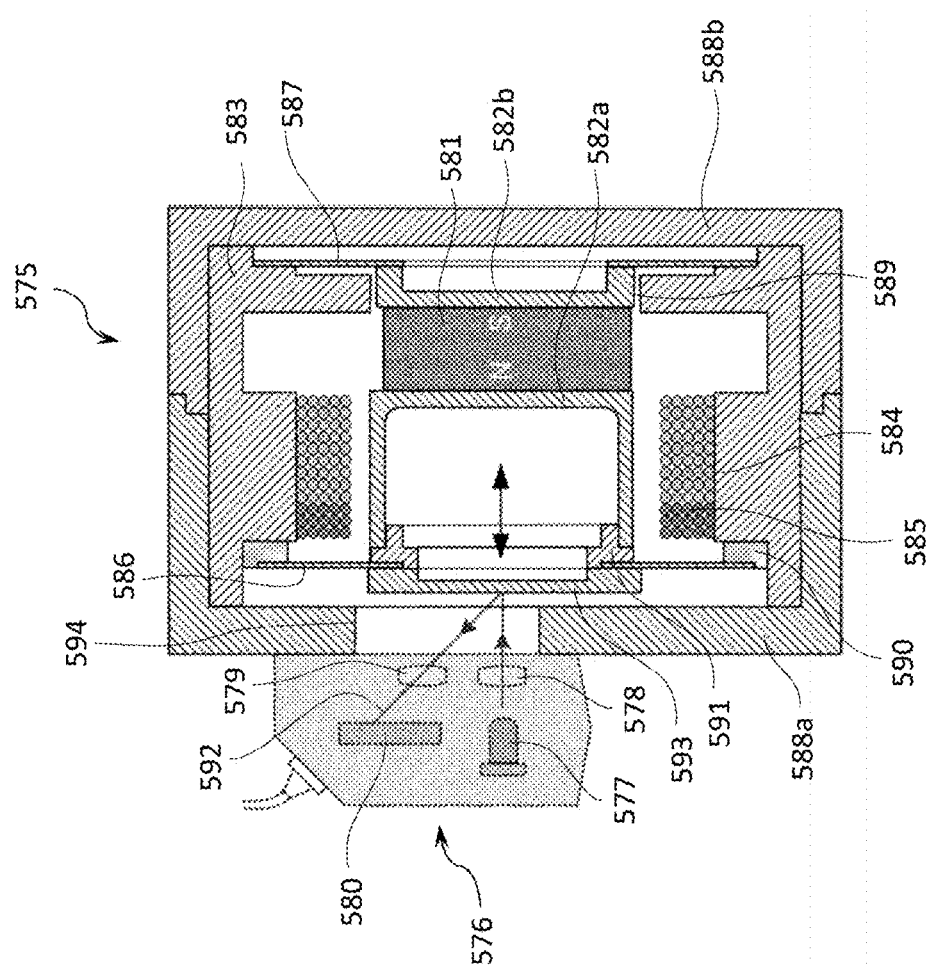
FIG. 51 is a front cross-sectional view of a servo-type acceleration sensor to which an optical sensor is applied in the present invention.
Figure 52:
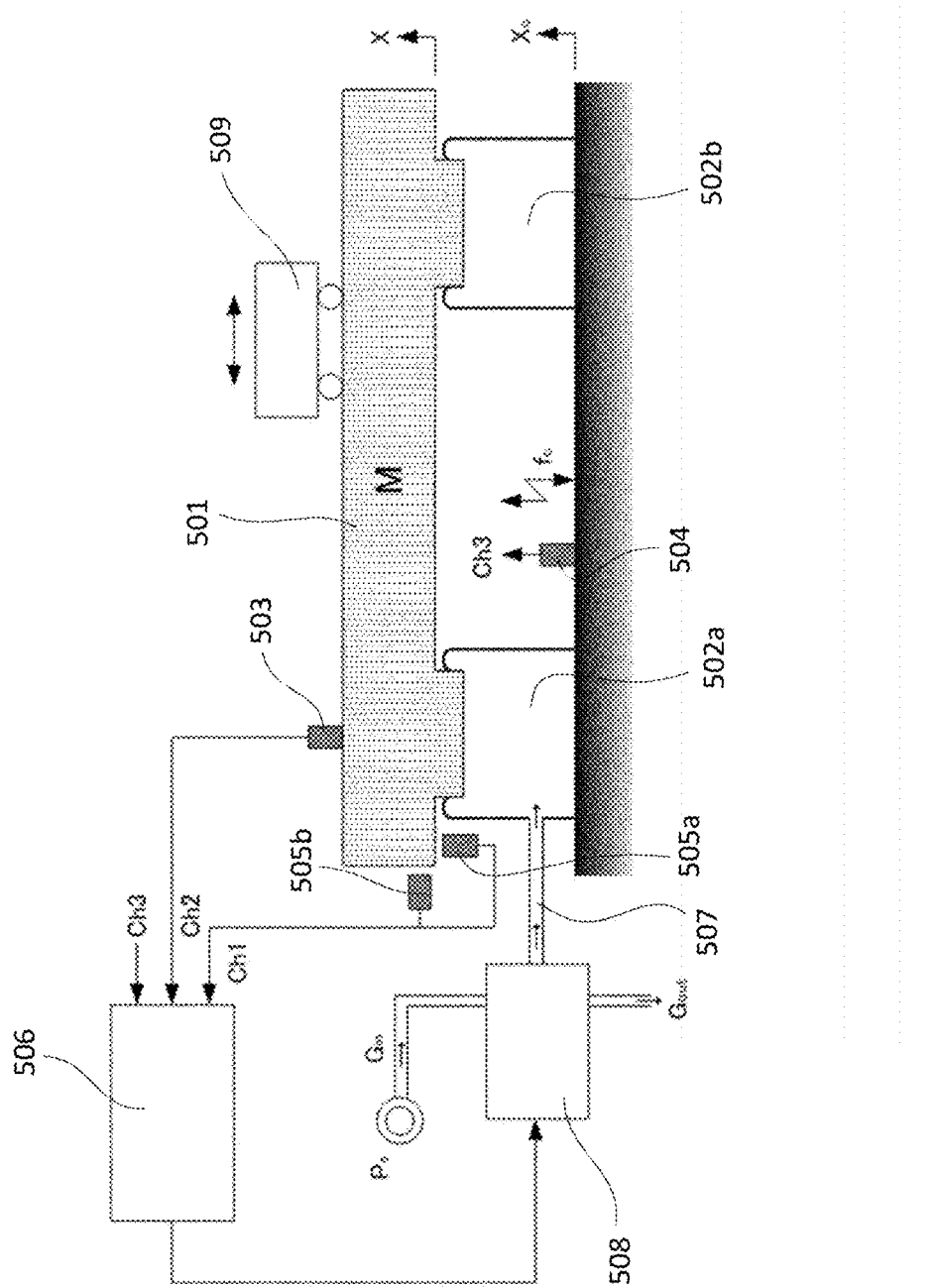
FIG. 52 is a model diagram of a conventional active vibration isolator.
Figure 53:
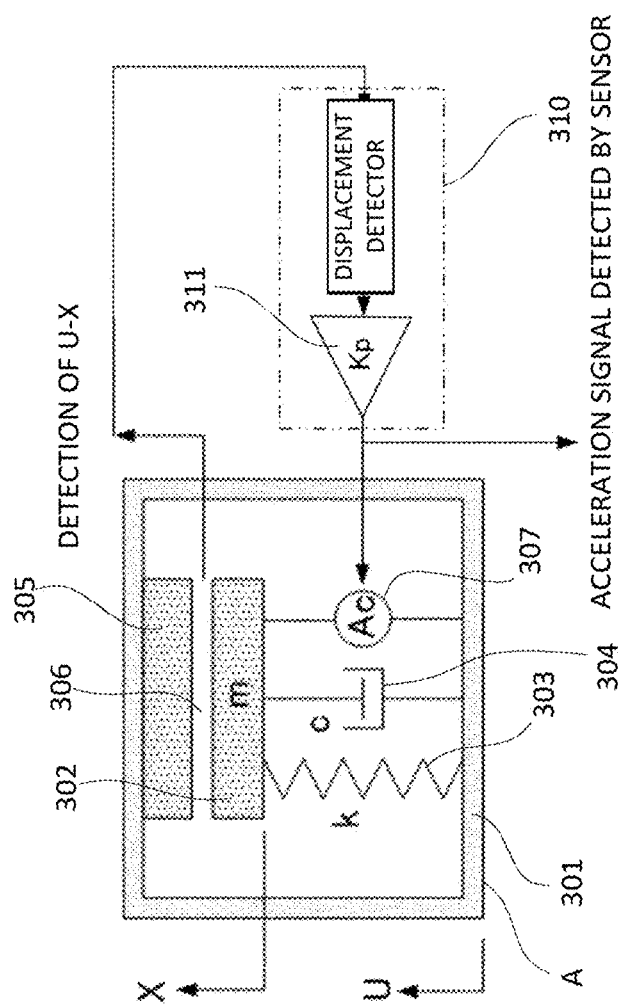
FIG. 53 is a model diagram illustrating a basic configuration and a detection principle of an electrostatic capacitance-type acceleration sensor.

Therefore, the form of the displacement detecting means capable of obtaining the above effect of the present invention is not limited to the electrostatic capacitance type. FIG. 51 illustrates a case where an optical displacement detecting means using a triangular distance measurement method as a detection principle is used as a displacement detecting unit as an alternative to the electrostatic capacitance type. Reference numeral 575 denotes an actuator portion provided with the drive means, and reference numeral 576 denotes the displacement detecting unit. The displacement detecting unit 576 includes a light source 577, a light projecting lens 578, a light receiving lens 579, and a light receiving element 580, and these elements are illustrated in an image diagram. The actuator portion 575 illustrates a case where the MM-type acceleration sensor structure according to the above-described embodiment is applied. Reference numeral 581 denotes a permanent magnet, reference numeral 582a denotes a front-side pole piece, reference numeral 582b denotes a rear-side pole piece, and reference numerals 582a and 582b constitute a movable-side yoke material. Reference numeral 583 denotes a fixed-side yoke material, reference numeral 584 denotes a force coil, reference numeral 585 denotes a verification coil, reference numeral 586 denotes a front-side disc, reference numeral 587 denotes a rear-side disc, reference numeral 588a denotes a front-side panel, reference numeral 588b denotes a rear-side panel, and a void portion 589 formed by a narrow gap between the fixed-side yoke materials facing the inner peripheral surface of the rear-side pole piece are provided, and the gap is a magnetic coupling portion. Reference numerals 590 and 591 denote an outer peripheral-side support ring and an inner peripheral-side support member made of a non-conductive material. Reference numeral 592 denotes laser light, and reference numeral 593 denotes a laser light reflecting plate attached to the inner peripheral-side support member.

Reference numeral 594 denotes an opening surface formed in the front-side panel 588a, the opening surface allowing the laser light to pass therethrough. The light receiving element 580 is called a position sensitive device (PSD), and measures displacement from a difference in an image forming position on the PSD due to a change in a position of the laser light reflecting plate 593. As the optical displacement means, a CMOS method, a CCD method, a specular reflection method, a diffuse reflection method, a line beam method, and the like can be applied. As a displacement detection method other than the optical method, a linear proximity sensor using a change in inductance of a coil due to an eddy current generated in a measurement object can also be applied.

FIG. 51 illustrates a case where the optical displacement sensor is applied to the MM-type acceleration sensor structure. However, an acceleration sensor structure by a MY type or a Maxwell stress electromagnet, which is embodiments of sections (II) and (III), can also be applied. For example, in the case of the MY type in FIG. 46 which is the nineteenth embodiment, a member corresponding to the inner peripheral-side support member 870 may be a laser light reflecting surface (corresponding to 593 in FIG. 51).

Alternatively, in the case of FIG. 49 according to the twenty-second embodiment, the through passage 623 (indicated by an imaginary line) formed in the shaft core-side yoke material 611 and the electromagnet-side housing 616 may be used as a passage for laser light, and the center axis-side opposing surface 613 of the pole piece 612 may be used as a laser light reflecting surface. Alternatively, an eddy current linear proximity sensor may be mounted inside the through passage 623.

For example, when the servo-type acceleration sensor is made a differential type using the optical displacement means, the displacement detecting unit 576 in FIG. 51 may be installed also on the right side. In this case, a member corresponding to the inner peripheral-side support member 591 may be provided on the right side of the rear-side pole piece 582b, and the laser light reflecting plate may be attached to the rear-side pole piece. The same applies to a case where a displacement detecting means other than the electrostatic capacitance type is applied to the embodiment of the differential sensor of sections (I) to (III). For example, in the case of the MY type (FIG. 48) of the twenty-first embodiment, the portions corresponding to the inner peripheral-side support members 523 and 525 on the front side and the rear side may be used as the laser light reflecting surface or the detection surface of the eddy current linear proximity sensor.

INDUSTRIAL APPLICABILITY

According to the present invention, it is possible to provide a servo-type vibration detector that does not require complicated wiring processing and can greatly simplify a mass production method and reduce production cost.

The invention claimed is:
1. A servo-type vibration detector comprising:
 a fixed member;
 a movable member provided to be movable in a predetermined direction with respect to the fixed member, the movable member being configured to allow a magnetic flux to flow inside the movable member;
 an elastic member supporting the fixed member such that the movable member is disposed with a void portion interposed;

a displacement detecting unit detecting displacement of the movable member in the predetermined direction; and a drive means configured to generate an electromagnetic force for returning the movable member to an origin position when the displacement detecting unit detects a relative displacement of the movable member from the origin position, wherein the drive means includes a coil fixed to the fixed member, and the movable member includes at least a movable-side yoke material constituting a part of a closed loop magnetic circuit.

2. The servo-type vibration detector according to claim 1, wherein the movable member further includes a permanent magnet forming the closed loop magnetic circuit, the movable-side yoke material is connected to any one of magnetic pole surfaces of the permanent magnet, and the movable-side yoke material is disposed in the coil, and the drive means is configured to move the permanent magnet and the movable-side yoke material in the predetermined direction by a reaction force of a Lorentz force received by a conductive wire through which a current flows in a magnetic field by applying a current to the coil.

3. The servo-type vibration detector according to claim 1, further comprising a permanent magnet that is fixed to the fixed member and forms the closed loop magnetic circuit, wherein he movable-side yoke is provided to be separated from any one of magnetic pole surfaces of the permanent magnet, and the movable-side yoke material is disposed in the coil, and the drive means is configured to move the movable-side yoke material in the predetermined direction by a reaction force of a Lorentz force received by a conductive wire through which a current flows in a magnetic field by applying a current to the coil.

4. The servo-type vibration detector according to claim 1, wherein the displacement detecting unit includes
  a movable-side electrode provided on the movable member, and
  a fixed-side electrode fixed to the fixed member so as to face the movable-side electrode, and
displacement of the movable member is detected based on a change in electrostatic capacitance formed between the movable-side electrode and the fixed-side electrode.

5. The servo-type vibration detector according to claim 2, wherein the void portion includes a first void portion and a second void portion forming a radial void between the movable member and the fixed member in the closed loop magnetic circuit, the first void portion includes a coil for generating the Lorentz force which is fixedly arranged in the first void portion, and the second void portion is a magnetic coupling portion for causing a magnetic flux to flow between the movable member and the fixed member.

6. The servo-type vibration detector according to claim 5, wherein a closed loop magnetic circuit is configured by a pole piece that is connected to any one of magnetic pole surfaces of the permanent magnet and constitutes a part of a movable-side yoke material, the coil that is fixedly arranged on the fixed member via the pole piece or a radially opposing surface of the permanent magnet and the first void portion, and the magnetic coupling portion provided such that a magnetic flux flows between another magnetic pole surface of the permanent magnet and the fixed member, wherein the closed loop magnetic circuit is formed by the permanent magnet, the pole piece, the first void portion, the fixed member, and the magnetic coupling portion.

7. The servo-type vibration detector according to claim 5, wherein a pole piece constituting a part of a movable-side yoke material, the coil fixedly arranged on the fixed member in a void portion between the pole piece and the fixed member, and the pole piece are disposed with any one of magnetic pole surfaces of the permanent magnet and the magnetic coupling portion interposed therebetween, and the permanent magnet is fixedly arranged such that a magnetic flux flows between another magnetic pole surface of the permanent magnet and the fixed member, and a closed loop magnetic circuit is formed by the permanent magnet, the magnetic coupling portion, the pole piece, and the fixed member.

8. The servo-type vibration detector according to claim 6, wherein the pole piece has a substantially cylindrical shape.

9. The servo-type vibration detector according to claim 7, comprising:

the permanent magnet magnetized in an axial direction;

the pole piece connected to one magnetic pole surface of the permanent magnet;

the coil fixedly arranged on an inner surface of the housing on a radially opposing surface of the pole piece with a void portion interposed therebetween; and the magnetic coupling portion provided such that a magnetic flux flows between another magnetic pole surface of the permanent magnet and the housing.

10. The servo-type vibration detector according to claim 5, wherein $\delta 1 > \delta 2$, where $\delta 1$ and $\delta 2$ are radial separation distances between the movable member and the fixed member in the first void portion and the second void portion, respectively.

11. The servo-type vibration detector according to claim 2, wherein when a movable portion mass including the movable-side yoke material is m, a mass of the permanent magnet is $m_p$, a lower limit value $m_{min}$ of the movable portion mass is $2m_p$, $K_{PT}$ is an electrical gain determined by a product of a position sensor sensitivity $K_S$, an adjustment gain $K_C$, and a proportional gain $K_P$, $K_t$ is an actuator force constant, $R_a$ is an electrical resistance of the coil, $K_T = K_{PT} K_t / R_a$, $f_0$ is a resonance frequency required for an acceleration sensor, and an upper limit value $m_{max}$ of the movable portion mass is $K_T/(2\pi F_0)^2$, $m_{min} \leq m \leq m_{max}$ is set.

12. The servo-type vibration detector according to claim 5, wherein the magnetic coupling portion includes an auxiliary permanent magnet magnetized in a radial direction, and an auxiliary coil fixedly arranged on an inner surface of the housing on a radially opposing surface of the auxiliary permanent magnet via a void portion.

13. The servo-type vibration detector according to claim 2, wherein the closed loop magnetic circuit includes a first transmission portion and a second transmission portion that transmit a magnetic flux in a radial direction between the movable member and the fixed member, the first transmission portion has a void in a radial direction between the movable member and the fixed member, and the coil for generating the Lorentz force is fixedly arranged in the void, and the second transmission portion is fixed between the movable member and the fixed member by a disc-shaped spring made of a magnetic material in which a magnetic flux flows in a radial direction, and the disc-shaped spring also serves as the elastic member that supports the movable member.

14. The servo-type vibration detector according to claim 5, wherein the permanent magnet is a front-side permanent magnet, the coil is a front-side coil, the magnetic coupling portion includes a rear-side permanent magnet magnetized in a radial direction, the pole piece connected to one magnetic pole surface of the rear-side permanent magnet, and a rear-side coil fixedly arranged on an inner surface of the housing via the void portion on a radially opposing surface of another magnetic pole surface of the rear-side permanent magnet, and a closed loop magnetic circuit is configured by the front-side permanent magnet, the void portion, the housing, the void portion, the rear-side permanent magnet, and the pole piece.

15. The servo-type vibration detector according to claim 4, wherein the elastic member is made of a conductive material having a substantially flat plate annular shape, and at least an outer peripheral side of the elastic member is fixed to the fixed member with a non-conductive material interposed therebetween.

16. The servo-type vibration detector according to claim 6, wherein a non-conductive material is interposed between the movable-side electrode and the pole piece.

17. The servo-type vibration detector according to claim 16, wherein a differential sensor is configured by detecting an output difference between two sets of electrostatic capacitance sensors including a movable-side electrode member provided on each of two end surfaces of the movable member, a fixed-side electrode member provided on the fixed member so as to face the movable-side electrode member, and the electrostatic capacitance sensor being formed between electrode surfaces of the movable-side electrode member and the fixed-side electrode member.

18. The servo-type vibration detector according to claim 16, wherein two flat plate-shaped movable-side electrode members are provided at an end portion of the movable member with a gap interposed therebetween, the flat plate-shaped fixed-side electrode member is disposed in the gap so as to be sandwiched between the two movable-side electrode members, a first electrostatic capacitance sensor is configured between an electrode surface Sa of the movable-side electrode member and an electrode surface SA of the fixed-side electrode member facing each other, and a second electrostatic capacitance sensor is configured between an electrode surface SB of a back surface of the electrode surface SA and an electrode surface Sb of the movable-side member facing each other.

19. The servo-type vibration detector according to claim 16, wherein one flat plate-shaped movable-side electrode member is provided at an end portion of the movable member, two electrode surfaces SAA and SBB are formed on front and back surfaces of the movable-side electrode member, the two flat plate-shaped fixed-side electrode members are arranged so as to sandwich the movable-side electrode member with a gap interposed therebetween, a first electrostatic capacitance sensor is configured between electrode surfaces Saa of the fixed-side electrode member facing the electrode surface SAA, and a second electrostatic capacitance sensor is configured between electrode surfaces Sbb of the fixed-side electrode member facing the electrode surface SBB.

20. The servo-type vibration detector according to claim 2, wherein the coil is housed in a non-magnetic metal bobbin, and the metal bobbin is fitted to an inner surface of a hollow cylindrical portion of the fixed member.

21. The servo-type vibration detector according to claim 2, wherein a recessed portion in which a radial distance between the movable member and the fixed member is larger than both ends of the coil is formed on an inner surface of the fixed member in a vicinity of an axial end surface of the coil in close contact with the inner surface of the fixed member.

22. The servo-type vibration detector according to claim 5, wherein at least one of a portion between the permanent magnet and the pole piece, a portion between a coil bobbin housing the coil and the fixed member, a portion between the elastic member and the fixed member, or a portion between the elastic member and the pole piece is fastened by a bolt having a length of M 0.5 to M 1.0 mm.

23. The servo-type vibration detector according to claim 21, wherein the elastic member is formed of a disc-shaped conductive material, and an inner peripheral portion and an outer peripheral portion of the elastic member have a structure integrated with a thin plate material made of a non-conductive material.

24. The servo-type vibration detector according to claim 21, further comprising:

a movable unit including at least the movable member and to which a movable-side electrode is attached; and a fixed unit to which a fixed-side electrode arranged to face the movable-side electrode is attached, wherein the displacement detecting unit is formed to detect electrostatic capacitance formed between the movable-side electrode and the fixed-side electrode, a fitting structure is formed between the movable unit and the fixed unit so that the movable unit and the fixed unit can move in a relative axial direction in a state where relative radial movement between the movable unit and the fixed unit is restricted, and a groove portion for bonding and fixing the movable unit and the fixed unit is formed on outer surfaces of the movable unit and the fixed unit.

25. The servo-type vibration detector according to claim 21, wherein the fixed member, the bolt, and the elastic member made of a conductive material are bonded and fixed to the elastic member by a thin plate made of a non-conductive member, the non-conductive member is bolted to the fixed member, and a head of the bolt is configured to be electrically non-contact with the elastic member.

26. The servo-type vibration detector according to claim 1, wherein the elastic member includes a cantilever having one fixed end and another free end, and the movable member is provided on a free end side of the cantilever.

27. The servo-type vibration detector according to claim 25, wherein a part of the cantilever is made of a conductive material to form a signal transmission path that connects a signal of the displacement detecting unit to the fixed member side.

28. The servo-type vibration detector according to claim 5, wherein in the magnetic coupling portion, as a radial rigidity $K_r$ of the elastic member, a negative spring rigidity $K_{mr}=F_r/\delta_r$ is defined where $F_r$ is a radial generated force due to a magnetic attractive force when a misalignment amount of an axis of a movable-side magnetic material member with respect to an axis of a fixed-side magnetic material member is $\delta_r$, and $K_r > K_{mr}$ is satisfied.

29. The servo-type vibration detector according to claim 6, wherein the magnetic coupling portion includes the permanent magnet magnetized in a radial direction, and an outer peripheral surface of the pole piece arranged while maintaining a void with an inner peripheral surface of the permanent magnet.

30. The servo-type vibration detector according to claim 6, wherein the magnetic coupling portion includes the permanent magnet magnetized in an axial direction, a pole piece-side yoke material disposed to be connected to any one of magnetic pole surfaces of an N pole and an S pole of the permanent magnet, and an inner peripheral surface of the pole piece disposed while maintaining a void in a radial direction with respect to an outer peripheral surface of the pole piece-side yoke material.

31. A servo-type vibration detector comprising:
a fixed member;
a movable member provided to be movable in a predetermined direction with respect to the fixed member, the movable member being configured to allow a magnetic flux to flow inside the movable member;
an elastic member supporting the fixed member such that the movable member is disposed with a void portion interposed therebetween;
a displacement detecting unit detecting displacement of the movable member in the predetermined direction; and
a drive means configured to generate an electromagnetic force for returning the movable member to an origin position when the displacement detecting unit detects a relative displacement of the movable member from the origin position,
wherein
the displacement detecting unit includes
a movable-side electrode member having two electrode surfaces provided on the movable member, and
a fixed-side electrode member having two electrode surfaces provided on the fixed member,
two sets of electrostatic capacitance sensors are configured by a combination in which each electrode surface of the movable-side electrode member and each electrode surface of the fixed-side electrode member face each other, and
the movable-side electrode member and the fixed-side electrode member are arranged such that a gap between electrode surfaces of each of the two sets of electrostatic capacitance sensors changes in opposite phases by movement of the movable member in a predetermined direction, and a difference between output signals of the two sets of electrostatic capacitance sensors is taken to configure a differential sensor.

32. A vibration control device comprising:
the servo-type vibration detector according to claim 31; and
a controller that performs absolute speed feedback or absolute displacement feedback by using an absolute speed signal obtained by integrating an acceleration signal output from the servo-type vibration detector once or an absolute displacement signal obtained by integrating the acceleration signal twice.

33. A servo-type vibration detector comprising:
a fixed member;
a movable member provided to be movable in a predetermined direction with respect to the fixed member, the movable member being configured to allow a magnetic flux to flow inside the movable member;
an elastic member supporting the fixed member such that the movable member is disposed with a void portion interposed therebetween;
a displacement detecting unit detecting displacement of the movable member in the predetermined direction; and
a drive means configured to generate an electromagnetic force for returning the movable member to an origin position when the displacement detecting unit detects a relative displacement of the movable member from the origin position,
wherein
an attractive force generation unit A is configured to form an electromagnet by forming a fixed-side yoke material provided to penetrate a coil, a movable-side yoke material disposed with an open end of the fixed-side yoke material and a void, and a closed loop magnetic circuit with the fixed-side yoke material, the void portion, and the movable-side yoke material to attract the movable member including the movable-side yoke material to the coil side, and
an attractive force generation unit B that generates a force in a direction opposite to force of the attractive force generation unit A is arranged with the movable member interposed therebetween, and a current flowing through the coil is controlled to constitute the drive means by a Maxwell stress that moves the drive member in an axial direction.

34. The servo-type vibration detector according to claim 33, wherein the attractive force generation unit B is a permanent magnet.

35. The servo-type vibration detector according to claim 33, wherein the attractive force generation unit B is an electromagnet having a same principle as the attractive force generation unit A.

36. The servo-type vibration detector according to claim 35, wherein an acceleration signal is measured by detecting a current difference between electromagnets constituting each of the attractive force generation unit A and the attractive force generation unit B.

* * * * *